United States Patent
Connelly et al.

(10) Patent No.: US 11,431,811 B2
(45) Date of Patent: *Aug. 30, 2022

(54) NOTIFICATIONS OF INCOMING MESSAGES

(71) Applicant: Comcast Cable Communications, LLC, Philadelphia, PA (US)

(72) Inventors: Michael Connelly, Philadelphia, PA (US); Sharma Kanchinadham, King of Prussia, PA (US); Bhagabati Prasad Maharana, Bensalem, PA (US); Louis Rubin, Ruskin, FL (US); Michael Cook, Flemington, NJ (US); James Tobin, Newton Square, PA (US); Jeffrey Lewis, Wayne, PA (US); Bavani Subramaniam, Chennai (IN)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/184,114

(22) Filed: Feb. 24, 2021

(65) Prior Publication Data
US 2021/0185135 A1 Jun. 17, 2021

Related U.S. Application Data

(63) Continuation of application No. 16/263,951, filed on Jan. 31, 2019, now Pat. No. 10,986,193, which is a continuation of application No. 15/477,570, filed on Apr. 3, 2017, now Pat. No. 10,237,356, which is a continuation of application No. 14/461,363, filed on Aug. 15, 2014, now Pat. No. 9,654,572, which is a continuation of application No. 12/511,604, filed on Jul. 29, 2009, now Pat. No. 8,842,815.

(51) Int. Cl.
| | |
|---|---|
| G06F 15/16 | (2006.01) |
| H04L 67/51 | (2022.01) |
| H04L 9/40 | (2022.01) |
| H04L 65/1033 | (2022.01) |
| H04L 67/306 | (2022.01) |

(52) U.S. Cl.
CPC ............ *H04L 67/16* (2013.01); *H04L 63/102* (2013.01); *H04L 65/1036* (2013.01); *H04L 67/306* (2013.01)

(58) Field of Classification Search
CPC .... H04L 67/16; H04L 63/102; H04L 65/1036
USPC ...... 379/219, 220, 220.01; 455/466; 709/220
See application file for complete search history.

(56) References Cited

U.S. PATENT DOCUMENTS

| | | |
|---|---|---|
| 4,395,596 A | 7/1983 | Leitman et al. |
| 4,817,132 A | 3/1989 | Chamberlin et al. |

(Continued)

OTHER PUBLICATIONS

Web page downloaded from <http://en.wikipedia.com/wiki/Public_address> on Jul. 29, 2009.

(Continued)

*Primary Examiner* — William J Deane, Jr.
(74) *Attorney, Agent, or Firm* — Banner & Witcoff, Ltd.

(57) ABSTRACT

Users receiving incoming messages may provide their preferences for how they wish to be notified of the incoming messages. A plurality of user devices may be caused to output indicators of the incoming messages, and at least one of the user devices may also provide an acknowledgement of the notification, and the indicators may be cleared.

58 Claims, 33 Drawing Sheets

(56) References Cited

U.S. PATENT DOCUMENTS

| | | |
|---|---|---|
| 6,553,100 B1 | 4/2003 | Chen et al. |
| 6,724,872 B1 | 4/2004 | Moore et al. |
| 6,876,632 B1 | 4/2005 | Takeda |
| 6,956,942 B2 | 10/2005 | McKinzie et al. |
| 7,043,278 B2 | 5/2006 | Valade et al. |
| 7,337,448 B1 | 2/2008 | Dalia et al. |
| 7,474,743 B2 | 1/2009 | Simpson et al. |
| 7,631,040 B1 | 12/2009 | Hushyar et al. |
| 7,653,573 B2 | 1/2010 | Hayes, Jr. et al. |
| 7,765,583 B2 | 7/2010 | Kalonji et al. |
| 8,126,982 B2 | 2/2012 | Nidd |
| 8,719,143 B2 | 5/2014 | Meijer et al. |
| 8,850,044 B2 | 9/2014 | Cohen et al. |
| 9,780,968 B2 | 10/2017 | Bonanni et al. |
| 2003/0194096 A1 | 10/2003 | Kennedy et al. |
| 2004/0037410 A1 | 2/2004 | Roberts et al. |
| 2004/0090954 A1 | 5/2004 | Zhang et al. |
| 2004/0198471 A1 | 10/2004 | Deeds |
| 2006/0116142 A1* | 6/2006 | Cofta .................. H04W 8/18 455/466 |
| 2006/0173793 A1 | 8/2006 | Glass |
| 2006/0248332 A1 | 11/2006 | Kim et al. |
| 2007/0116232 A1 | 5/2007 | Sprokkereef |
| 2007/0121869 A1 | 5/2007 | Gorti et al. |
| 2008/0049767 A1 | 2/2008 | Koltenuk |
| 2008/0104199 A1 | 5/2008 | Kalaboukis |
| 2008/0108328 A1 | 5/2008 | Lovell |
| 2008/0120669 A1 | 5/2008 | Brodigan et al. |
| 2008/0224988 A1 | 9/2008 | Whang |
| 2008/0242271 A1 | 10/2008 | Schmidt et al. |
| 2009/0175430 A1 | 7/2009 | Freeman et al. |
| 2010/0058394 A1 | 3/2010 | Goergen et al. |
| 2010/0159995 A1 | 6/2010 | Stallings et al. |

OTHER PUBLICATIONS

Web page downloaded from <http://www.reference.com//browse/wiki/Public_address_system> on Jul. 29, 2009.
Office Action in EP 10169568.2-2416 dated Nov. 8, 2011.
European Search Report for EP10169568 dated Dec. 6, 2010.
European Office Action—European Application 10169568.2—dated Feb. 6, 2015.
Response to European Office Action—EP 10169568.2—dated Jun. 5, 2015.
Canadian Office Action—CA Appl. 2,709,497—dated Jun. 21, 2016.

* cited by examiner

| Name | Cred. | Identities | Device IDs | Dev. priority | Indicators | Appl./Service | CPE gw | Account | Pri./non-pri. |
|---|---|---|---|---|---|---|---|---|---|
| ⌐201 | ⌐202 | ⌐203 | ⌐204 | ⌐205 | ⌐206 | ⌐207 | ⌐208 | ⌐209 | ⌐210 |
| User A | UID<br>PW | Email ID 1<br>Email ID 2<br>TN1<br>TN2<br>IM ID1<br>Web site url | Device 101<br>Device 102<br>Device 103<br>Device 104 | Priority 0<br>Priority 1<br>Priority 2<br>Priority 3 | Visual indicator 1<br>Ringtone 1 | personalized TN<br>SMS<br>email<br>weather<br>news<br>horoscope | <MAC addr><br><IP addr> | <acct. no.> | Primary |

| Sesion ID | CPE gateway | Default TN | Login status | User ID |
|---|---|---|---|---|
| NCS ID 1 | TN1 | Yes | Yes | User A |
| NCS ID 2 | TN2 | No | Yes | User B |
| NCS ID 3 | TN3 | No | No | User C |

| ┌2101 | ┌2102 | ┌2103 | ┌2104 | ┌2105 | ┌2106 | ┌2107 | ┌2108 |
|---|---|---|---|---|---|---|---|
| Acct. No. | NCS ID | TN | Default TN | Nickname | User name | GUID | Login status |
| 10000 | aaln0/... | TN1 | Yes | Mike | Mike12345 | \<guid x\> | Yes |
| 10000 | aaln1/... | TN2 | No | Jack | Jack678910 | \<guid y\> | No |

FIG. 21

| Private User Identity | Public User Indentity | TN | Preferences |
|---|---|---|---|
| User1@comcast.net | Primaryuser1@comcast.net | xxx-xxx-xxxx | Xxx |
| User2@comcast.net | Primaryuser2@comcast.net | yyy-yyy-yyyy | Yyy |

FIG. 22

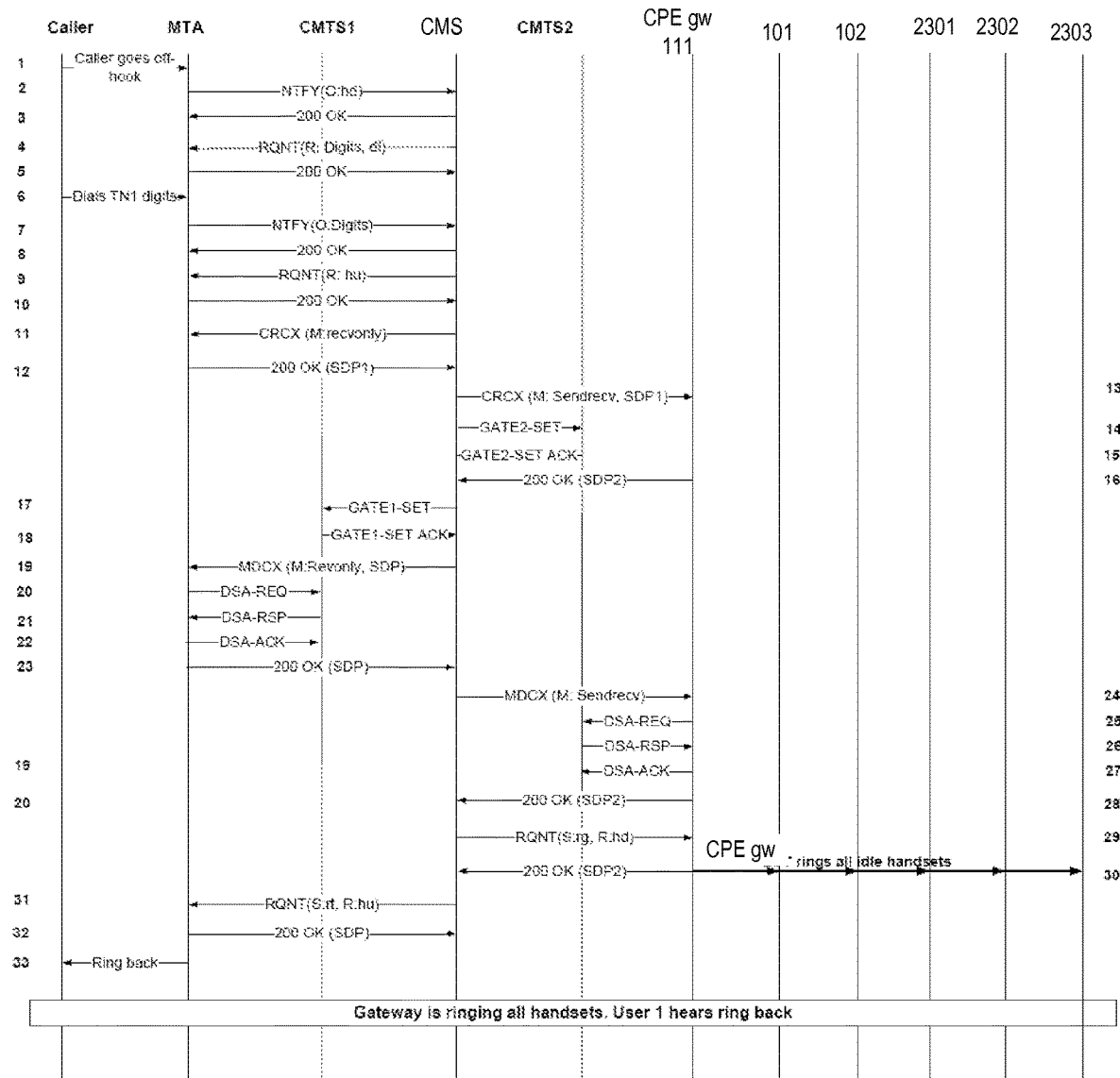
FIG. 24B
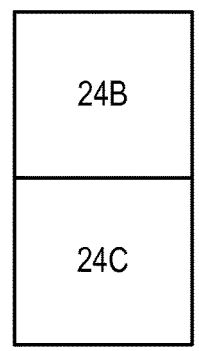

NOTIFICATIONS OF INCOMING MESSAGES

CROSS-REFERENCE TO RELATED APPLICATIONS

The present application is a continuation of U.S. patent application Ser. No. 16/263,951, filed Jan. 31, 2019, which is a continuation of U.S. patent application Ser. No. 15/477,570 filed Apr. 3, 2017, now U.S. Pat. No. 10,237,356, which is a continuation of U.S. patent application Ser. No. 14/461,363, filed Aug. 15, 2014, now U.S. Pat. No. 9,654,572, which is a continuation of U.S. patent application Ser. No. 12/511,604, filed Jul. 29, 2009, now U.S. Pat. No. 8,842,815, which are each hereby incorporated by reference in its entirety for any and all non-limiting purposes.

BACKGROUND

It has become increasingly common for residential and business consumers to receive multiple types of communication services. For example, users in a home may all communicate with the outside world through telephone calls, emails, instant messages, etc. In many cases, a user may employ multiple devices to take advantages of these services. As the range of available services increases, and as users seek to receive more of those services on different types of devices, management of individual user identities, preferences, contact information, and other types of data becomes increasingly complex. This complexity can be compounded when multiple users share communication devices.

SUMMARY

This Summary is provided to introduce a selection of concepts in a simplified form that are further described below in the Detailed Description. This Summary is not intended to identify key features or essential features of the invention.

In some embodiments, a profile-based system is employed to manage user identities and preferences, devices, content and/or other aspects of service delivery. The user profiles may be maintained in one or more servers or other elements located in an external network and accessed via a customer premises equipment (CPE) gateway of a local network. The profiles can be used to map users to identities, devices, services, and other features that affect the manner in which a particular user communicates with (or through) the external network.

Numerous other features can be provided in one or more additional embodiments. For example, elements in an external network may be used provide a notification summary to inform a specific user about pending events in any of one or more services. The summary may, in at least some embodiments, consolidate information about pending events and synchronize notification across multiple devices. As but another example, profiles may be employed to facilitate a user selection of a particular telephone number for a voice call session. Depending on profile settings, a user may also be permitted to join a pre-existing voice call session.

Profiles may also be used to control the manner in which notifications of incoming voice call sessions or of other types of events are provided. In some embodiments, for example, each user may have one or more unique audio and/or visual indicators specified in his or her profile. Those indicators can then be used with notifications to that user of incoming communications and other events directed to that user. Profiles can also be used to control the manner in which notifications of multiple simultaneous events are directed to different users.

Additional embodiments include systems and techniques for providing "public address" type messages to multiple users. Yet other embodiments include a network-based address book that permits users to share selected contact data with other users. Still further embodiments combine some or all of the above-described features and/or additional features described herein.

BRIEF DESCRIPTION OF THE DRAWINGS

Some embodiments of the present invention are illustrated by way of example, and not by way of limitation, in the figures of the accompanying drawings and in which like reference numerals refer to similar elements. For convenience, the first portion of each reference numeral corresponds to the drawing figure in which the corresponding drawing element is first introduced.

FIG. 2 shows an example of a profile for a specific user according to some embodiments.

FIG. 21 shows a table according to some embodiments mapping various types of information regarding TNs and users associated with a subscriber account that corresponds to a particular CPE gateway.

FIG. 22 is an example of a table that could be generated and pushed to a CPE gateway in some embodiments that employ Session Initiation Protocol (SIP) signaling for call set up.

FIGS. 24A-24C show call flow signaling in some embodiments.

DETAILED DESCRIPTION

Some embodiments are described in the context of a network providing television, high speed data communication, telephony and other services to subscribers over a hybrid fiber-coaxial (HFC) cable plant using one or more protocols conventionally used in such networks. However, the invention is not limited to networks using a specific type of communication medium or to a specific set of communication protocols.

Figure 1:
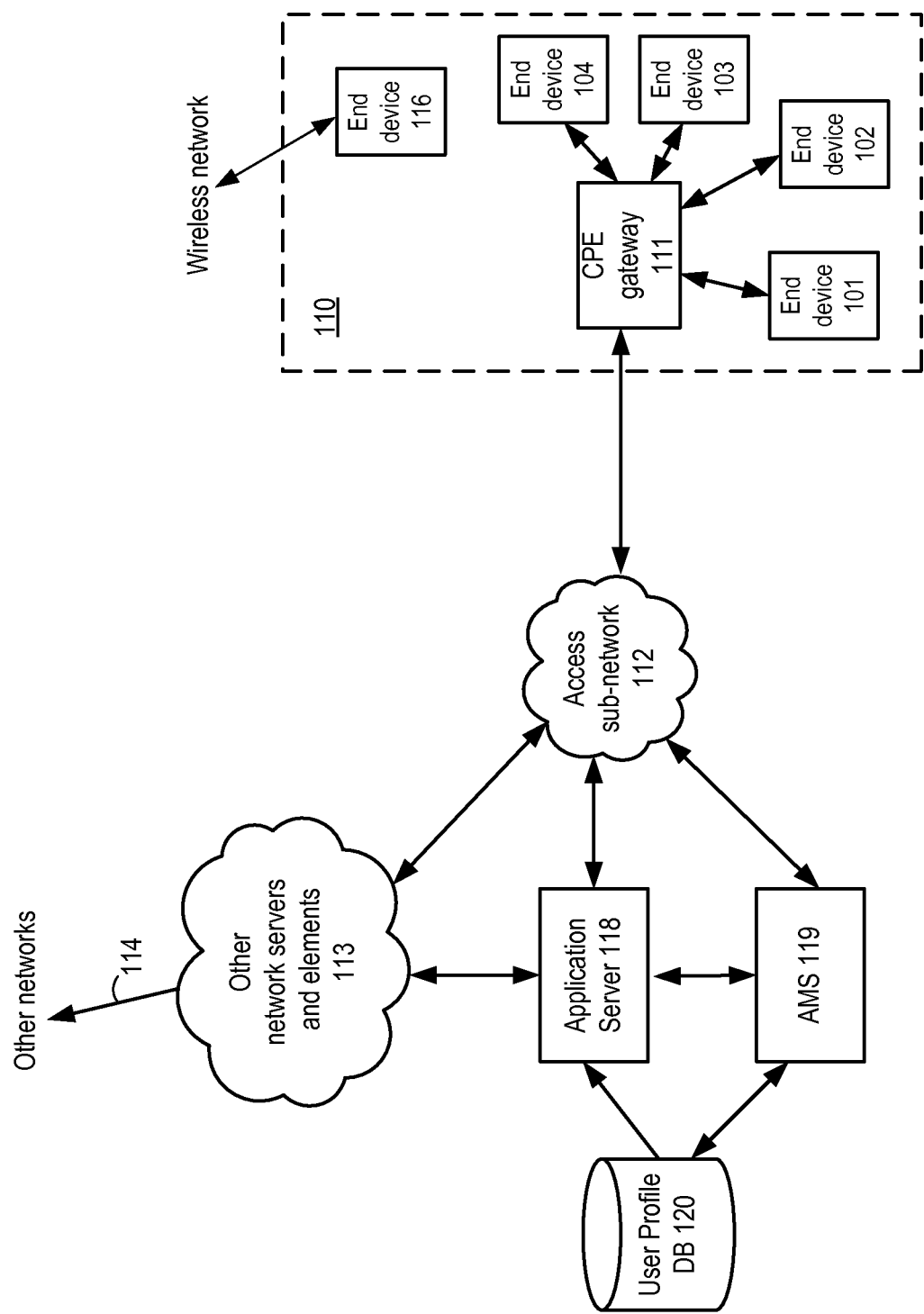
FIG. 1 is a block diagram showing an architecture for a network in which at least some embodiments may be implemented.

FIG. 1 is a block diagram showing an architecture for a network 100 in which at least some embodiments may be implemented. A plurality of end devices 101, 102, 103 and 104 at a subscriber premises 110 communicate through a customer premises equipment gateway (CPE gateway) device 111 with other elements of network 100. Devices 101-104 and CPE gateway 111 form a local network, and users sharing devices 101-104 may form a user group. The portion of network 100 beyond premises 100 forms an external network relative to the local network of premises 110.

In the example of FIG. 1, devices 101 and 102 are digital enhanced cordless telecommunications (DECT) handsets with advanced features, device 103 is a personal computer and device 104 is a Set-Top Terminal (STT) with a television connected thereto. Additional details of devices 101-104 and examples of other types of end devices are provided below. Network 100 includes a plurality of subscriber premises each having a CPE gateway and one or more end user devices communicating with network 100 through that CPE gateway in a manner similar to that described herein for subscriber premises 110. For convenience, however, only a single subscriber premises 110 is shown.

CPE gateway 111 communicates with the external network portion of network 100 through an access sub-network 112. Sub-network 112 includes a cable modem termination system (CMTS), downstream modulators, fiber nodes and other elements commonly found in an HFC access network. Because the existence and operation of such elements is known, further details of access sub-network 112 are not included herein. One group of network 100 elements with which CPE gateway 111 communicates through sub-network 112 is collectively represented as a cloud 113. Included in cloud 113 are numerous servers and other network elements with which devices 101-104 at premises 110 and with which other end devices at other premises exchange information. Those servers and network elements include call management servers and other elements used to prove voice telephony, short message service (SMS) servers, instant messaging servers, web servers, servers providing various types of content described herein, etc. Cloud 113 also includes links 114 to other networks. Network 100 may communicate with a network providing mobile telephony and other types of mobile services to mobile telephones, "smart" phones, personal digital assistants (PDAs) and other types of wireless handheld devices such as smart phone 116. CPE gateway 111 also communicates through sub-network 112 with an application server 118 and an account management server (AMS) 119, each of which is described in more detail below. For convenience, various routers and other intermediate network elements between elements of network 100 are not shown in FIG. 1.

In at least some embodiments, and as discussed in more detail below, individual users at a subscriber premises can have unique profiles stored in a user profile database (DB) 120. Profiles stored in DB 120 control the manner in which specific users receive information from and/or send information to network 100. In particular, an operator of network 100 may provide (or forward) numerous different services to premises 110. Examples of such services can include voice telephony over any of multiple telephone numbers associated with premises 110, internet access and/or other high-speed data service, email service, SMS (short message service), instant messaging (IM) service, television, etc. Additional examples of services include, but are not limited to: a network-based address book; gaming services; services to deliver personalized news, horoscopes, financial quotes, sports reports, etc.; location-specific weather, traffic information, news, etc.; personalized greeting messages; voice mail; multimedia messaging service (MMS); audio, visual and/or text-based chat; etc. Many of those services have specific types of information used for identifying a particular user, user-specific settings and preferences, and other types of configuration data that affect how the service is provided. Each of multiple individuals sharing end devices 101-104 at premises 110 may have a separate profile stored in DB 120 that represents the identifying information, settings, preferences and other configuration data for each of those services relative to that individual. Further details and examples of profiles and configuration data in profiles are described below.

In some embodiments, user profiles are linked to a specific subscriber account. As used herein, a "subscriber" is a person, corporation or other entity that has arranged to obtain access to, and one or more services from, network 100, and an "account" is a construct used to group various data items related to providing a subscriber with services in the network. In some embodiments, an operator of network 100 establishes an account for premises 110 that includes various sub-accounts, with each of those sub-accounts corresponding to a specific user profile. A subscriber may be, for example, a head of a family residing at premises 100, and each of the sub-accounts may be used by individual family members. This is only one example, however, and an account need not be assigned to a particular type of entity or be associated with a single premises or gateway.

Profiles stored in DB 120 can be created and managed from end devices 101-104 and/or other devices and are device-agnostic. In other words, individual users may create and manage their profiles from various types of devices and may receive content delivery, notifications and other services in a synchronized manner across multiple devices and device types.

FIG. 2 shows an example of a profile 200 for a specific user stored in database 120. A first field 201 contains a name for profile 200. This name can be, e.g., a name of the user or some variant of that user's name. A second field 202 contains credentials for the user. The credentials can include a user identification (UID) (e.g., the user name or some other name used to identify the user) and a password. The credentials could also include other types of data (e.g., encryption keys, etc.) and could include multiple separate sets of credentials (e.g., separate passwords and/or UIDs for different services). The next set of fields 203 contain identities for the user in various services. Examples of an identity include a telephone number (TN) and/or a session identifier associated with a TN, an email address, an instant messaging (IM) identifier, a game handle, etc. In some embodiments, the service to which a particular identity applies is implicit from the format of the identity (e.g., a ten-digit TN is implicitly linked to telephony-related services), but separate fields linking identities to services could also be included. In some implementations of some embodiments, each subscriber account is provided with a set of TNs (e.g., five TNs) that can be assigned to individual users, with one of those TNs acting as a default TN. Further examples of user/TN linking are described below.

Fields 204 contain identifiers for specific end devices over which the user wishes to receive notifications (described in more detail below) and other aspects of various services. The identifiers in fields 204 can be, e.g., media access control (MAC) addressed of identified devices. In the example of FIG. 2, the profile contains the identifiers of end devices 101-104 shown at premises 110 in FIG. 1. However, this need not be the case. For example, end devices at a premises may include devices (e.g., a game console) that a particular family member may not use, and that family member may thus decide that he or she does not want any services for him or her directed to that never-used device. As another example, one member of a family may have a smart phone that is not used by other family members (e.g., phone 116), and thus other family members would not identify that smart phone in their profiles.

Field 205 contain priorities that the user has assigned to each of the devices identified in fields 204. In some embodiments, a user can configure a profile so that notifications of various events (e.g., incoming calls, new emails, updated news or other information, etc.) are first sent to one or more primary devices, then to one or more secondary devices if the notification is not attended at a primary device, then to one or more tertiary devices, etc. In some such embodiments, notifications are sent to all devices by default if no priorities are specified in a profile. A user could also configure a profile so that notifications for events in one service are sent to some end devices and notifications for events in a different service are sent to different devices.

Fields 206 contain pointers to various audio and/or visual indicators that are to be employed when notifying the user of an event associated with a service. An audio indicator can be a ring tone or other type of sound. A visual indicator can be a specific color to which a display screen should be set, a picture or other graphic, a video clip, etc. A visual indicator could also include a specific type of pop-up message to be provided on certain devices (e.g., a "toaster" pop-up indicator on a bottom corner of a computer window) and/or whether such an indicator is to be allowed, specific text to be flashed on a display, an indicator that a display screen is to be flashed, an indicator that an LED or other light is to be flashed, etc. Although only a single audio indicator and a single visual indicator are shown in FIG. 2, a single profile could specify multiple audio and/or visual indicators. For example, a user may specify a first audio and/or visual indicator combination to be used for notifications for one type of service (e.g., incoming telephone calls), a second audio and/or visual indicator combination to be used for notifications for another type of service (e.g., IM messages), etc. Examples of other types of notifications are included below.

Fields 207 indicates various services the user is authorized to receive. In some cases, the authorizations in fields 207 are controlled by a subscriber, while in other instances the operator of network 100 controls such authorizations. For example, the operator of network 100 may make one set of services available to subscribers who pay a basic fee, a larger set of services available to subscribers paying a slightly higher fee, etc. In some embodiments, each account has a primary user who can control the degree to which other, non-primary users can access and/or modify their profiles, and thus control the degree to which those other users can access certain services. By way of illustration, a parent/primary user may restrict a child from using certain news or other services, from making long distance telephone calls, from receiving IM messages or other incoming communications between certain hours, etc. In a similar manner, a primary user could limit the degree to which a non-primary user could modify other aspects of a profile. As but one illustration, a non-primary user may be prevented from changing end devices identified in that non-primary user's profile.

Field 208 contains a sub-network 112 MAC address and/or IP address for CPE gateway 111. Field 209 contains an identifier of the account with which profile 200 is associated. A field 210 indicates whether the profile is for a "primary" user.

A profile could include numerous other types of configuration information for a particular user. A profile could indicate the extent to which a particular user has "barge-in"

rights to join an ongoing telephone call or other service session (described below). A profile could specify the types of notifications a user wishes to receives and/or the devices on which the user wishes to receive certain types of notifications. By way of illustration, a user may keep a DECT end device used for business purposes in a home office, and thus not want to receive IM or personal email notifications, sports updates or other distracting non-business notifications on that DECT device. A profile could include presence information (e.g., one or more fields to indicate whether a user has logged into or is currently utilizing a specific and device, the last end device the user utilized, etc.). A profile could also be used to contain personalization data that controls the types of notifications to be provided for certain services, examples of which include: the types of news stories for which a user would like to receive notifications; specific companies about which a user would like to receive financial update service notifications; a specific zodiac sign for which the user would like to receive a daily horoscope notification; sports teams for which the user would like to receive game score notifications; location information for services providing weather, traffic, local news or other location-related notifications; etc. As but one additional example, a profile may specify how notifications of emails, voice mails, IM messages, and other types of incoming communications are to be synchronized, how often such notifications are to be delivered, the devices from which such notifications can be accessed, etc. A profile could control the manner in which personalized greeting messages from a user are formatted and/or certain content to be included in such messages (e.g., a picture of the user). A profile could be used to control a user's access to a network-based address book. A profile could identify other users in a community of users (e.g., other family members) to be provided certain multicast messages and/or indicate users from whom multicast messages are to be relayed.

Data within a profile can also be used by other network elements to determine whether a particular user and/or device is authorized for a particular service, and thus provide access control. A profile could further be used for auto detection of devices and services, for authorization of additional devices for services, for other types of configuration management, and various other purposes. Accordingly, the data items shown in FIG. 2 are merely examples of the types of data that can be contained in a user profile. Moreover, the table of FIG. 2 is merely one example of how profile data can be stored in accordance with some embodiments. The actual format of profile data and/or of the tables or other data structures used to organize and store profile data will vary among different embodiments.

Users access profiles in database 120 through account management system (AMS) 119 (FIG. 1). Specifically, AMS 119 provides configuration management and access control functions through which users create, update and otherwise manage their individual profiles. In at least some embodiments, AMS 119 provides these functions through a web page or other portal that a user can access through any of end devices 101-104 and/or through a separate web portal (e.g., accessible over device 116 or remotely from premises 110). Upon accessing the profile management portal, a user can create a profile having data such as shown in FIG. 2 and/or modify individual elements of the profile data. In some implementations, each family or other local user group associated with subscriber account will have a primary user (e.g., a parent) with highest privileges to control the profiles of other individual users (e.g., children) within that group. Those other users will have limited privileges for creation and management of their own profiles, but will not be able to modify the profiles of other users.

Application server 118 receives notifications from other application servers and network devices that are destined for particular identities associated with a particular user (e.g., emails to a specific email address, instant messages to a specific IM ID, etc.). In some embodiments, messages for setting up voice telephony sessions and messages containing coded voice data for such sessions are exchanged with CPE gateway 111 by call managements servers (CMS), CMTSs and other network elements directly, but information regarding such sessions is forwarded to application server 118 (by CPE gateway 111 and/or from other elements within network 100). Server 118 then consults user profile DB 120 and extracts various data from the profile(s) applicable to the identities being notified. That data may include, e.g., devices to which the notifications are to be forwarded, the CPE gateway through which such devices can be reached, visual and/or audio indicators to be used for the notification, etc. Server 118 then pushes the notifications and the profile data to the appropriate CPE gateway. In some embodiments, profile data for users in a local user group associated with an account is pushed to and cached on CPE gateway 111 when gateway 111 is booted, and updates are pushed to gateway 111 as such updates are made. Other operations performed by application server 118 may include consolidating and/or reconciling notifications from multiple sources and/or services for an individual user, concurrent delivery of notifications to multiple end devices for a particular user, and synchronization of notifications across multiple devices.

In some embodiments, AMS 119 and application server 118 interface with user profile DB 120 using an XML interface, a web services interface, or other appropriate interface. Network elements in cloud 113 may similarly communicate with application server 118 over an XML interface, a web services interface or other appropriate interface. AMS 119, user profile database 120 and application server 118 may each be implemented as multiple servers for redundancy and/or to increase the amount of analysis, data storage and other services being performed simultaneously.

Figure 3:
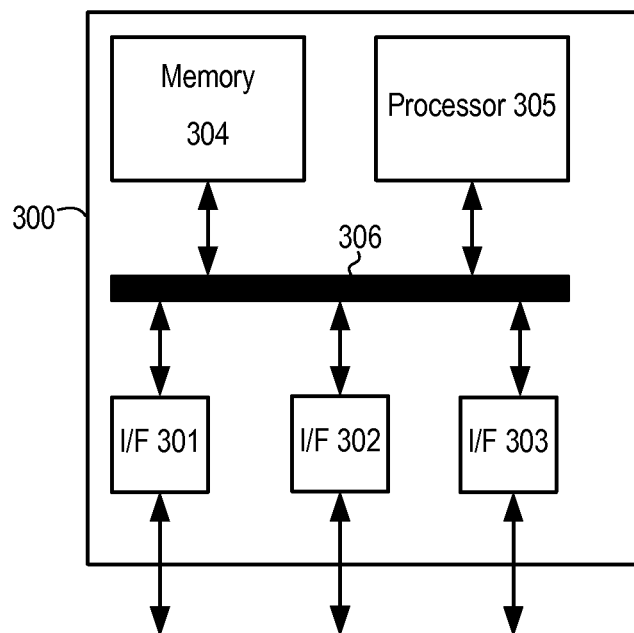
FIG. 3 is a partially schematic block diagram of a server according to some embodiments.

FIG. 3 is a partially schematic block diagram of a server 300 that can act as one of AMS 119, user profile DB 120 and/or application server 118. Server 300 includes one or more hardware interfaces 301-303 that provide physical connections by which server 300 communicates with other servers or elements in network 100. In at least some embodiments, hardware interfaces 301-303 include one or more Ethernet cards. Server 300 further includes memory 304 for storing instructions and data and a processor 305 for executing instructions and controlling operation of server 300. Although a single block is shown for memory 304 and a single block shown for processor 305, memory and computational operations of server 300 could respectively be distributed across multiple memory devices and multiple processors located within server 300 and/or across memory and processors located on multiple platforms. Memory 304 may include volatile and non-volatile memory and can include any of various types of storage technology, including one or more of the following types of storage devices: read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory. Processor 305 may be implemented with any of numerous types of devices, including but not limited to one or more general purpose microprocessors, one or more application specific integrated circuits, one or more field programmable gate arrays, and combinations thereof. In at least some embodiments, processor 305 carries out operations described herein according to machine readable instructions stored in memory 304 and/or stored as hardwired logic gates within processor 305. Processor 305 communicates with and controls memory 304 and interfaces 302-303 over one or more buses 306.

Returning to FIG. 1, and as previously indicated, end devices 101-104 communicate with network 100 through CPE gateway 111. For example, CPE gateway 111 receives notifications and other service data from application server 118 and forwards same to the appropriate end devices. CPE gateway 111 similarly forwards call signaling and other data from end devices 101-104 to various elements of network 100. CPE gateway 111 may also perform any of numerous additional functions in various embodiments. For example, CPE gateway 111 may provide the session ID of an outgoing call (e.g., a NCS ID in systems using an NCS-based protocol or a SIP session ID in systems using SIP-based protocol) to application server 118. CPE gateway 111 also interfaces with application server 118 (e.g., using a web service interface such as SOAP/XML), interfaces with AMS 119 (e.g., using a SOAP/XML interface) for profile creation and update, maps a Session ID to a TN, determines a profile and its attributes from a TN and maps a session ID to those profile attributes by communicating with application server 118, and pushes the personalized profile attributes along with a session ID to an end device. CPE gateway 111 may also act as a proxy to forward user credentials from an end device to AMS 119 and forward profile attributes from application server 118 to the end device.

Figure 4:
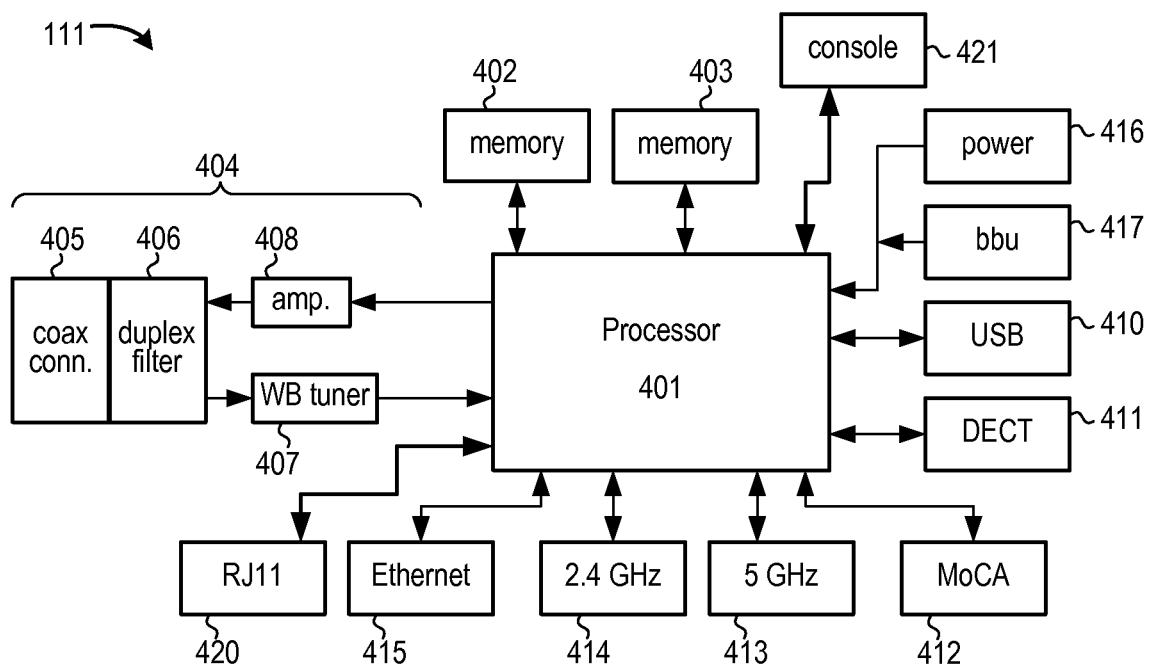
FIG. 4 is a block diagram of a CPE gateway according to some embodiments.

CPE gateway 111 interfaces with each end device on a physical layer (e.g., wired or wireless) using protocols specific to the end device. CPE gateway 111 may be incorporated with components performing additional operations (e.g., a Data over Cable System Interface Specification (DOCSIS) cable modem). FIG. 4 is a block diagram of CPE gateway 111 according to some embodiments. A main processor 401 is configured to execute instructions so as to perform various operations as described herein, to perform various DOCSIS MAC and PHY (physical) layer operations, and to control operation of other components of CPE gateway 111. Instructions executed by main processor 401 may be hard-wired logic gates and/or may be instructions read from memory 402 or 403. Main processor 401 communicates with network 100 across an RF interface 404 that includes a coaxial cable connector 405, a duplex filter 406, a wideband tuner 407 and an upstream communication amplifier 408. Main processor 401 communicates with end devices through various additional interfaces that include additional hardware and/or firmware. Such interfaces can include a USB interface 410, a DECT 6.0 interface 411, MOCA (Multimedia Over Coax) interface 412, 2.4 GHz WiFi interface 414, 5 GHz WiFi interface 413, Ethernet interface 415 and RJ11 interface 420. A power supply 416 and/or battery backup 417 provide electrical power. User input to CPE gateway 111 may be provided over one of the aforementioned interfaces or via a separate collection of buttons or other controls in a console 421.

Figure 5:
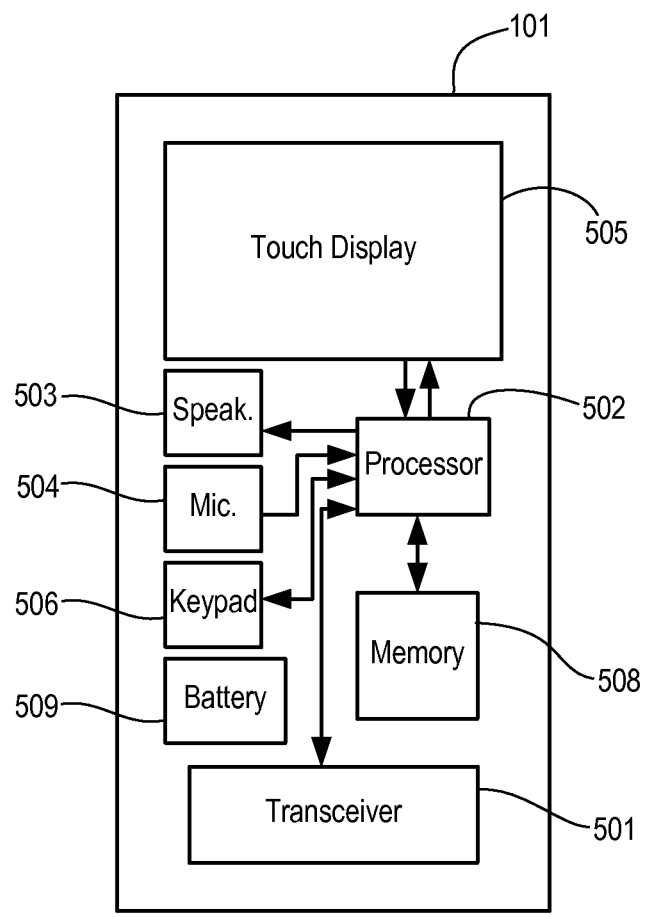
FIG. 5 is a block diagram of an end device according to some embodiments.

In the example of FIG. 1, end devices 101 and 102 are DECT handsets communicating with CPE gateway over DECT interface 411 in FIG. 4. FIG. 5 is a block diagram of end device 101, with end device 102 being similar. DECT handset device 101 includes a transceiver 501 that receives and demodulates wireless signals from interface 411 and that modulates and transmits signals to interface 411. A processor 502 is configured to execute instructions so as to perform various operations as described herein and to control operation of other components of device 101. Those instructions may be stored in memory 508 as executable instructions and/or as hard wired logic within processor 502. Processor 502 is also configured to perform one or more types of CODEC (coder/decoder) operations to convert data to audio for output through speaker 503 and to convert sound received through microphone 504 into data. Processor 502 outputs video data to a display 505 and receives user input through a keypad 506 and/or through touch sensitive portions of display 505. Processor 502 is configured to provide a browser or other graphical user interface (GUI) on display 505 by which a user of device 101 can receive visual indicators for notifications, access various services, configure a user profile, etc. A battery 509 provides electrical power to device 101.

End device 103 in FIG. 1 is a personal computer. Similar to the platform 300 described in connection with FIG. 3, device 103 includes one or more hardware interfaces that provide physical connections over which device 103 communicates with CPE gateway 111. Those hardware interfaces may be wireless interfaces communicating with one or interfaces 413 or 414 (FIG. 4), a USB interface communicating with interface 410, an Ethernet interface communicating with interface 415, etc. Device 103 further includes memory for storing instructions and data and a processor for executing instructions and controlling operation of device 103. That memory may include volatile and non-volatile memory and can include any of various types of storage technology, including one or more of the types of storage devices described in connection with FIG. 3. The processor of device 103 may be implemented with any of numerous types of devices, including but not limited to one or more general purpose microprocessors, one or more application specific integrated circuits, one or more field programmable gate arrays, and combinations thereof. In at least some embodiments, the processor of device 103 carries out operations described herein according to machine readable instructions stored in the memory of device 103 and/or stored as hardwired logic gates within the device 103 processor. Device 103 may include (or be communicatively coupled to) a display and a speaker to provide video and audio output, respectively. A keyboard and/or mouse provide user input to device 103.

Other types of end devices can include other types of cordless or wired telephones, Set Top Terminals, game consoles, etc. Each of the devices may also include memory and processor(s) configured to execute instructions so as to carry out operations described herein. Such devices may also include and/or be communicatively coupled to output devices (e.g., speakers and/or display screens) and input devices (e.g., keyboards, keypads, game controllers, remote control units for navigating and selecting elements of onscreen menus, etc.).

As previously indicated, end devices 101-104 and other end devices provide content and service data to users and allow users to create and/or manage individual profiles. The above-described end devices communicate with external network elements outside of premises 110 using CPE gateway 111 as a proxy device. Other types of end devices (not shown) may communicate with application server 118, AMS 119 and/or other elements of network 100 without using CPE gateway 111. For example, personal digital assistant (PDA) 116 or a smart phone may interface with network 100 via a separate wireless network.

Each of the above-described end devices may be shared by multiple users in a user group associated with premises 110. For example, handset devices 101 and 102 may be available for use by any member of a family residing at premises 110, computer device 103 may be a computer that all members of the family use, etc. Even though devices 101-104 are not dedicated to specific users, any of the users in the group can have a unique experience when utilizing one of end devices 101-104. For example, a user receiving an incoming telephone call, email or other communication on any of various ones of those devices can receive a notification that employs a user-specific audio and/or visual indicator derived from that user's profile maintained in DB 120. Each of end devices 101-104 also provides an interface for a user to communicate with AMS 119 and application server 118 for accessing the user's profile and to retrieve various notifications and other information. This interface may be a web service interface such as SOAP/XML, a web browser interface, or another application running on the device. In some embodiments, an end device may also implement a mechanism for temporary authorization to access a user profile if the device is not currently associated with that user's profile.

Figure 6:
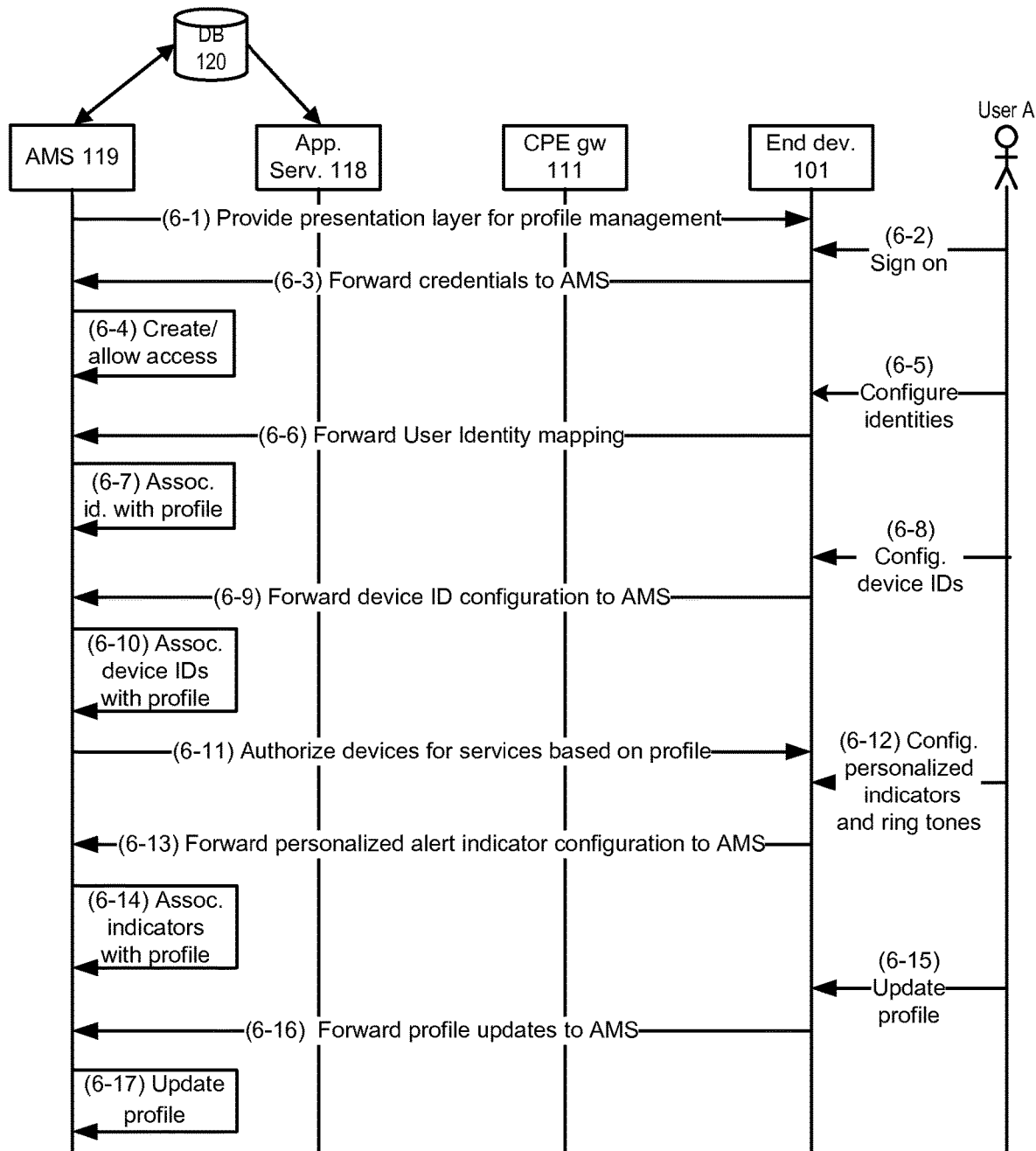
FIG. 6 is a communication diagram showing information flows in connection with a user creating and managing a profile according to some embodiments.

FIG. 6 is a communication diagram showing information flows in connection with a user ("user A") creating and managing a profile using end device 101 at premises 100 (FIG. 1). Although end device 101 is used in the present example, other end devices at premises 110 could also be used. On line 6-1, AMS 119 provides a profile management presentation layer to end device 101 via CPE gateway 111. As used herein, "presentation layer" refers to a collection of user interface components (e.g., applications or applets permitting a user to select icons or fill in data fields) and user interface process components (e.g., applications and applets controlling the user interface components and sending user-supplied data to AMS 119). Although not shown in FIG. 6, AMS 119 may have provided the profile management presentation layer in response to various types of stimuli. As but one example, user A may have touched a region of display screen 505 (FIG. 5) corresponding to a "create/modify profile" command, which may have caused end device 101 to send a signal to CPE gateway 111, which in turn caused CPE gateway 111 to forward a signal to AMS 119.

Upon receiving the profile management presentation layer, end device 101 provides a screen for user A to sign on by providing a user ID and password or by providing other credentials. If user A has not signed on in a previous session, the user ID and password could be provided to user A by the operator of network 100 or by the primary user on the account (if user A is not the primary user). In some embodiments, a default profile is initially established for each TN linked to a particular account. The default profile includes minimal information (e.g., a different color visual indicator and a different ring tone) for each TN so that calls to different TNs can be distinguished without requiring any setup by a subscriber. Users can then modify those profiles to include other types of information. In some implementations, an account may be allowed to have more profiles than TNs, thus requiring certain profiles to share a particular TN. In some cases, a subscriber may wish to create a temporary profile (e.g., for a houseguest) specifying certain types of services that can be accessed through a specific device (e.g., a DECT handset in a guest bedroom).

User A signs on (line 6-2), and end device 101 forwards user A's credentials to AMS 119 via CPE gateway 111 (line 6-3). After verifying the received credentials, AMS 119 either creates a profile for user A or opens a pre-existing profile and permits user A to access that profile (line 6-4). After AMS 119 informs end device 101 that user A may access the profile (not shown in FIG. 6), user A inputs identities such as an email ID, a TN (e.g., one of multiple telephone cumbers previously associated with the account for premises 110), an instant messaging ID, etc. (line 6-5). End device 101 sends those identities to AMS 119 via CPE gateway 111 (line 6-6), and AMS 119 associates those identities with the user A profile by storing appropriate data in the user A profile in DB 120 (line 6-7). User A then inputs identifications for devices to be associated with the user A profile (line 6-8), which information is forwarded to AMS 119 via CPE gateway 111 (line 6-9) and associated with the user A profile in DB 120 by AMS 119 (line 6-10). AMS 119 then authorizes the identified devices for services based on the profile by informing CPE gateway 111 and end device 101 (line 6-11). In some embodiments, this authorization may flow through application server 118. End device 101 is informed in line 6-11 because user A is currently logged in through end device 101, but other authorized end devices may not receive a specific notification of authorization as part of line 6-11.

In line 6-12, user A configures personalized audio and visual indicators by inputting the necessary information into end device 101. User A may, e.g., provide names of files containing ring tones, images, etc. and/or cause such files to be uploaded. The personalized audio and video indicators are forwarded to AMS 119 (line 6-13), which then associates the personalized audio and video indicators with the user A profile in DB 120 (line 6-14). User A may provide additional user profile attributes and/or updates (line 6-15) that are also forwarded to AMS 119 (line 6-16) and associated with the user A profile (line 6-17).

In some embodiments, a user could login from multiple end devices and update the user's profile concurrently from those devices. The latest update on the profile would then be updated by AMS 119 and synchronized across the end devices. For updating the profile, the upstream system may auto-detect the end device based on user credentials and provide the user interface for profile update. The user profile stored in DB 120 by AMS 119 is device agnostic and maintained at the upstream network and can be derived from multiple devices to deliver multiple services (i.e., the user can use the network based profile and access the identities and content from any device for any service).

Figure 7:
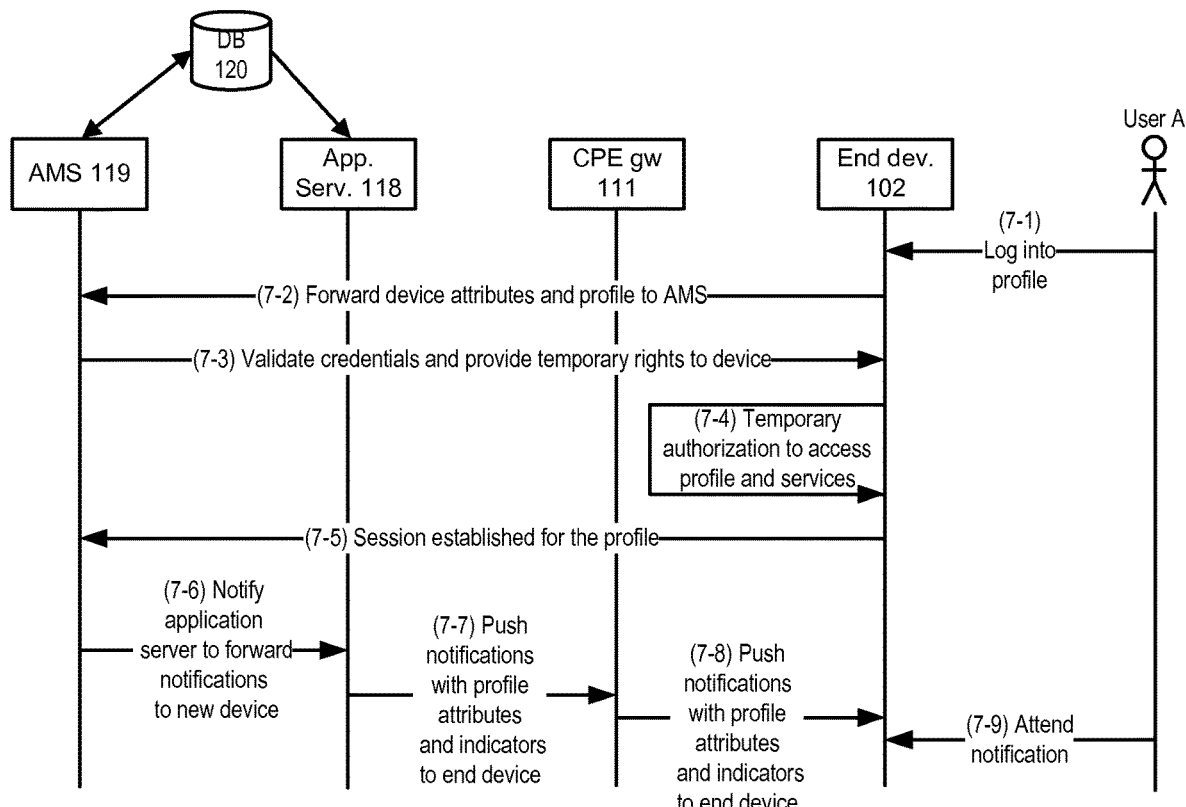
FIG. 7 is a communication diagram showing information flows in connection with a user accessing a profile from a temporary device according to some embodiments.

FIG. 7 is a communication diagram showing information flows in connection with user A accessing a profile from a temporary device. In some embodiments, a user can login to the system for receiving services from an end device that was not previously associated with that user's profile. For example, user A may have previously configured his or her profile so that incoming telephone calls and message are directed to (handset) end device 101 and (computer) end device 103, but not to (handset) end device 102 or (STT) end device 104. If user A logs in using handset end device 102, AMS 119 will provide temporary rights to device 102 and user A will receive all notifications at device 102 as long as the session is authorized with proper credentials and active. User A logs in with his or her user name and password using end device 102 at line 7-1. Those credentials are forwarded to AMS 119 via CPE gateway 111 (line 7-2), which then validates those credentials and provides temporary access rights to device 102 for user A (line 7-3). Device 102 then processes that authorization (line 7-4) and establishes a session via CPE gateway 111 with AMS 119 (line 7-5). AMS 119 then advises application server 118 that notifications from applications and services identified in the user A profile should be forwarded to device 102 (line 7-6). When application server 118 receives such a notification it is pushed to device 102 via CPE gateway 111 (lines 7-7 and 7-8). User A can then attend to a notification on device 102 just as he or she would using device 102 or device 103 (line 7-9).

Although not shown in FIG. 7, application server 118 in some embodiments sends a message to CPE gateway 111 after line 7-6 indicating that notifications of events for identities in the user A profile should be sent to device 102. In this manner, CPE gateway 111 will know to cause device 102 to generate notifications of such events. As indicated above, external network messages relating to new voice calls may come to CPE gateway 111 directly from a CMS, CMTS or other network elements without passing through application server 118. However, other types of services may send messages containing data for a particular user identity to CPE gateway 111 through application server 118. In either case, CPE gateway 111 will use information previously received from AMS 119 to cause end device 102 to generate an appropriate notification.

Numerous types of notifications can be provided through an end device in a manner similar to that described in connection with FIG. 7 and in connection with other drawings figures. Some notifications may inform a specific user of an incoming call to a TN mapped in that user's profile, of a missed call and/or of a voice mail message. Other types of notifications may inform a user of other telephony-related events (e.g., a call-back from a previously busy TN). Still other types of notifications may inform a user of a new IM message, SMS message, MMS message, email or other type of message. Table 1 lists a number of different types of notification events corresponding to various different service types.

TABLE 1

| Service type | Notification events |
| --- | --- |
| voice/telephony | incoming call; missed call; new voice mail; call-back; emergency call; presence indication |
| messaging | new IM; new SMS message; new MMS message; new email; network status message; presence indication |
| profile management | change in profile; request to change profile; user login/logout/presence information |
| news | update or alert |
| sports | update or alert |
| local news/weather/traffic | update or alert |
| financial | stock quote or other update or alert |
| horoscope | daily horoscope |
| alarm/calendar | wake-up alarm; calendar reminder |
| system management | full mail box; full voice mail box; user login/logout; other system alerts; emergency notifications |
| emergency alerts/home alarm | update or alert |
| advertisements | update or alert; sale notices, etc. |
| other personalized services | update or alert |

Table 1 is not intended as an exhaustive list of possible notifications. Other types of notifications can be provided in various embodiments and/or are described below.

Figures 8, 9:
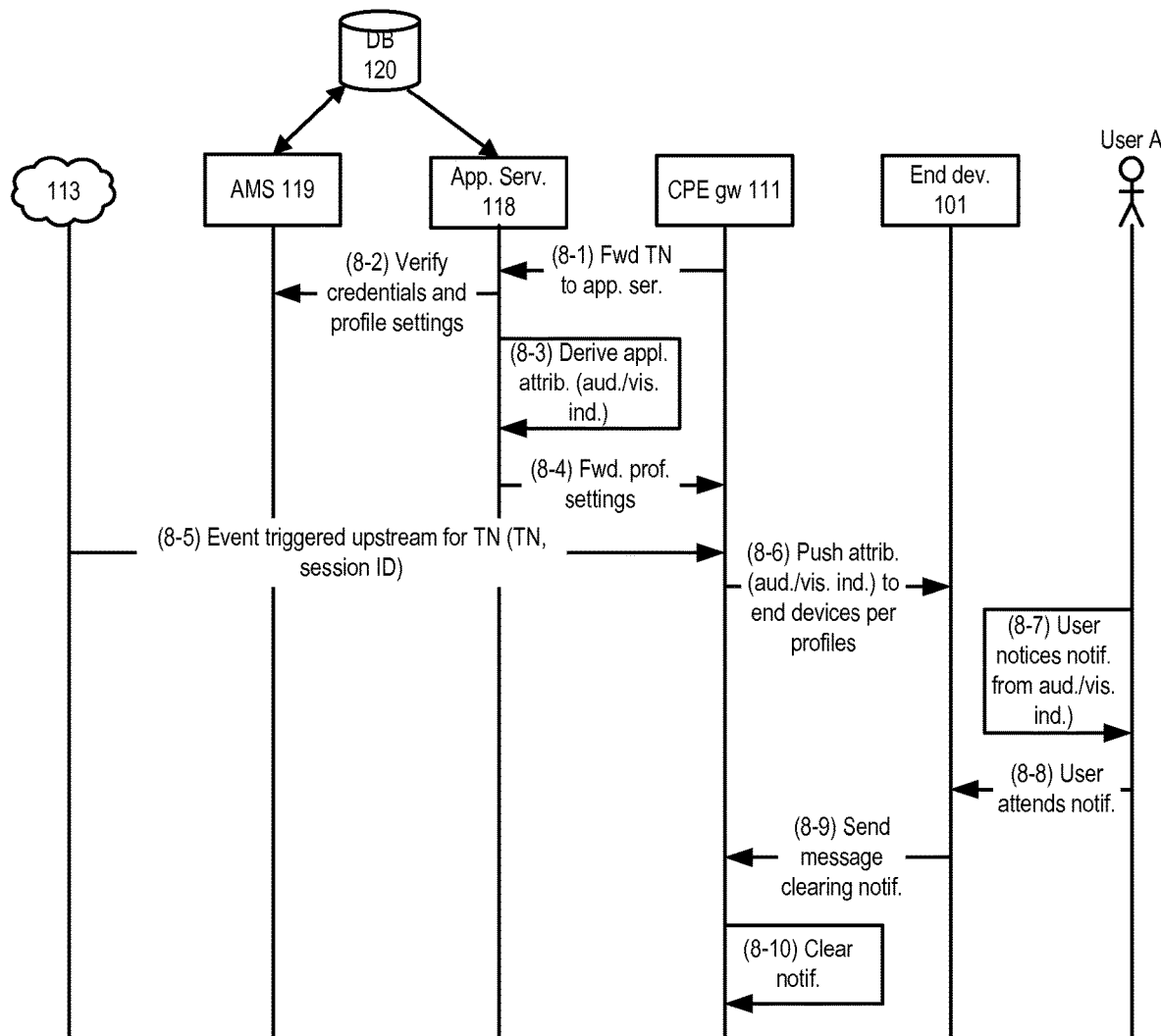
FIG. 8 is a communication diagram showing an example of notification according to some embodiments.
FIG. 9 shows an example of how NCS session IDs, TNs, user IDs and other data could be mapped at a CPE gateway and at an application server according to some embodiments.

FIG. 8 is a communication diagram showing one example of notification in a session-based network (e.g., as part of a NCS or SIP session). In particular, FIG. 8 shows the call flow to receive personalized notifications for a voice call at an end device based on a user profile. Shared end devices in a local network (e.g., the local network shown for premises 110 in FIG. 1) will use the personalized audio and visual indicators stored in the profile of a called user to notify that user of an incoming call. At line 8-1, CPE gateway 111 is booted and forwards its MAC address or other identifier to application server 118. The example of FIG. 8 assumes that user profiles have already been created (e.g., as described in connection with FIG. 6) and are mapped to the TNs of the account associated with CPE gateway 111. Application server 118 then consults user profile DB 120 and/or AMS 119 and verifies credentials and profile settings (line 8-2) and then obtains information from those profiles (line 8-3). In particular, application server 118 identifies the audio and visual indicators for each of those user profiles, user-to-TN mappings from those profiles, and other user-specific attributes. Application server 118 then forwards the user attributes to CPE gateway 111 at line 8-4. CPE gateway 111 stores those attributes for future use in generating notifications to users of incoming telephone calls and other events. If CPE gateway 111 was at this point unplugged and then plugged back in, the steps of lines 8-1 through 8-4 would be repeated.

At line 8-5, CPE gateway 111 receives an event trigger from an upstream network element indicating an incoming call directed to one of the TNs of the account associated with CPE gateway 111. If the event trigger related to a different service, it would (in at least some embodiments) have been routed to CPE gateway 111 through application server 118. Upon receiving the event trigger message, CPE gateway 111 determines the appropriate audio and visual indicators mapped to the called TN and uses those indicators to cause end devices to generate notifications of the incoming call in accordance with one or more of the profiles for which data was received at line 8-4 (line 8-6). When user A notices the audio and/or visual indicators on end device 101, user A recognizes that a call to user A is incoming (line 8-7). User A attends to the notification at line 8-8. As used herein, "attending" a notification refers to providing an input that acknowledges the notification and that may (in some cases) cause the notification to be canceled and/or cleared. A notification can be attended by accepting an incoming session or communication (e.g., answering a telephone call, accepting a new email or IM message, etc.), by rejecting an incoming session or communication, by indicating that the notification has been received but will be addressed later (e.g., transferring a call to voice mail, by acknowledging a new message notification without opening the new message, etc.), and/or by other means. End device 101 then sends a message to application server 118 via CPE gateway 111 clearing the notification at line 8-9. The notification to user A for the incoming call is the then cleared (line 8-10). CPE gateway 111 may also send a signal to application server 118 indicating that the notification can be cleared (not shown). Other elements of the call setup are not shown in FIG. 8, but may be in accordance with known internet telephony call setup procedures. If user A attend the notification in line 8-8 by accepting the incoming call, the call would continue after the notification was cleared at lines 8-9 through 8-10.

FIG. 9 shows one example of how NCS (Network-based Call Signaling) session IDs, TNs, user IDs and other data could be mapped at CPE gateway 111 and at application server 118. The first NCS session ID (NCS ID 1) is mapped a first TN (TN1). TN1, which is also the default number for CPE gateway 111 (as discussed in more detail below), is mapped to user A (i.e., is linked to user A by user A's profile). In the example of FIG. 9, user A is also logged into the local network of CPE gateway 111 (through an end device not indicated in FIG. 9). In a similar manner, NCS ID 2 is mapped to TN1 (a non-default number) and user B, with user B also being logged in. NCS ID 3 is mapped to TN3 and user C, who is not currently logged in.

When there is a new telephone call, email message, instant message or other type of event associated with one of the services provided to users associated with a particular account, a visual and/or audio notification of that event will be provided for a reasonable amount of time so that the event can be noticed and differentiated by the appropriate user(s). For example, a notification of an incoming telephone call to a TN mapped to user A will have audio and/or video indicators specified by user A's profile and may be generated on multiple end devices. Once user A attends to and clears that notification on one of those end devices, the visual notification will be cleared and discontinued on all the end devices. If there are other pending notifications for other events and/or other users, audio and/or visual notifications for those notifications will continue to be provided on other end devices, and will also be provided on the device just utilized by user A to attend a notification if that device is not still in use (e.g., if user A attended the notification by directing the call to voice mail). If there are multiple pending notifications, they may be played in a predefined sequence (e.g., based on order of receipt at application server 118 or CPE gateway 111). When all users attend their notifications, the visual alert indicators will be turned off on all the handsets.

Notifications could be provided in various ways. For example, distinct visual and audio indicators could be provided for each type of event when used by a single user. By way of illustration, a user may specify one combination of audio and visual indicators for telephone call notifications and a different combination of audio and visual indicators for instant messaging notifications. Distinct audio and visual indicators could also be used to identify a user to whom a notification is directed. For example, user A's profile may indicate that user A is mapped to TN1, has specified song 1 as a ring tone and red as a visual indicator, and identifies handset end devices 101 and 102. User B's profile may indicate that user B is mapped to TN2, has specified song 2 as a ring tone and blue as a visual indicator, and also identify handset devices 101 and 102. An incoming call to TN1 would result in playing of song 1 and display of red on devices 101 and 102. An incoming call to TN2 would result in playing of song 2 and display of blue on devices 101 and 102. A call to TN1 followed by a call to TN2 before the TN1 call is answered would result in devices 101 and 102 each playing song 1 while displaying red for a first time period, followed by playing song 2 while displaying blue for another time period, with the cycle repeating until one of the notifications is attended or times out (e.g., if a caller hangs up).

Figure 10:
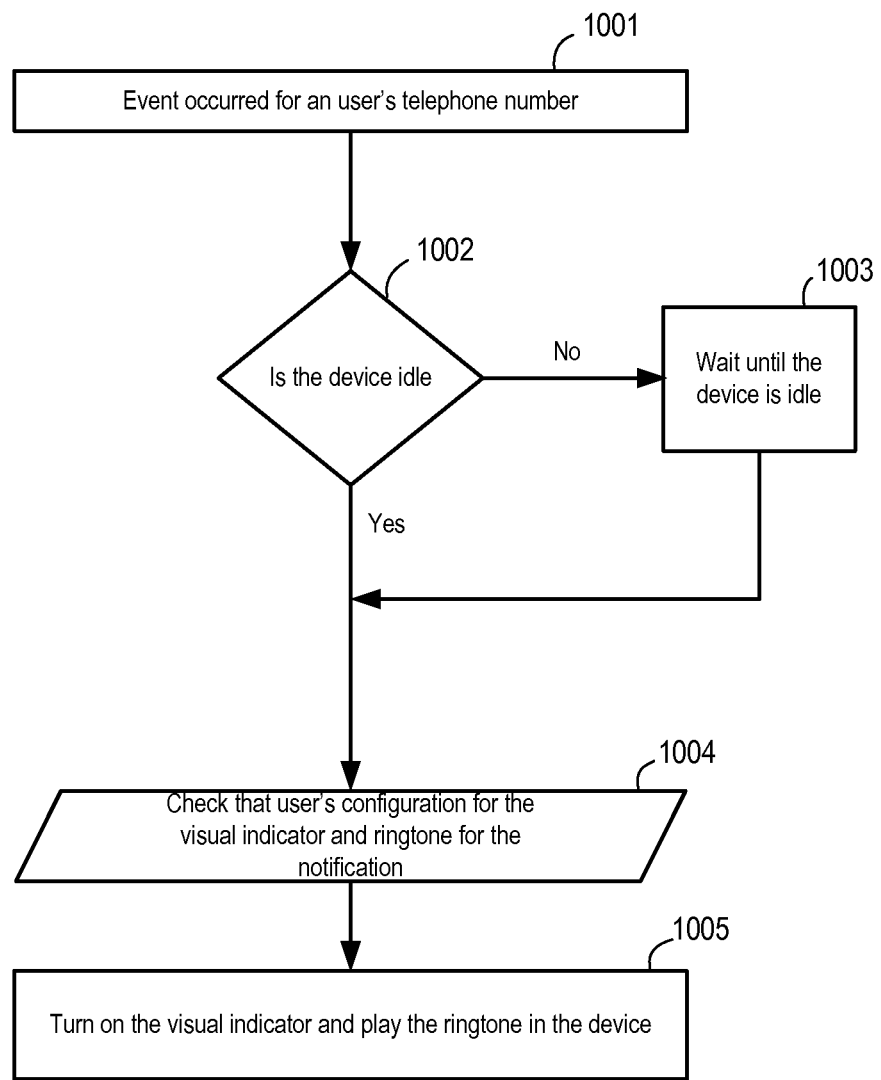
FIG. 10 is a flow chart illustrating operations performed by a CPE gateway to create a notification according to some embodiments.

FIG. 10 is a flow chart illustrating operations performed by CPE gateway 111 to create a notification of a call to TN1 on end device 101, which is mapped to user A in the user A profile. CPE gateway 111 would simultaneously perform similar operations with regard to additional end devices mapped in user A's profile. In block 1001, CPE gateway 111 receives a message indicating an incoming call to TN1. In block 1002, CPE gateway 111 determines if end device 101 is idle. If so, CPE gateway 111 proceeds on the yes branch to block 1004 and determines the correct audio and visual indicators. Those indicators may have been previously stored (e.g., as described in connection with FIG. 8). CPE gateway 111 then causes device 101 to provide a notification of the incoming call with those indicators (block 1005). If device 101 had not been idle in block 1002, gateway 111 would have proceeded to block 1003 and waited until device 101 became idle, at which point gateway 111 would have then proceeded to block 1004. If the caller were to hang up before CPE gateway 111 transitioned from block 1003 to block 1004, the notification provided in block 1004 could be of a missed call. Operations similar to those of FIG. 10 could be performed for other types of notifications or to provide notifications of multiple pending events. If CPE gateway 111 received notifications in block 1001 of a call to TN1 and to TN2 (as described above in a previous example), the audio and visual indicators for both calls would be determined in block 1004 (song 1/red and song 2/blue), and the notifications would be provided in sequence in block 1005.

Figure 11:
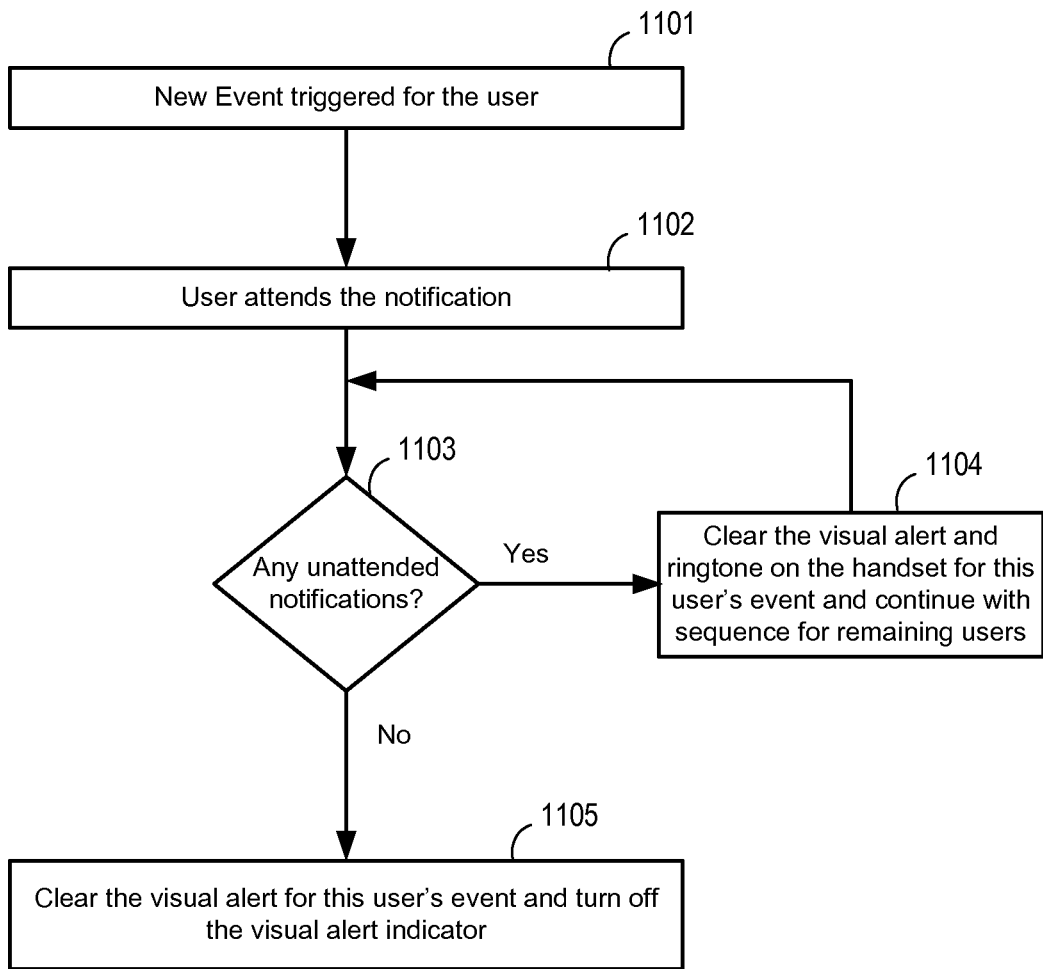
FIG. 11 is a flow chart illustrating operations performed by a CPE gateway according to some embodiments when a user attends a notification.

FIG. 11 is a flow chart illustrating operations performed by CPE gateway 111 when a user attends a notification. As with the example of FIG. 10, CPE gateway 111 may perform the operations of FIG. 11 in parallel for multiple end devices. CPE gateway 111 receives a message indicating an incoming event for user A in block 1101 and forwards a notification with the appropriate indicators. CPE gateway 111 receives an indication in block 1102 that the user has attended the notification. In block 1103, CPE gateway 111 determines if there are any additional unattended notifications for user A. If not, CPE gateway 111 proceeds on the "no" branch to block 1105, clears the notification (including, e.g., sending an appropriate message to application server 118), and causes the end device to discontinue the indicators. If there are additional unattended indicators, CPE gateway 111 proceeds on the "yes" branch to block 1104, clears the notification attended in block 1102, and provides the next notification (or sequence of notifications).

Once a notification is attended by a user, the notification may be cleared on the device utilized for attending the notification and on all other devices. Notifications as described above could also be provided in SIP-based IMS networks. Notifications with audio and/or video indicators could be provided on other types of devices. In some embodiments, notifications with only audio or visual indicators might be provided through some devices (e.g., audio only in an end device without a display screen, visual only for devices the user has specified in a profile as visual-only, etc.).

Figure 12:
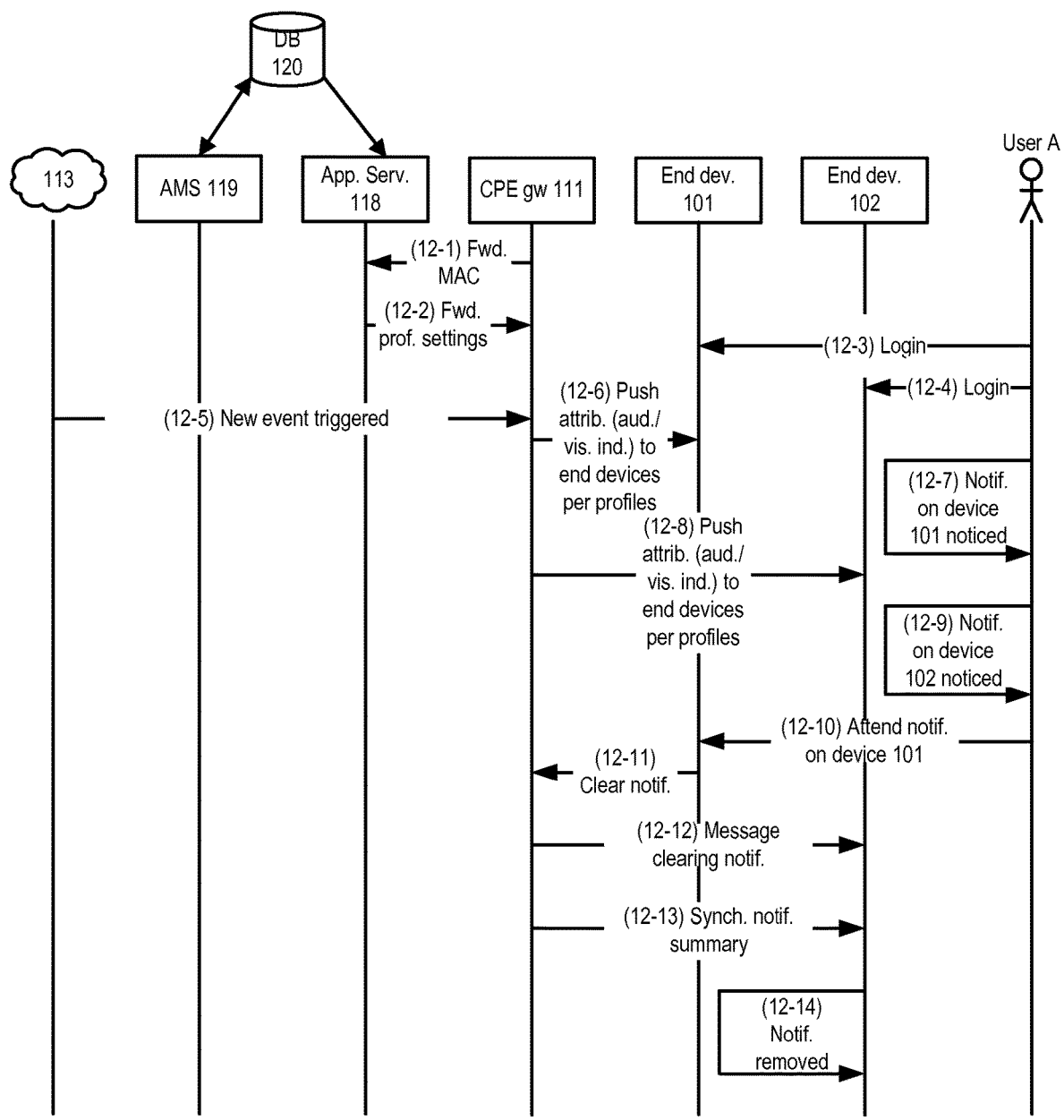
FIG. 12 is a communication diagram showing notifications to multiple devices and synchronization of notification status according to some embodiments.

FIG. 12 is a communication diagram showing notifications to multiple devices and synchronization of notification status. CPE gateway device 111 is booted and forwards identifying information to application server 118 at line 12-1. Application server 118 verifies the identifying information for CPE gateway 111 via AMS 119 and DB 120 (not shown), receives profile information from DB 120 via AMS 119 (also not shown), and forwards profile settings to CPE gateway 111 for users associated with an account linked to CPE gateway 111 at line 12-2. User A logs in with end device 101 at line 12-3 and with end device 102 and line 12-4. At line 12-5 CPE gateway 111 receives a message indicating an event trigger and that references one of the user identities in the user A profile. In some embodiments, the message received by CPE at line 12-5 would come from a CMS or other element in network 100 for a voice call, but would come through application server 118 for other types of services. CPE gateway 111 consults the profile data cached at line 12-2 and determines the appropriate audio and visual indicators, and then causes device 101 to produce a notification using those indicators (line 12-6). User A notices this notification at line 7 but does not yet attend. CPE gateway 111 causes device 102 to produce a notification (using the same indicators) at line 12-8, which user A notices without attending at line 12-9. User A attends the notification on device 102 at line 12-10, resulting in device 102 signaling same to CPE gateway 111 (line 12-11). CPE gateway 111 may also signal application server 118 that the notification has been attended (not shown). CPE gateway 111 then signals device 101 to clear the notification (line 12-12) and synchronizes a notification summary (described below) at device 101 (line 12-13). Device 101 then shows the notification removed (line 12-14). As in previous drawing figures, FIG. 12 does not show other call-set up signaling messages and messages containing voice data that would be transmitted between CPE gateway 111 and a CMS or other network element.

Figure 13:
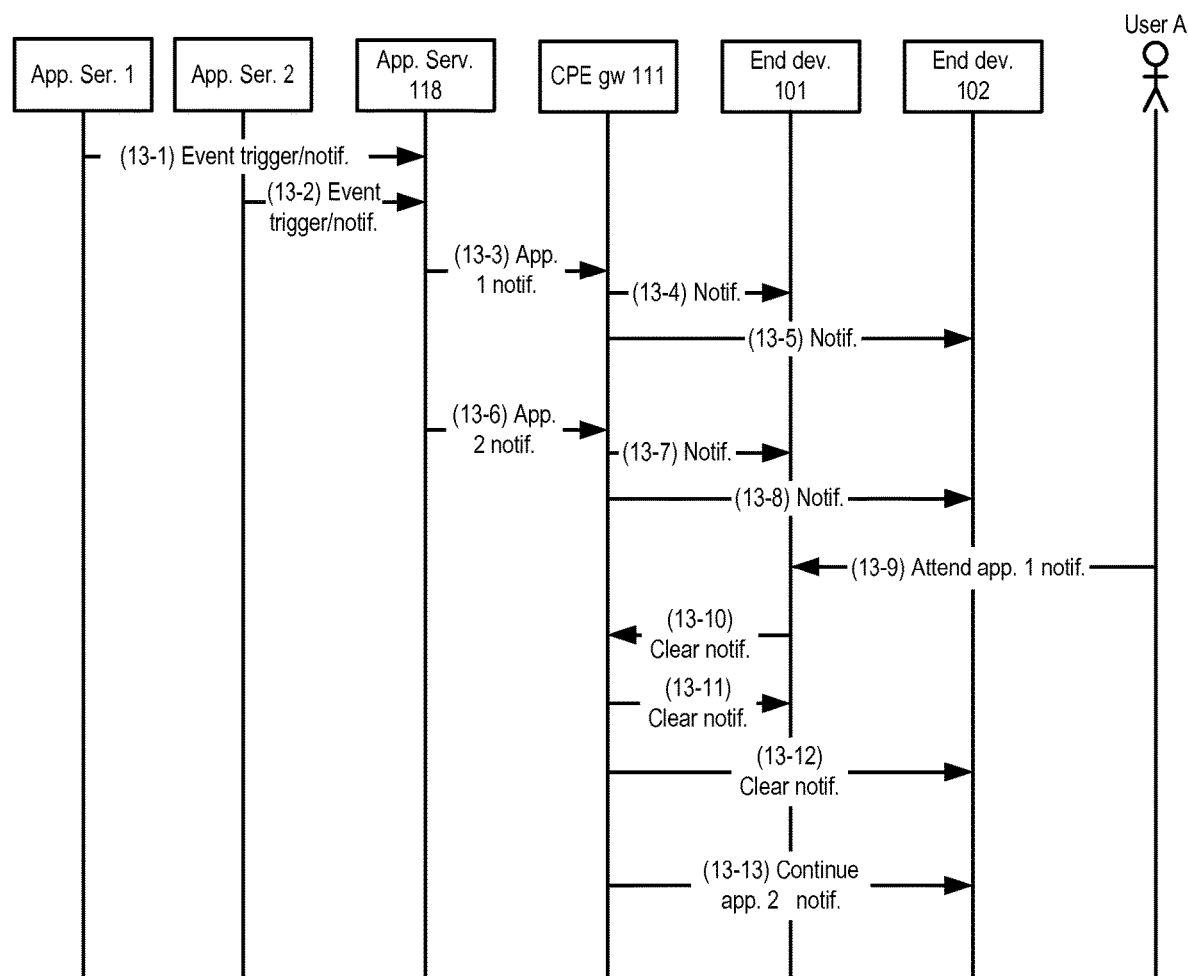
FIG. 13 is a communication diagram showing information flows, according to some embodiments, when identities, services and user profiles are overlaid so as to provide delivery of notifications and content from multiple services to multiple destinations.

In some embodiments, identities, services and user profiles can be overlaid so as to provide delivery of notifications and content from multiple services to multiple destinations. FIG. 13 is a communication diagram showing information flows in one such scenario. The example of FIG. 13 assumes a profile such as is shown in FIG. 2 (e.g., mapping user A to TN1 and the services shown in field 207 of FIG. 2 and specifying notifications to devices 101-104). At line 13-1 application server 118 receives a notification from a first application service (e.g., an email). Application server 118 receives a notification from a second application service at line 13-2 (e.g., a news update for the news service specified in the user A profile). The example of FIG. 13 further assumes that profile information for user A has previously been stored at CPE gateway 111 in a manner such as shown in FIG. 8. In other embodiments, application server 118 could retrieve user A profile information from user profile DB 120 and/or AMS 119 upon receipt of the notifications of lines 13-1 and 13-2. Application server 118 provides the email notification to CPE gateway 111 at line 13-3, whereupon CPE gateway 111 causes devices 101 and 102 to provide email notifications with the appropriate audio and visual indicators for user A (lines 13-4 and 13-5). Notifications would also be provided through devices 103 and 104 if those devices could accommodate such notifications, but devices 103 and 104 are not further discussed in connection with FIG. 13. Application server 118 provides the news notification to CPE gateway 111 at line 13-6, with CPE gateway 111 causing devices 101 and 102 to provide the news notifications with the appropriate audio and visual indicators for user A at lines 13-7 and 13-8. User A attends the email notification on device 101 at line 13-9. This is forwarded to CPE gateway 111 (lines 13-10), which clears the email notification (lines 13-11 and 13-12) and continues the news notification (line 13-13). If user A discontinues use of device 101 before the news notification is attended, CPE gateway would then cause device 101 to resume the news notification.

Various features in some embodiments offer multiple advantages over many pre-existing systems. In many existing systems where users might wish to receive notifications at multiple end devices from multiple sources, delivery mechanisms are specific to the service and to the device. In such systems, notifications are often not synchronized or coordinated. For example, one end device may receive a notification long after that notification has been received by and attended on a different end device. As another example, a notification may be simultaneously received at two end devices, but will continue to show on one of those devices after being attended on the other of those devices. As yet another example, a user receiving multiple notifications from multiple different sources may be forced to separately retrieve information about notifications from each of those sources and/or be forced to individually configure notification preferences using a separate interface and/or connection for each source. By consolidating notifications at the network level and forwarding those notifications according to a user profile maintained at the network level, these and other concerns can be addressed.

In some embodiments, each user can access a user-specific notification summary GUI to obtain information about all pending notifications. In some embodiments, and as discussed below, that summary GUI will provide a consolidated and scrollable summary of pending alerts with links to obtain additional information about each notification. Because the alert summary is generated at each end device from information maintained in a consolidated form at the network level, attending a notification on one end device will cause the notification summary to be appropriately updated if accessed from any other end device. As with other aspects of the manner in which network services are provided, a user can configure his or her notification summary, with such configuration information being maintained in the user's profile.

As indicated above, a user can configure a profile to specify the types of notifications that the user wishes to receive and/or the devices to which certain types of notifications should be provided. A user could similarly configure a notification summary to include information about certain types of notifications but not include information about others.

In some embodiments, a user can also configure a profile to control numerous other aspects of the manner in which notifications are provided and the manner in which such notifications are reflected in a notification summary For example, a user can configure a profile so that notifications and/or notification summaries are prioritized based on class or type of notification (e.g., the service instantiating the notification, whether the notification is of a new call or message), based on state of the notification (e.g., the number of unread emails referenced in an email notification), the level of notification intensity, the staleness of the notification (e.g., the time since the notification was initially provided), the current activities of the user, etc. A profile could also be configured to provide a cursory level view of notifications and/or indications of whether notifications have been attended.

In some embodiments, the severity of a notification will be set by the provider or initiator of the event causing the notification, but a user may be able to override such severity settings for some or all notifications (e.g., all non-emergency notifications). In some embodiments, emergency notifications may be accompanied by a specific audio and/or visual indicator even if a user has configured his or her profile to not provide any audio or visual notifications.

Figure 14:
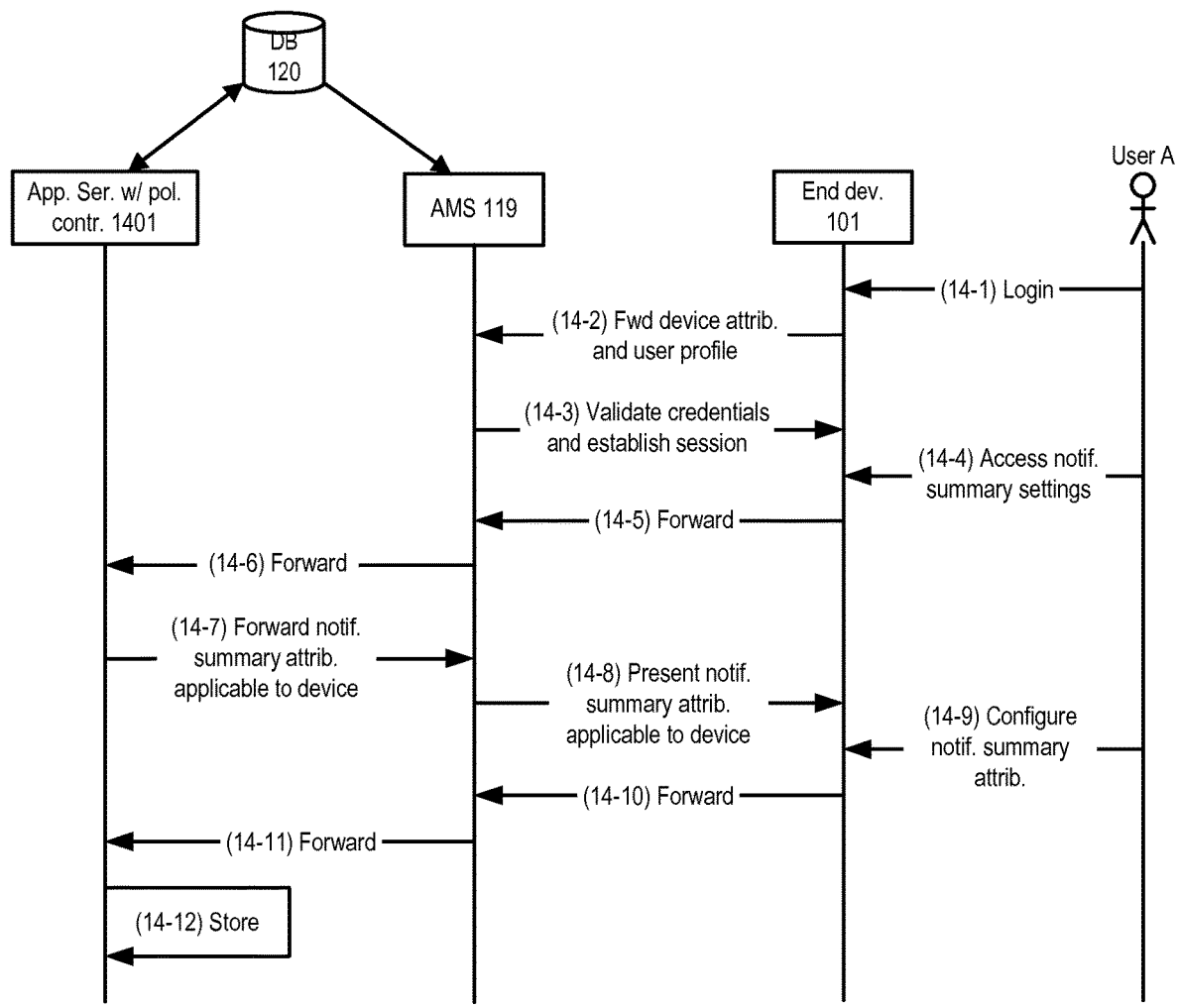
FIG. 14 is a communication diagram showing user configuration of notification summary attributes according to some embodiments.

FIG. 14 is a communication diagram showing user configuration of notification summary attributes. The user logs in using end device 101 at line 15-1. This is forwarded to AMS 119 via CPE gateway 111 (not shown) at line 14-2. The user credentials are validated by AMS 119 and a profile configuration session established (line 14-3). The user then accesses the notification summary settings in the profile configuration session (line 14-4), which access request is forwarded to AMS 119 (line 14-5) and to an application server with policy control 1401 (line 14-6). Application server with policy control 1401, which could be the same as application server 118 (FIG. 1) or could be a separate server, implements policies specified by the user profile. At line 14-7, notification summary attributes for the user are forwarded to AMS 119, which then provides those attributes through the profile configuration session GUI to device 101 at line 14-8. The user makes changes to the notification summary attributes at line 14-9, which are forwarded to AMS 119 at line 14-10, and to application server with policy control 1401 at line 14-11. At line 14-12, the attributes are stored. In some embodiments, modification of notification summary aspects of a user profile is completely conducted by AMS 119, with AMS storing any modifications in DB 120, and with application server 118 or application server 1401 then accessing the modifications.

Figure 15:
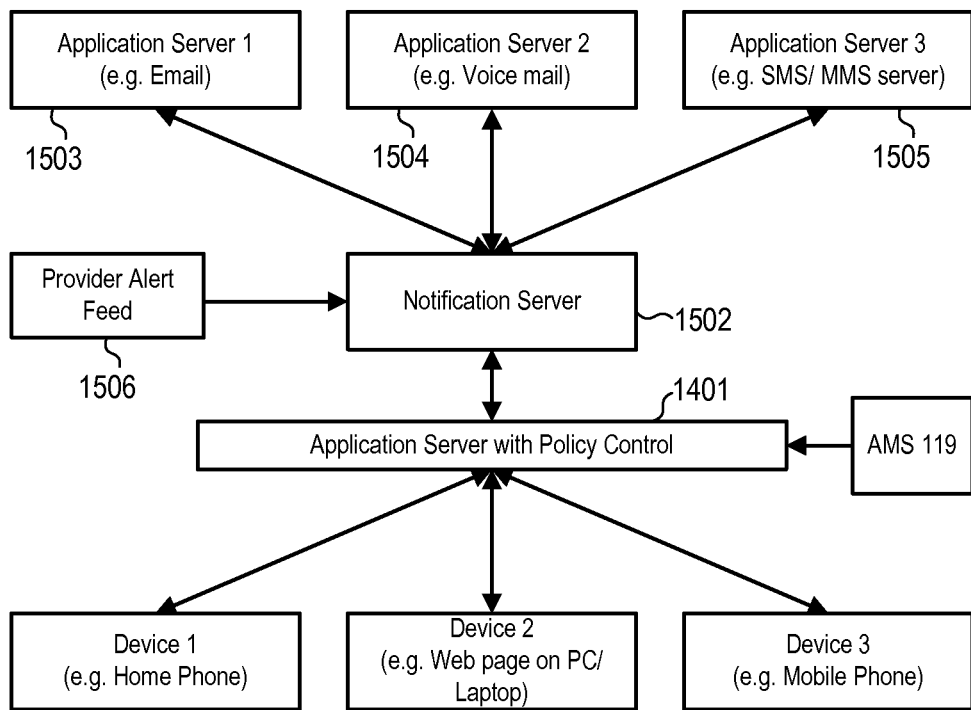
FIG. 15 shows architectural elements of a network implementing notifications and notification summaries according to some embodiments.

FIG. 15 shows architectural elements of network 100 implementing notifications and notification summaries according to some embodiments. Application server with policy control 1401, which may be part of application server 118 of FIG. 1 or a separate server, controls the notification system of network 100 so as to deliver notifications to end devices in accordance with appropriate profile data. Server 1401 also provides the notification summary GUI to end devices via, e.g., WML. Additional aspects of the notification summary GUI are provided below. Notification server 1502, which may also be a part of application server 118 from FIG. 1 (e.g., a separate set of programming routines in server 118) or a separate server, consolidates notifications from multiple servers and provides them to application server 1401. Notification server 1502 also receives status updates for notifications from end devices and forwards messages to upstream network elements to modify the status of notifications so as to synchronize notifications. Such synchronization can be performed by a push or pull model. In a pull model, a notification summary is updated from the network whenever an end device initiates the notification summary GUI. In a pull model, notification server 1502 pushes changes to end devices whenever any notification state is changed. Application servers 1503, 1504 and 1505 are in the network cloud 113 of FIG. 1, and represent servers that initiate various types of notifications. Server 1503 is an email server, server 1504 is a voice mail server, and server 1505 is an SMS/MMS server. Provider alert feed 1406 pushes notifications to end devices from the operator of network 100. Notifications from alert feed 1506 could include emergency messages, advertisements, etc.

End devices can be configured to display notifications and the notification summary GUI. In some embodiments, data caching at the end devices or a CPE gateway can be employed to reduce bandwidth consumption. In some embodiments, notification data will not be stored on an end device, but some end devices can be configured (either directly or through a profile) to store notification information. Notification information stored on an end device might not synchronized, however. End devices in some embodiments may implement a client application to receive and display notifications from application server 1401 and to send the actions/commands related to those notifications so that such notifications can be updated in network 100 and synchronized across devices.

In some embodiments, each of application server 1401, AMS 119, notification server 1502 and end device clients can be implemented as software services in a component based model for easy portability across platforms and devices.

End device client applications may connect to application server 1401 using any of various messaging protocols, and can be implemented as a browser-based application. Other types of display applications could be used, however. Indeed, notifications could be conveyed through end devices in a variety of different manners. As but one example, various available operating systems provide functions and APIs to deliver messages to multiple clients. In some embodiments, application server 1401 can support the server functionality to deliver notifications to multiple clients by using OS-specific messaging methods. As another example, notifications can be delivered to multiple clients by implementing a standard set of protocols between application server 1401 and end devices using application level protocols. Each end device provides a unique interface and a protocol suite for receiving notifications and sending commands via a reverse path to an application server in the upstream network. For example, a notification summary screen can be delivered to an end device using protocols such as WML to DECT hand sets or mobile phones, an OCAP based transaction model to deliver to a STT and a client-server model to deliver to PC soft phones, etc. As yet another example, component based models (e.g., JAVA DCOM or MICROSOFT .NET) could also be used. Distributed components could expose interfaces as web services (e.g., SOAP/XML) and notifications could be delivered via such interfaces.

Simple Network Management Protocol (SNMP) provides options for delivering alerts and traps to a Network Management Server via a standard interface between the SNMP agent and the server. In some embodiments, notification server 1502 can be configured as an SNMP management server and application servers configured as SNMP agents. Notification server 1502 would receive notifications from each application server and deliver those notifications to application server 1401 for policy update before delivery to end devices. Application server 1401 applies policies and acts as a proxy to forward notifications to end devices. Application server 1401 could be configured as a management server and use SNMP PUT methods to deliver the notifications to each end device. Notifications could be implemented as SNMP OID trees for management by notification server 1502 and application server 1401.

Figure 16:
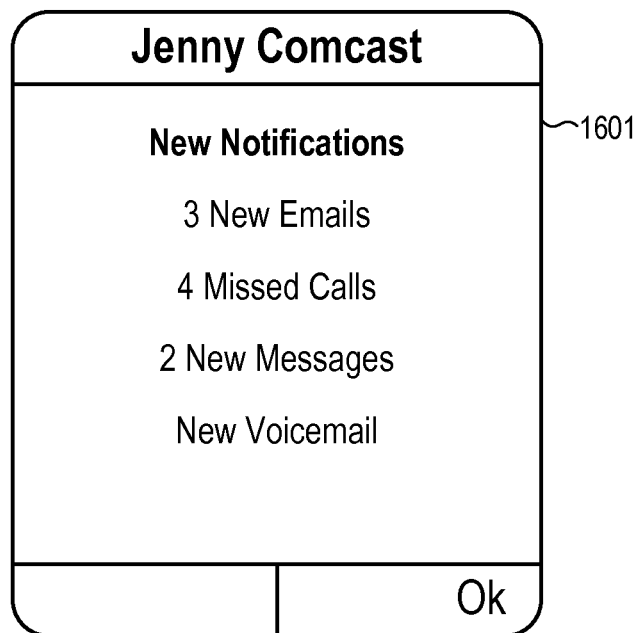
FIG. 16 shows a notification summary GUI according to some embodiments.

FIG. 16 shows a notification summary GUI 1601 that could be presented on, e.g., end device 101 according to some embodiments. In the example of FIG. 16, the user has three new emails, four missed calls, two new IM messages, and a new voicemail. By selecting a hyperlink on the line entry for new emails, the user is provided with a subsequent GUI for retrieving and viewing those emails. If there are more unread emails than can be displayed on a single screen, the subsequent GUI may be scrollable so that the user can choose which email(s) to open. In a similar manner, selecting a hyperlink on the line entry for missed calls may provide a list of calls (which list could also be scrollable if necessary). Selecting a hyperlink on the line entry for new messages leads to a scrollable GUI with those new messages. Selecting a new voicemail hyperlink could cause any pending voicemails to be played in sequence and/or could provide a list of such voicemails (e.g., identified by calling number and time). If there were additional types notifications (e.g., notifications of available news updates, a notification that there is a new daily horoscope available, etc.), GUI 1601 could itself be scrollable.

Figure 17:
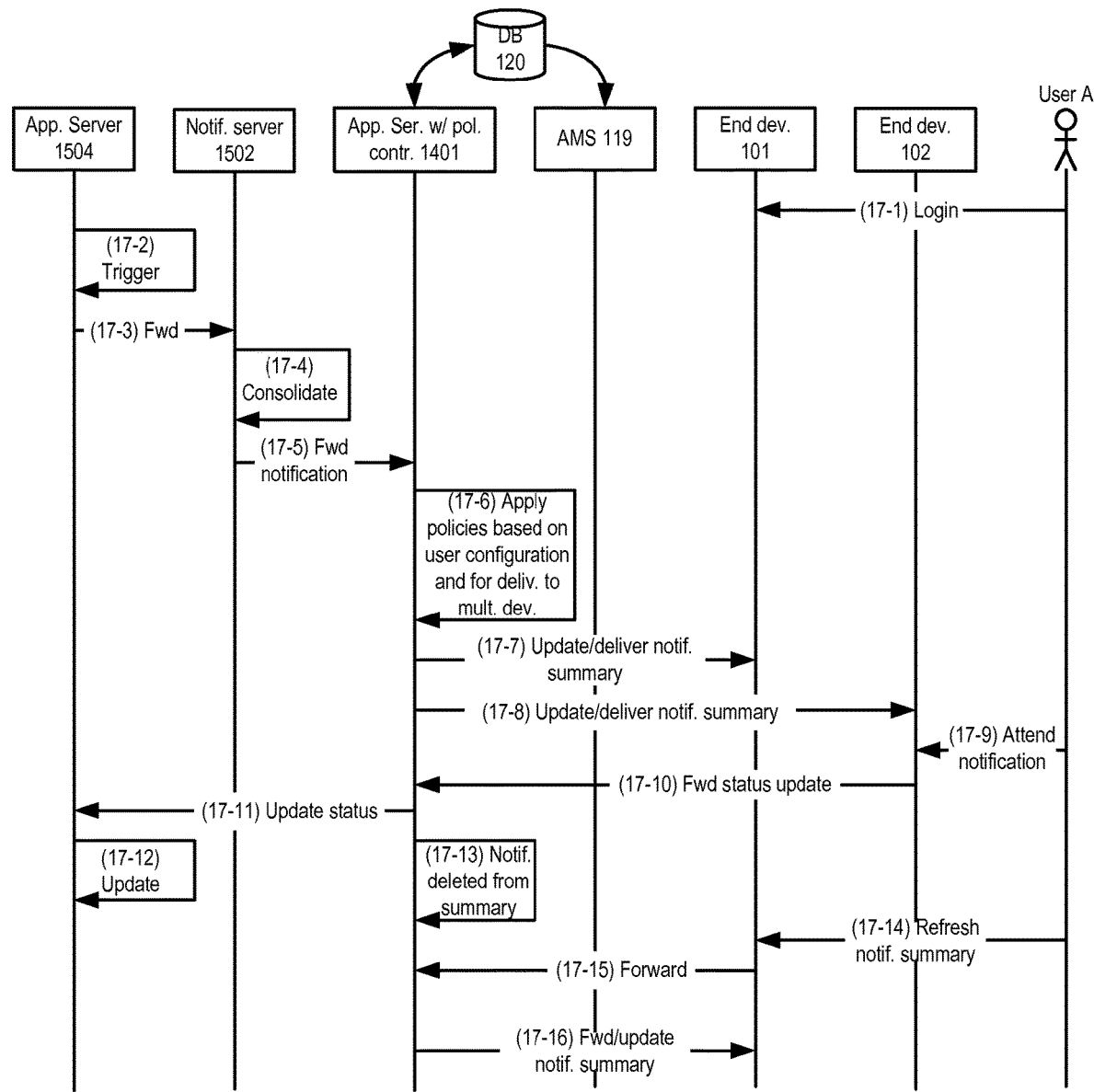
FIG. 17 is a communication diagram showing delivery and synchronization of notifications across devices according to some embodiments.

FIG. 17 is a communication diagram showing delivery and synchronization of notifications across devices. User A logs in using end device 101 at line 17-1. Application server 1504 triggers a new notification at line 17-2 and forwards the notification to alert notification server 1502 at line 17-3. Alert notification server 1502 consolidates the notification with other notifications (if any) at line 17-4 and then forwards the consolidated notifications to application server 1401 at line 17-5. Application server 1401 then applies user A policies to configure a notification summary for delivery to end devices 101 and 102. A notification summary (that includes the notification from line 17-3) is then delivered to end devices 101 and 102 via CPE gateway 111 (not shown)

at lines 17-7 and 17-8. User A attends the notification in the notification summary at line 17-9, which results in device 102 transmitting a notification status update that is forwarded to application server 1401 (line 17-10). Application server 1401 then updates server 1504 as to the status of that notification (line 17-11). Server 1504 updates the notification status at line 17-12. At about the same time, application server 1401 deletes the just attended notification from the notification summary At line 17-14, user A refreshes the notification summary on end device 101, which then forwards a request for an updated summary to application server 1401 at line 17-15. Application server 1401 forwards the updated notification summary (which does not include the notification just deleted at line 17-13) at line 17-16.

Notifications can take many forms. In addition to the notification formats described above (e.g., audio and visual indicator, pop-up messages, etc.), notifications could be in the form of a hyperlink added to a web page, text added to a region of a television screen (e.g., if the television is connected to a STT), audio and/or visual indicators presented through a portable media player or during a game played on a game console or on a computer, etc.

In some embodiments, after a user attends a notification by taking appropriate action (e.g., listening to a voice mail, retrieving a new message, acknowledging a new call or message without responding, etc.), the notification is removed from the notification summary and the next highest priority notification is displayed.

As previously indicated above, an operator of network 100 may assign multiple TNs to a particular account. For example, the network 100 operator might assign 5 separate TNs to the account associated with premises 110. Each of those TNs can be linked to a particular user in that user's profile, and one of the TNs can be designated as a default TN. In some implementations of the embodiment of FIG. 1 and of other embodiments described herein, telephony service is VoIP and is provided to a premises over an HFC plant. In theory, the number of simultaneous calls that can be conducted by end devices at a particular premises using separate TNs is only limited by network bandwidth. In some cases, however, a particular premises may be limited to a number of simultaneous voice calls that is less than the total number of TNs assigned to the account for that premises.

In some embodiments, the default TN is assigned to the primary user, and the remaining TNs for an account are individually assigned to other users. As previously discussed, such TN assignment can be performed by making appropriate entries in each user's profile. In the absence of other profile restrictions (e.g., in the absence of a primary user preventing some users from making calls on some TNs), any user can make a call using any TN. If a user logs in to a device, calls by the user will by default employ that user's TN. If that user's TN is already in use, the user can select another TN not in use. If a person makes a call on a device without having logged in (and assuming no other users have logged in on that device), the default TN will be used if the default TN is available. The following are examples of potential use cases according to some such embodiments:

Use Case 1: A user has not logged into the system and the default TN is available for use. The user makes the call using the default TN.

Use Case 2: A user logs into an end device with his or her credentials. The user's TN is available for making a call and will be used for making calls.

Use Case 3: A user logs into an end device with his or her credentials. The user's TN is in use. There are fewer calls in progress than the maximum number of simultaneous calls allowed from CPE gateway 111. The user selects any one of the available TNs for making the call. Even though the available TN and line is used for making a call, the logged-in user's profile name and attributes are used for making the call for recording and notification.

Use Case 4: A user logs into an end device with his or her credentials. The user's TN is in use; if all lines are in use, the user will not be able to make any call from his profile name A user may also be permitted to join ("barge-in") an ongoing call. In particular, a logged in user can join other ongoing and active call sessions routed from a common CPE gateway by selecting a session. The session can be displayed for a group based on a user profile or a TN for a group of users. A user can select an ongoing call from a displayed list of active sessions and will be allowed to join if any necessary approvals are obtained and any applicable control rules (e.g., restrictions in a user profile regarding barge-in to certain TNs) are satisfied. The number of users participating in a single session is in some embodiments only limited by the number of physical channels connecting a CPE gateway with end devices, and is not dependent in the number of user profiles associated with that CPE gateway. A user can select an ongoing call from a variety of groups, such as a list of user profiles in a family or other community of users associated with an account, a list of user profiles in a buddy list, and a list of user profiles in a social network.

Figure 18:
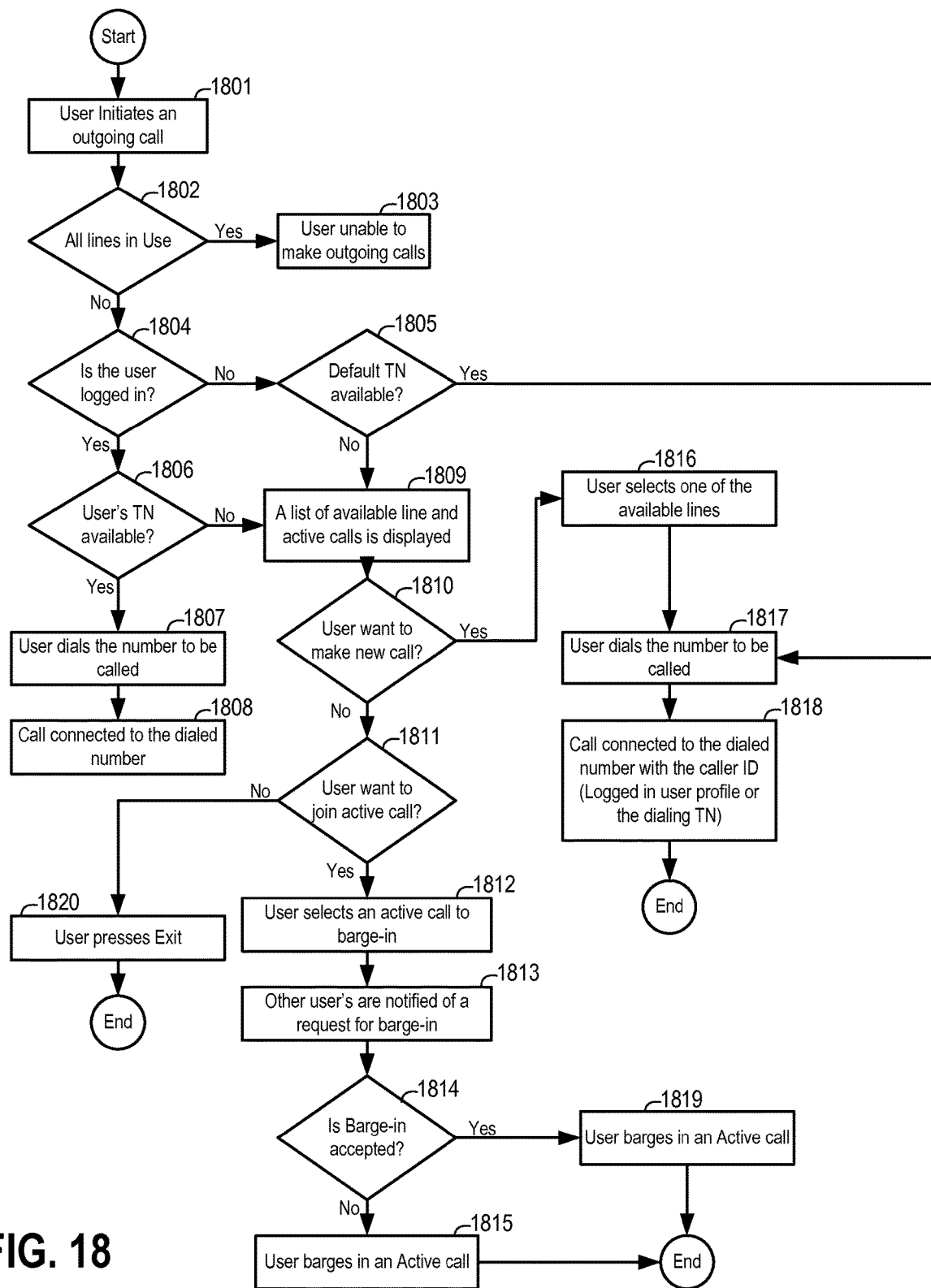
FIG. 18 is a flow chart showing events and operations performed as part of telephone number selection and/or barge-in according to some embodiments.

FIG. 18 is a flow chart showing events and operations performed as part of call selection and/or barge-in according to some embodiments. At block 1801, user A attempts to initiate an outgoing call with end device 101 by, e.g., touching the display screen 505 or pressing an appropriate button. At block 1802, a determination is made whether all TNs for the premises 110 account are in use. This determination can be made in CPE gateway 111. If all TNs are in use, user A is unable to make an outgoing call ("yes" branch to block 1803). If all TNs are not in use, flow proceeds on the "no" branch to block 1804, and it is determined whether a user is logged in to end device 101. The determination of block 1804 can similarly be made in CPE gateway 111. If a user is logged in, flow proceeds on the "yes" branch to block 1806. Note that the logged in user could be user A or could be another user. In block 1806, CPE gateway 111 determines if the TN of the logged in user is available. If not, flow proceeds to block 1809, which block is described below. Otherwise, flow proceeds to block 1807, where CPE gateway 111 causes end device 101 to indicate that the login user's TN is available, and user A dials the number to be called. The call is connected via CPE gateway 111 and upstream network elements at block 1808.

Figure 19:
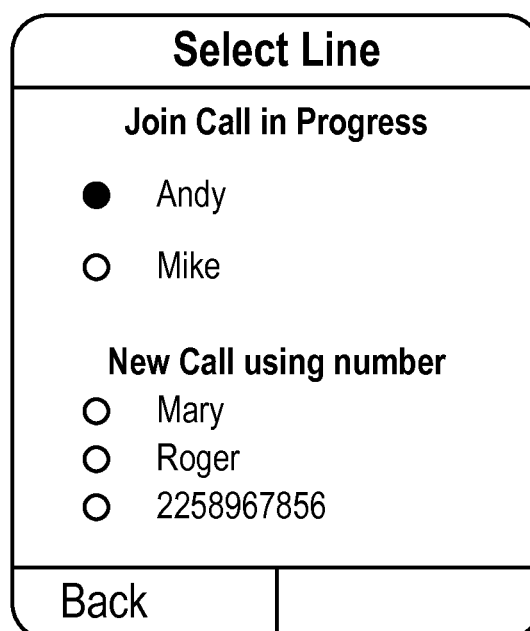
FIG. 19 is an example of a displayed list of available TNs and active calls according to some embodiments.

Returning to block 1804, if a user is not logged in, flow proceeds to block 1805 on the "no" branch. CPE gateway 111 then determines in block 1805 if the default TN is available. If so, CPE gateway 111 causes said availability to be indicated on end device 101, and user A dials the called TN at block 1817. The call is then connected in block 1818. If at block 1805 CPE gateway 111 determines that the default TN is not available, flow proceeds on the "no" branch to block 1809. At block 1809 CPE gateway 111 causes end device 101 to display a list of available TNs and active calls. An example of such a display is shown in FIG. 19. Flow then proceeds to block 1810. If user A wants to make a new call, flow proceeds on the "yes" branch to block 1816, where user A selects one of the available TNs by providing appropriate user input to end device 101. Flow then proceeds to block 1817, where the number is dialed. If at block 1810 user A does not want to make a new call, flow proceeds to block 1811. If user A does not want to join one of the active calls, flow proceeds to block 1820 and user A presses "exit." If user A does want to join an active call, an appropriate input to select an active call is provided at block 1812. In block 1813, CPE gateway 111 notifies other users on the call of user A's request to barge-in. If the barge-in is accepted (block 1814), flow proceeds to block 1819, where user A is added to the active call session. Otherwise, flow proceeds to block 1815, where CPE gateway 111 causes end device 101 to indicate that user A's barge-in request is denied.

In some embodiments, participants in an ongoing call are not provided with an opportunity to accept or reject a barge in request. In some such embodiments, a user is allowed to barge-in an ongoing call on a given TN unless there is data in that user's profile that restricts the user from barging into a call on that TN. When a user does barge-in, however, other participants in the call may be provided a with a beep or other indication that a user has joined.

In the operations described above in connection with FIG. 18, determinations and other operations performed by CPE gateway 111 in blocks 1802, 1804, 1805, 1806, 1810, 1811 and 1814 could alternately be made in another network element (e.g., application server 118 or some other network element).

When a call is made by a logged in user, the name and attributes from the logged in user's profile may be used for calling records. As indicated above, profiles can also be used to control which users may use which lines. For example, a primary user may wish to configure profiles of some secondary users to prevent those secondary user from initiating calls on certain TNs. Similarly, the profiles of some users could be configured to prevent those users from barge-in on calls on certain TNs.

In some embodiments, the TN selection and barge-in features described above are also available for other types of services. For example, a first user may allow other users to send messages or emails using the first user's email or IM identity, may allow other users to join a multi-user IM session, etc.

Figure 20:
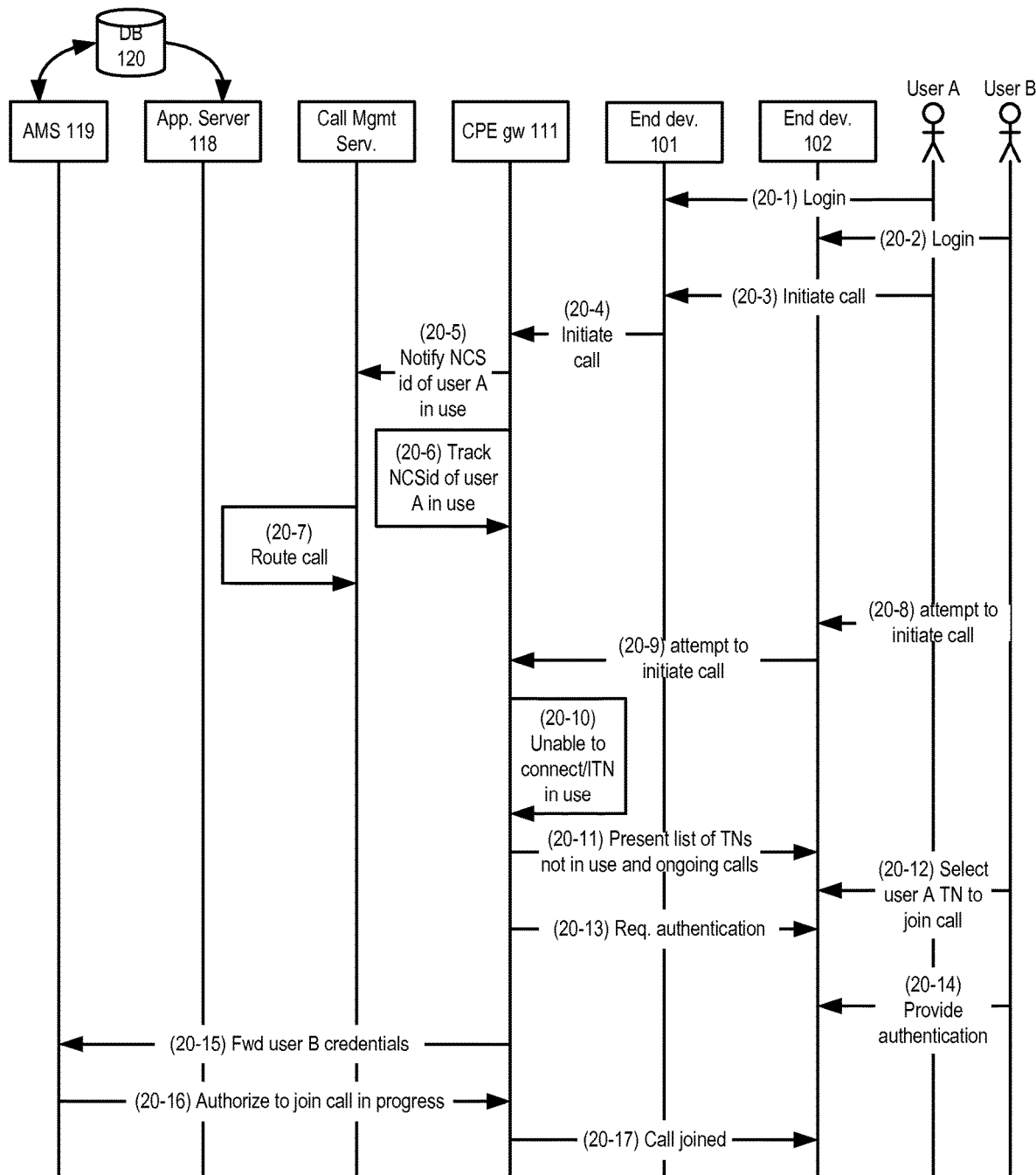
FIG. 20 is a communication diagram showing barge-in notifications across devices according to some embodiments.

FIG. 20 is a communication diagram showing barge-in notifications across devices. Users A and B login using devices 101 and 102, respectively, at lines 20-1 and 20-2. User A then initiates an outbound call using the TN of user A at line 20-3, which call initiation is forwarded via CPE gateway 111 at line 21-4 to a call management server (within network cloud 113 of FIG. 1) at line 20-5. CPE gateway 111 also tracks the session ID (e.g., a NCS ID) for the call (line 20-6). The call management server routes the call (line 20-7). The remaining steps of the call set up are not shown.

User B attempts at line 20-8 to initiate an outgoing call on device 102. Device 102 forwards a message to CPE gateway 111 indicating that user B wishes to make a call (line 20-9). At line 20-10, CPE gateway 111 determines that user B's TN (i.e., the TN mapped to user B in the user B profile) is already in use. CPE gateway 111 then causes device 102 to generate a display on device 102, similar to that of FIG. 19, indicating the TNs for which a call is in progress and the TNs which are available (line 20-11). At line 20-12 user B provides input to device 102 indicating a selection of the ongoing call on user B's TN (i.e., the call initiated by user A at line 20-3). After receiving an indication from device 102 of this selection by user B (not shown in FIG. 20), CPE gateway 111 forwards a request to device 102 requesting authentication to join the call (line 20-13). User A may, for example have restricted certain users from barge-in to calls on user A's TN. User B provides his or her username and password at line 20-14. This could be required, for example, as a precaution in case another user picks up device 102 after user B logged in. After user B's credentials are forwarded to CPE gateway 111 (not shown in FIG. 20), CPE gateway 111 forwards same to AMS 119 at line 20-15. After determining user B is authorized to barge in, AMS 119 returns an authorization to CPE gateway 111 at line 20-16, which then permits the barge-in at line 20-17. In some embodiments, the verification and authorization performed by AMS 119 in FIG. 20 could instead be performed by application server 118.

The call flow of FIG. 20 is extensible to other services, including but not limited to data services, messaging services, video services, etc.

FIG. 21 shows a table that maps various types of information regarding TNs and users associated with a subscriber account that corresponds to a particular CPE gateway. The table of FIG. 21 is generated by application server 118 (or another network element) from profile data in DB 120, and pushed to CPE gateway 111 when CPE gateway 111 is provisioned or reboots, in embodiments that employ NCS signaling. NCS signaling is known in the art and described, e.g., in various PACKETCABLE specifications available from Cable Television Laboratories, Inc. of Louisville, Colo. Accordingly, details of NCS signaling are not included herein. A first column 2101 has fields that hold an identifier for a subscriber account. The second column 2102 has fields that each holds a NCS ID (a NCS identifier for a call session) to be mapped to a TN. The third column 2103 has fields holding TNs. Each field in column 2104 indicates whether a TN is a default TN. Each field in column 2105 holds a nickname or other alternate name that a user mapped to a TN may wish to see when information about that TN is shown on an end device. Each field in column 2106 holds the user name of a user mapped to a particular TN. The user name may be the same as or different than the nickname in column 2104. For example, a user may have a user name such as "Bob12345678" and a nickname of "Bob." Each field in column 2107 holds a globally unique identifier assigned by the operator of network 100 to a particular TN. The fields in column 2108 indicate whether a user is logged in.

CPE gateway 111 uses data in the table of FIG. 21 to determine which TNs are available. Once a TN is selected from an end device, any outgoing call from that end device will use the selected TN until the user terminates the session. Once the session is terminated, the TN again becomes free for reselection according to any profile-defined rules. CPE gateway 111 registers its MAC address and FQDN with application server 118 at provisioning or reboot. Application server 118 also receives the IP address of CPE gateway 111 through the registration process. Application server 111 uses that IP address to communicate with CPE gateway 111. Application server 118 sends the NCS table to CPE gateway 111 and updates the table as required based on profile changes. In some embodiments, for example, application server 118 may provide APIs for updating the NCS ID table with the attributes TN, profile display name and NCS ID. Application server 118 may also provide a web service interface with the provisioning system to determine the mapping of NCS ID to TN and map TN to profile name FIG. 22 is a table that is generated and pushed to CPE gateway 111 in embodiments that employ Session Initiation Protocol (SIP) signaling for call set up. The table of FIG. 22 may similarly be created by application server 118 or other element of network 100 from profile data in DB 120. In SIP-based communication, end devices may be addressed by a Uniform Resource Identifier (URI) to establish communication. The end device may have IP connectivity and be able to negotiate all capabilities to set up a session using SIP messages. In such embodiments, a user is allocated one or more Public User Identities by the network 100 operator. A Public User Identity may be either a SIP URI or a TEL URI. The Public User Identities can be used for routing the SIP signaling messages. Each user may also be assigned a Private User Identity, which is not a SIP URI and is not used for routing SIP requests, but is used for profile, login and authentication, and other purposes within network 100.

As can be FIG. 22, the table maps private user identities to public user identities, TNs and call preferences (e.g., call forwarding and other IMS preferences). Each user can be provisioned with a profile mapping the Private User Identity, the Public User Identity, a TN and personal preferences. In a specific case, the Public User Identity can be mapped to a TN itself and may be a sub use case of mapping between identities and TNs.

The profile mapping can be carried out during a service provisioning stage and can be pushed to CPE gateway 111. When end devices and TNs are shared across a group of users, the Private User Identities can be used for profile login and authentication. Public User Identities can be used to select an outgoing line/TN or URI for SIP signaling. In this way, any user can use any of the available Public User Identities to make an outgoing call.

If a particular user is permitted to use a particular Public User Identity, SIP headers can be appropriately modified to include this address as the "From" address to initiate a session.

Figure 23A:
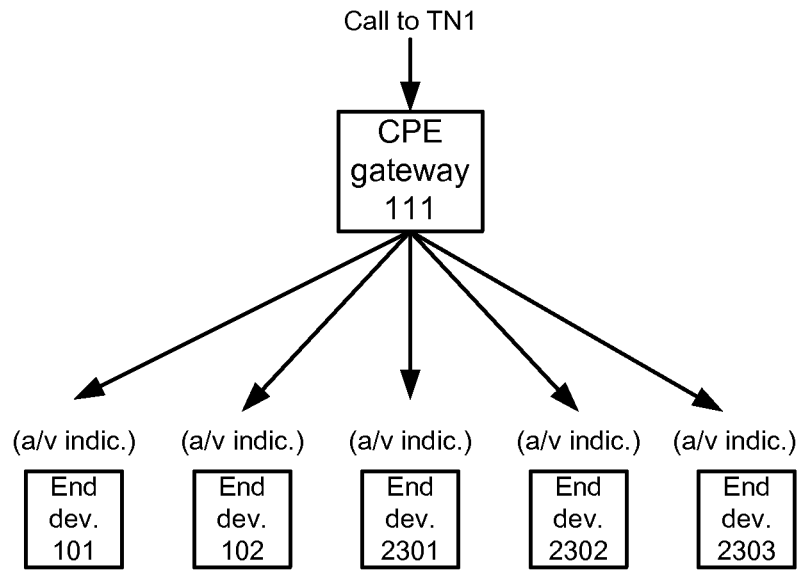
FIGS. 23A-23F show examples, according to some embodiments, of notifications in connection with multiple events and/or sessions.
Figure 23B:
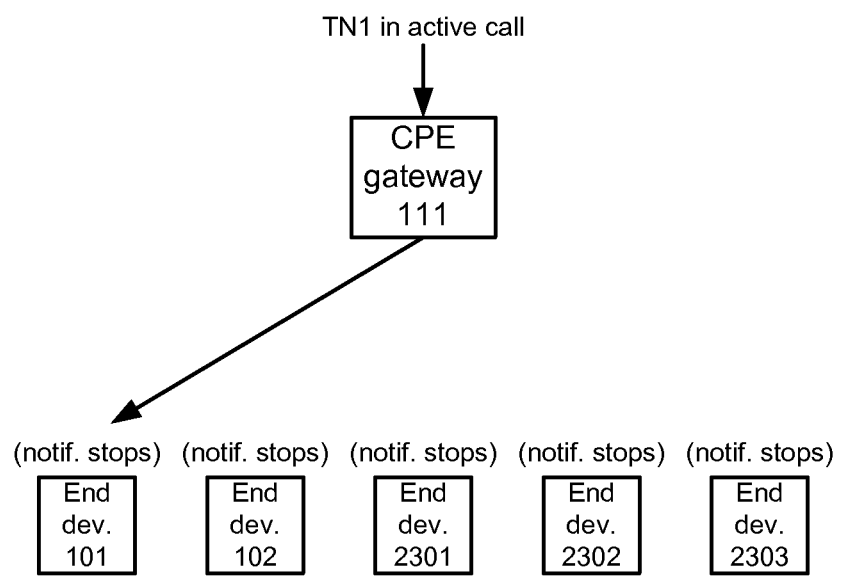

A profile-based system according to various embodiments allows simultaneous sessions when multiple calls are received for the same or for different users. For example, FIG. 23A shows an incoming call to TN1 received at CPE gateway 111. Devices 101 and 102 are idle, as are additional DECT handset devices 2301, 2302 and 2303. It is assumed for purposes of FIGS. 23A through 24F that devices 101, 102, 2301, 2302 and 2303 are mapped to users A, B and C in their respective profiles and that each user can thus receive notifications and calls (as well as other services) through any of devices 101, 102, 2301, 2302 and 2303. It is further assumed the TN1 is the number for user A (i.e., is mapped to user A in the user A profile). Because all of end devices 101, 102, 2301, 2302 and 2303 are idle in the example of FIG. 23A, CPE gateway 111 causes notifications (e.g., ring tone and visual indicator mapped to user A in the user A profile) of the incoming call to TN1 to be provided on each of those end devices. When user A attends the notification by answering the call on device 101, and as shown in FIG. 23B, all of the end devices stop ringing (i.e., CPE gateway 111 stops the notifications on all of the end devices).

Figure 23C:
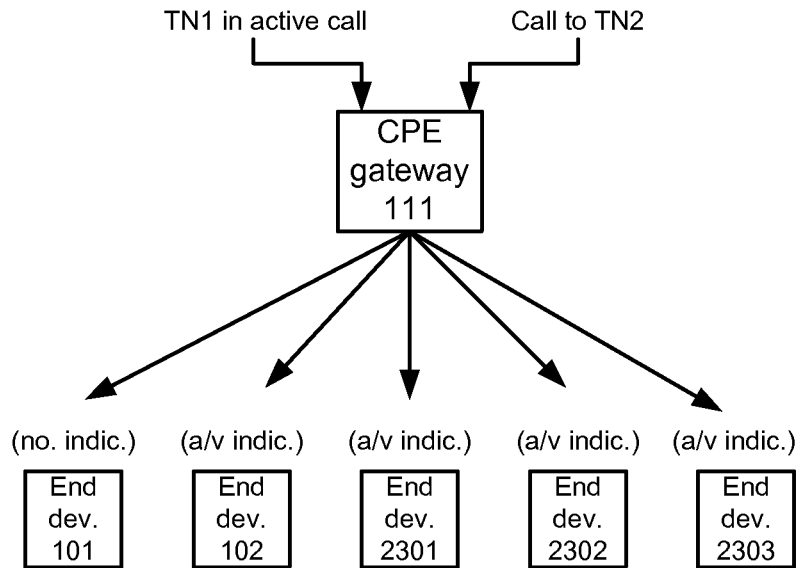

FIG. 23C shows an incoming call to TN2 while user A is still engaged in the call on device 101. The example of FIGS. 23A-23F further assume that TN2 is mapped to user B in the user B profile. Because user A is engaged in an active call, CPE gateway 111 does not cause device 101 to ring or otherwise provide a notification of the incoming call to TN2, but does cause a remaining devices 102, 2301, 2302 and 2303 to provide a notification using the audio and/or visual indicators from the user B profile.

Figure 23D:
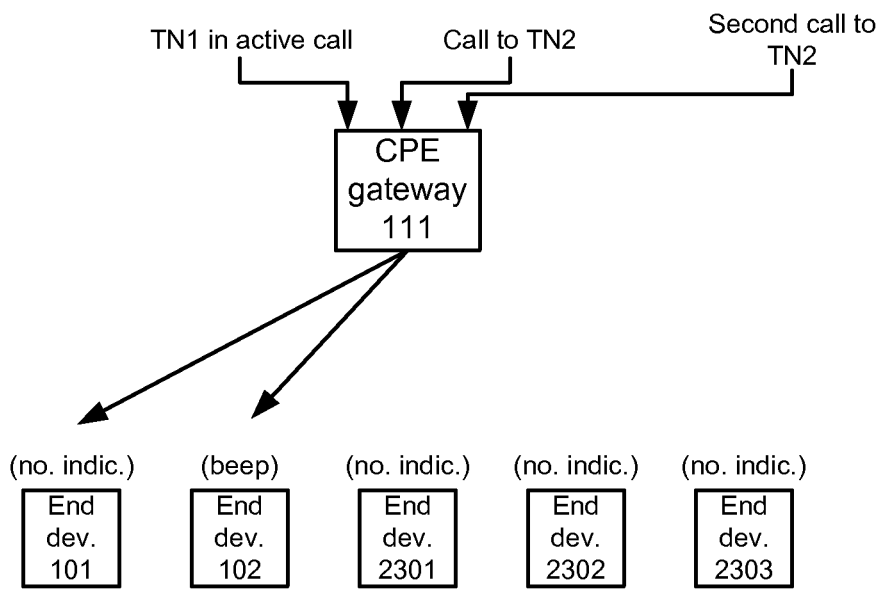
Figure 24A:
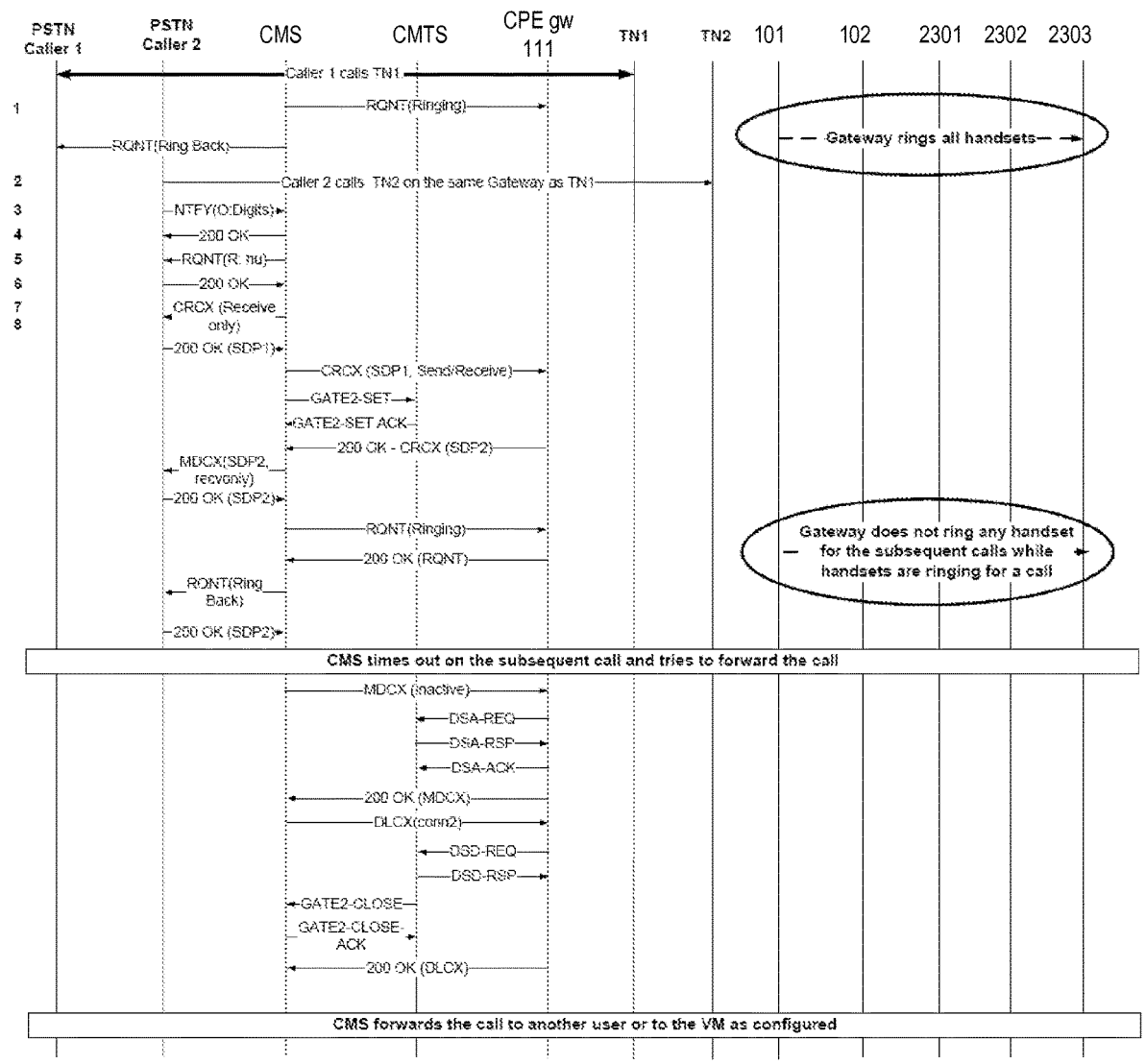
Figure 24C:
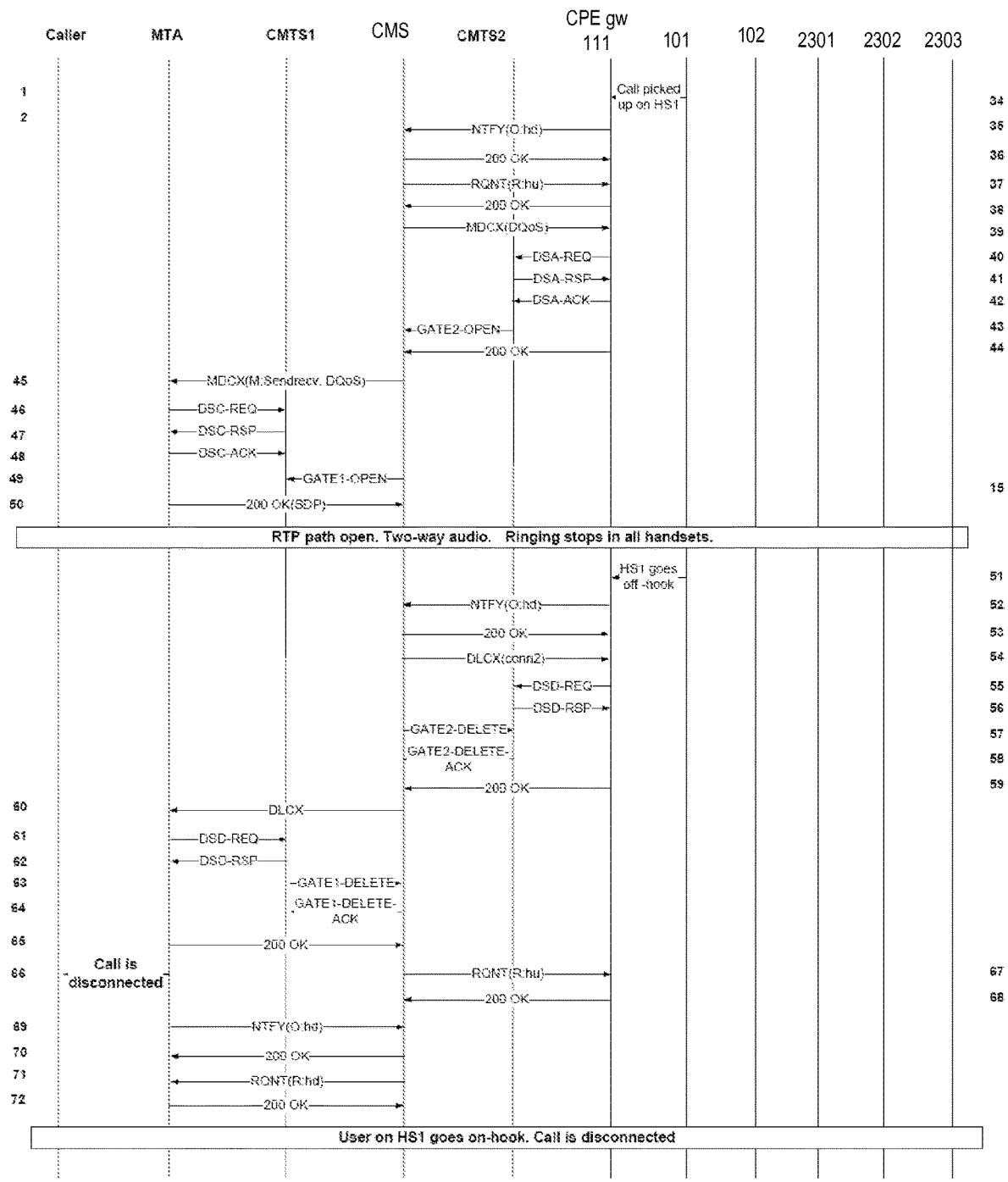

FIG. 23D shows CPE gateway 111 receiving another call for user B while the calls described in FIGS. 24A-24C are still ongoing. The second call for user B could be to another TN that is also mapped to user B in the user B profile, or could be another call to TN2. Because CPE gateway 111 knows that user B is already engaged in a call on device 102, it does not cause notifications of the second call to be provided on devices 102, 2301, 2302 or 2303. However, a call waiting tone is played for user B in device 102.

Figure 23E:
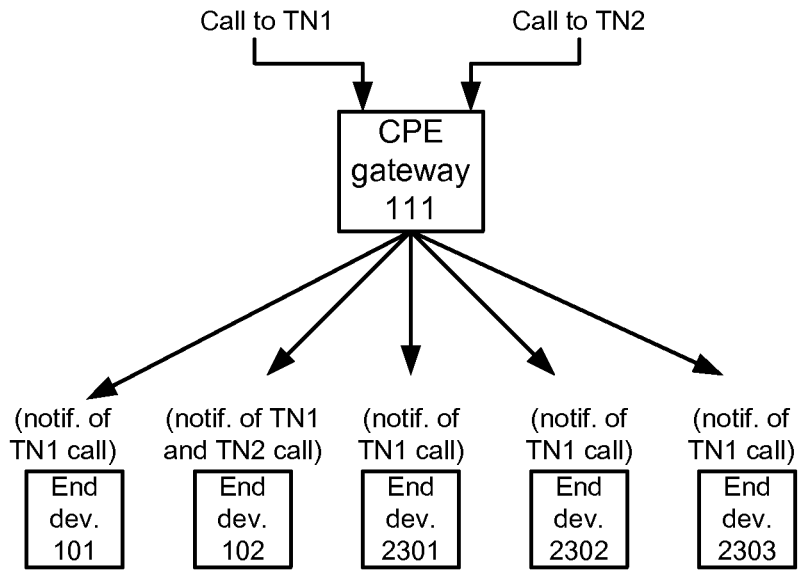

FIG. 23E shows simultaneous incoming calls to TN1 (mapped to user A in the user A profile) and to TN2 (mapped to user B in the user B profile). As indicated above, notifications for simultaneous events can be provided by sequencing indicator combinations for each of the events. For example, CPE gateway 111 could cause end devices to provide a notification of a first call using a first audio/visual indicator combination for a first period of time (e.g., 10 seconds), followed by a notification of a second call using a second audio/visual indicator combination for a succeeding time period (e.g., the following ten seconds), with the sequence then repeating until one of the notifications is attended or times out. In the example of FIG. 23E, however, user B has configured the user B profile so that device 102 is a prioritized device. Accordingly, CPE causes devices 101, 2301, 2302 and 2303 to only provide a notification of the call to TN1 with the user A audio and visual indicators. CPE gateway 111 further causes device 102 to provide alternating notifications of the call to TN1 (with the user A indicators) and of the call to TN2 (with the user B indicators). Note that a similar result would occur if the user B profile only identifies device 102.

Figure 23F:
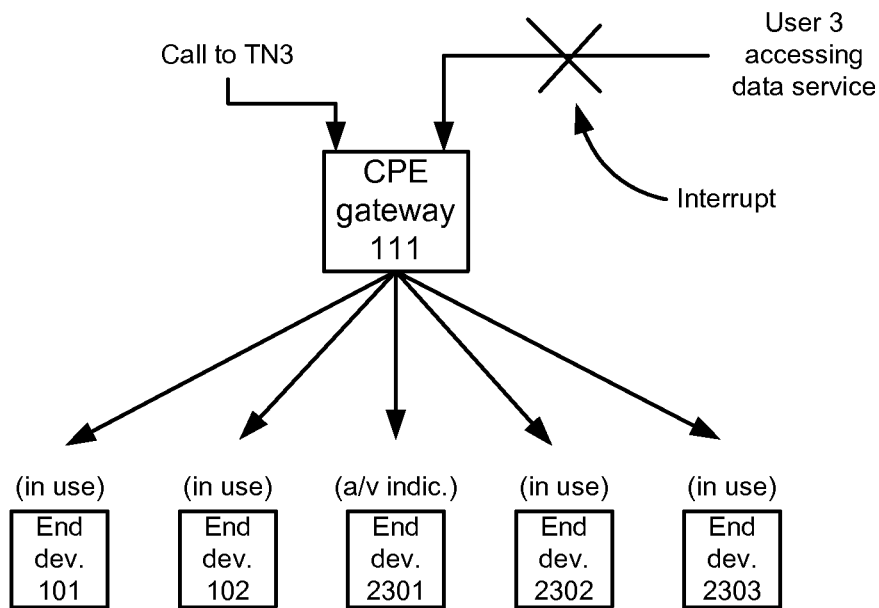

In some embodiments, a non-voice data service (e.g., email, voice mail, news service, weather services, horoscope, etc.) being provided to a device will be interrupted if a user receives an incoming voice call. This would permit, e.g., presumptively higher priority services to be preempt lower priority services. FIG. 23F illustrates one example of this feature. In FIG. 23F, user C is logged into and receiving a data service on device 2301. Devices 101, 102, 2302 and 2303 are also in use. When an incoming call for TN3 (mapped to user C in the user C profile) is received, CPE gateway 111 interrupts the data service and causes device 2301 to provide a notification of the incoming call to TN3.

As with other features, users may in some embodiments configure their individual profiles so as to define priorities for one or more services. For example, some users may decide that voice calls should not preempt certain data services.

CPE gateway 111 can allow multiple users to share a session (e.g., after successful barge-in) in various manners. If the session is being shared by end devices that communicate on the same physical layer (e.g., two DECT handsets), CPE gateway 111 may use the same physical channel for communication to both devices. Alternately, when end devices sharing a session communicate on different physical layers (e.g., a DECT handset and a computer communicating over a USB interface), CPE gateway 111 may stream media for the session to the end devices on separate channels.

Although the examples of FIGS. 23A-23F are in the context of incoming voice calls, the features shown in FIGS. 23A-23F could be extended to other services provided by network 100.

FIG. 24A shows call flow signaling, in at least embodiments using NCS signaling, to cause simultaneous ringing in response to calls originating from a Public Switched Telephone Network (PSTN). FIGS. 24B and 24C show another example of call flow, and in particular, show NCS signaling to cause ringing of multiple end devices in response to a call from within network 100. FIG. 24C is a continuation of FIG. 24B as indicated in the lower right portion of FIG. 24B.

In some embodiments, user profiles and other aspects of the systems described herein can be employed to implement a public address (PA) system to provide messages to users through one or more end devices. In some embodiments, for example, a user wishing to address other users with the PA system feature can login to an end device using his or her credentials. After providing input to the end device to select the PA system feature, the user can then select recipients of the PA message by selecting users from a contact list, from one or more predefined groups, or from a default group (e.g., all users associated with an account). Alternatively, a user could specify end devices to which the message is to be sent. The user then speaks the message into a microphone of the end device (e.g., microphone 504 in FIG. 5). The message is then sent to other recipients in accordance with their respective profiles. In some embodiments, a user can further configure additional options when sending a PA message. For example, the sending user may be able to set a priority for the message, etc.

Similarly, various aspects of the PA system can be controlled by profiles of individual users. For example, each user profile can indicate whether PA messages are accepted, the devices on which messages are accepted, priorities for various message type, and whether sessions for other services can be interrupted or superseded by a PA message. As with other types of profile data, a primary user such as a parent may have the power to set various PA system aspects of non-primary users' profiles. Thus, a parent could set children's' profiles so that a PA message originating from the parent will be delivered to the child regardless of how the child might be using an end device. Profiles could also be used to store various predefined messages (or pointers to such messages) that a user might wish to send on multiple occasions. As but one example, a parent might record a message such as "come to dinner" that can be played nightly to inform children that dinner is ready.

In some embodiments, additional hardware and/or software can be added to end devices so that an audible message can be broadcast from the device if it is not currently held next to a user's ear. As but one example, DECT handset device 101 of FIG. 5 could configured so that a PA message received when device 101 is on hook (or otherwise not currently in use for a call) will cause a volume control for speaker 503 to be increased. The PA system could also operate so as to cause visual indicators to be provided by end devices in combination with an audio PA message (e.g., causing a display to flash a particular color).

Figure 25:
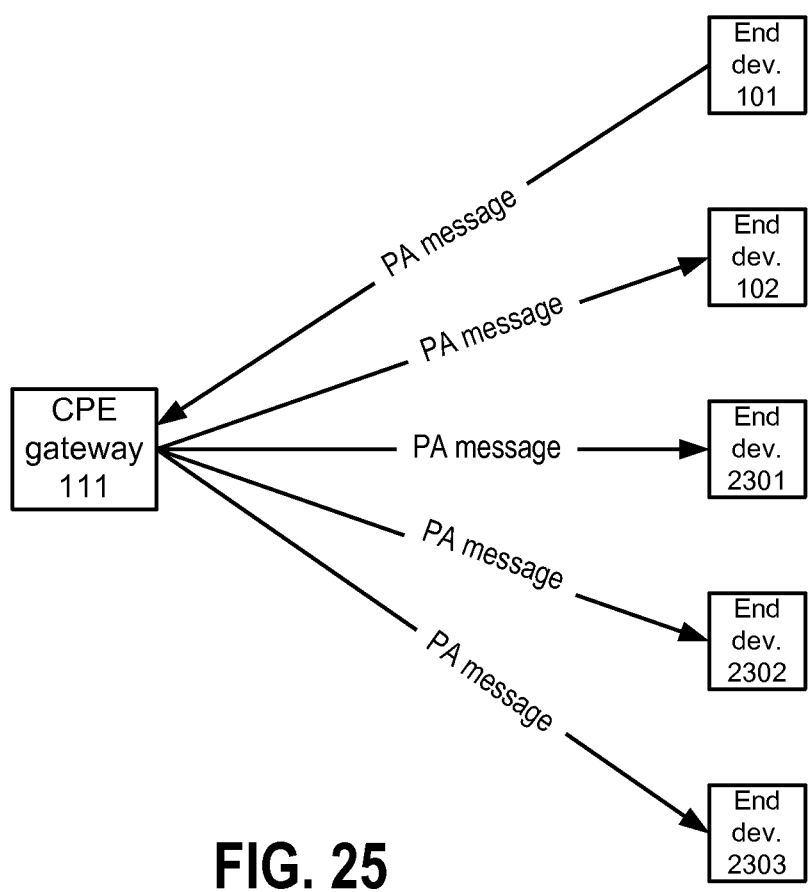
FIG. 25 is a block diagram illustrating PA message broadcast in at least some embodiments.

In one embodiment, a PA message is broadcast in a local network by a CPE gateway such as gateway 111 of FIG. 1. For example, FIG. 25 shows CPE gateway 111 and end devices 101, 102, 2301, 2302 and 2303. As in the example of FIGS. 23A-23F, each of devices 101, 102, 2301, 2302 and 2303 is a DECT handset. User A sends a PA message by selecting the PA feature in device 101, selecting the recipients, and recording a message (or choosing a pre-existing message). In this example, user A has selected users at devices 102, 2301, 2302 and 2303. User A then provides input to device 101 causing device 101 to signal CPE gateway 111 that the message should be sent. Upon receiving the signal from device 101, CPE gateway 111 causes devices 102, 2301, 2302 and 2303 to provide the PA message. In the present example, CPE gateway 111 knows the message recipients are at devices 102, 2301, 2302 and 2303 because each of the recipients is logged in to one of those devices or is involved in a voice or other session on one of those devices.

In some embodiments, CPE gateway 111 can be configured to push a PA message to all end devices for which there is an open and active physical channel with CPE gateway 111. As indicated above, handset end devices or other end devices with telephone functionality can be configured so that PA messages can played if the device is on hook. Alternatively, such a device could be configured so that a PA message will cause the device to go off hook.

If a particular CPE gateway can only broadcast PA messages over less than all open physical channels to end devices, a FIFO, round-robin or other scheduling algorithm can be used to push the PA message over each physical channel Because a PA message is often used for one way communication and does not require a response, sequential PA message delivery may appear near real time. Message delivery could also be scheduled to incorporate intelligent routing so as to avoid message echo between end devices that are known to be near one another.

Figure 26:
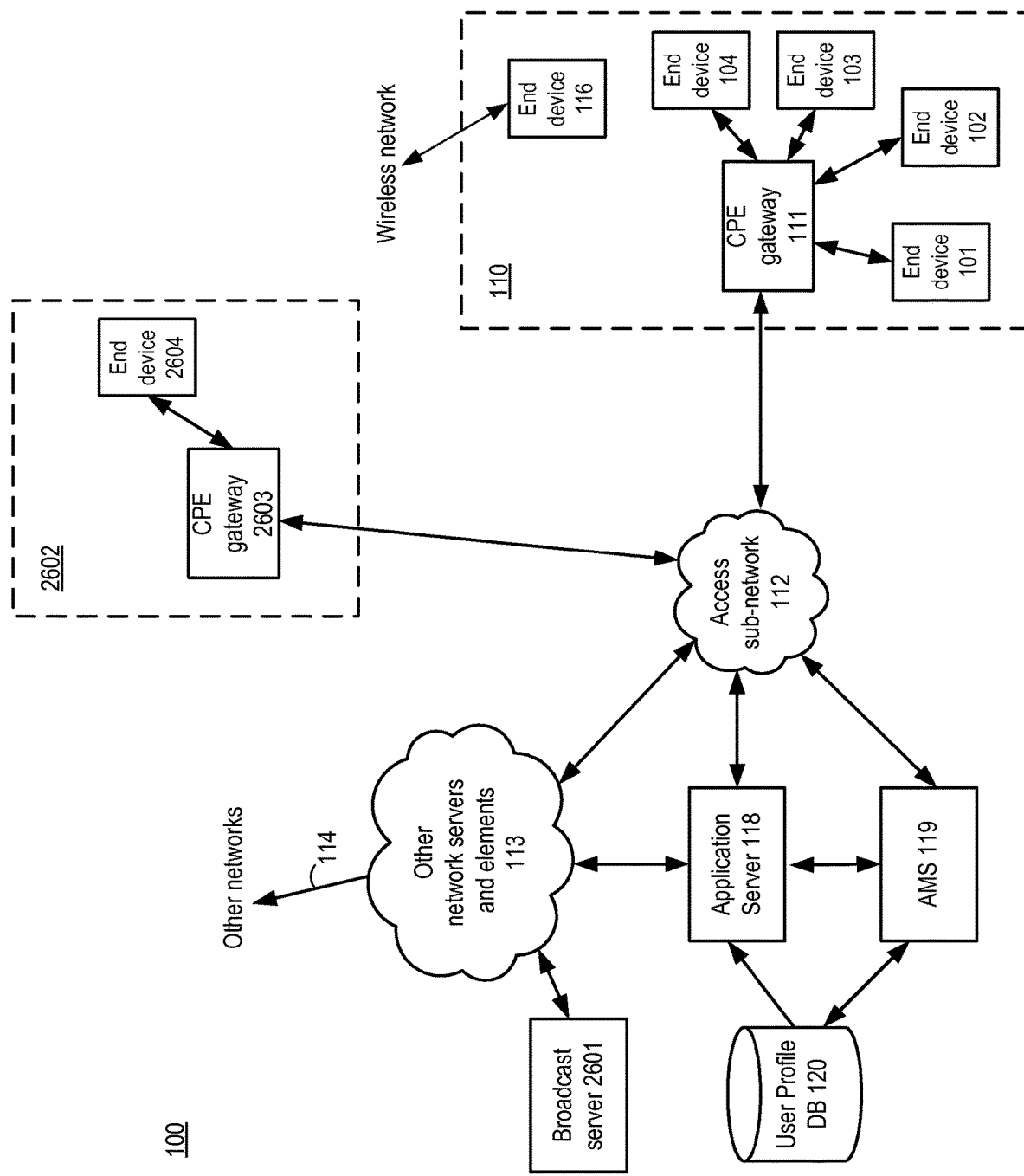
FIG. 26 shows a network with a broadcast server according to some embodiments.

In additional embodiments, a broadcast message server can be used interface with additional network elements and/or with additional networks so as to push PA messages to end devices associated with different CPE gateways and/or communicating through different networks. FIG. 26 shows a broadcast server 2601 in network 100 according to one such embodiment. Broadcast server 2601 may include hardware components such as are described in connection with FIG. 3 and store instructions causing server 2601 to carry out operations such as are described herein. An additional premises 2602 having a CPE gateway 2603 and end device 2604 are also shown in FIG. 26. The remaining elements in FIG. 26 are similar to those described previously. When user A at premises 110 wishes to send a PA message, user A logs into broadcast server 260 by providing his or her credentials. User A then selects the recipients of the message. In this example, user A selects users A, B and C currently using devices 102, 2301 and 2302, user F currently using device 116, and user G at premises 2602 currently using STT device 2604. After recording or selecting a message, user A causes device 101 to send a message to broadcast server 2601 indicating the PA message should be sent. Broadcast server then routes the PA message to the recipient devices in accordance with the recipient profiles. In the case of user A (device 102), user B (device 2301), user C (device 2302) and user G (device 2604), broadcast server 2601 sends the message to application server 118, which then sends the message to CPE gateways 111 and 2603, which in turn forward the PA message to the end devices. In the case of end device 116, broadcast server sends the PA message to the wireless network of which device 116 is a part, which network then forwards the message to device 116. In some embodiments, broadcast server 2601 could store the PA message and forward that message according to a FIFO, round-robin or other scheduling algorithm.

In some embodiments, broadcast server 2601 could be implemented as a separate process on application server 118, AMS 119, a CPE gateway, or some other network element.

Figure 27:
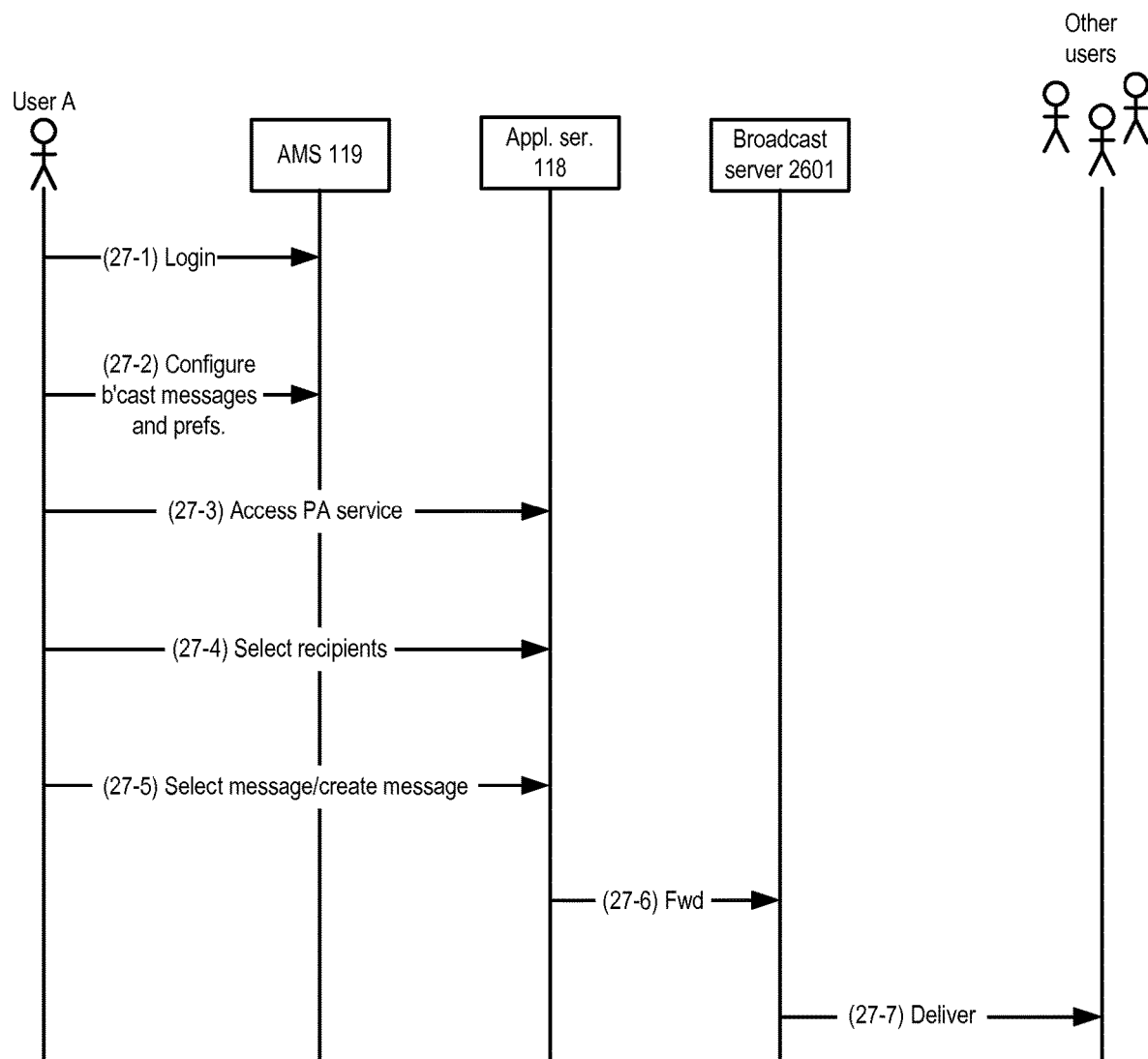
FIG. 27 is a communication diagram showing transmission of a PA message according to some embodiments.

FIG. 27 is a communication diagram showing transmission of a PA message according to the embodiment described above for FIG. 26. User A logs in to AMS 119 at line 27-1. User A then configures preferences related to the PA messaging feature. Subsequently, user A accesses the PA messaging service through application server 118, which provides a GUI and other presentation layer elements of the PA messaging service (line 27-3). User A selects a recipients of the PA message (line 27-4) and records or selects a message (line 27-5). After user A provides input indicating the PA message should be sent and a corresponding signal is sent to application server 118 (which input and signal are not shown in FIG. 27), application server 118 forwards the PA message to broadcast server 2601. Broadcast server 2601 then forwards the message (via application server 118 and/or other network elements) to the appropriate end devices.

A PA message broadcast service can include numerous additional features. In some embodiments, a set of default broadcast messages can be programmed into an end device, with each of those default messages accessible by the press of a single key to enable fast messaging. A primary user could have extra privileges, e.g., the ability to "force" other users/devices to receive a broadcast message. In some embodiments, a broadcast message may be configurable to prompt a recipient for a reply (e.g., by playing a tone after the message and/or forcing the recipient to respond). In yet some additional embodiments, a recipient of a broadcast message may be permitted to "snooze" the message by causing the message to be replayed at fixed intervals. A user could configure a profile so as to establish a PA message contacts list of user to receive broadcast messages. A user may also be able to configure a profile so as to control devices over which PA messages to the user may be broadcast and/or establish priorities for such devices (e.g., cause PA messages to first be sent to a first device, then to a second device, etc.). A parent or other primary user may have the ability to supersede other users preferences and cause PA messages to be delivered a particular device and/or to interrupt a session of a non-primary user to cause the PA message to be delivered. For example, a primary user may have the ability to set a particular priority on a message that will case that message to be broadcast to other non-primary users regardless of those user's profile configurations or current session activity.

In some embodiments, a network-based address book service is provided. The addresses and other data for the address-book service may be stored in a centralized server, thereby enabling concurrent multi-party access and allowing a synchronized update of the same contact from multiple users. In some such embodiments, each user may have a private and a public address book, the latter being optionally shared with a group of users. A user may add contacts to the private or public address book from local search results (e.g., a "yellow pages" type of service) or from other types of services and from multiple end devices. Contact data can be stored in a centralized network server by exposing interfaces between multiple data services and the centralized network server. A synchronization engine can be used to maintain a reference to an item of contact data within the network and to permit multiple users to access the contact according to profile settings. Network-based storage permits synchronizing of any update to contact information across users and devices with minimal processing overhead. In addition to a public and private address book, a user may also create subsets of contacts within the public and/or private address books. In this manner, "favorites" lists and the like can be created.

Various data services (e.g., a yellow pages type of service, a telephony service, an email or messaging service) may interface to the contact database via an application server.

Figure 28:
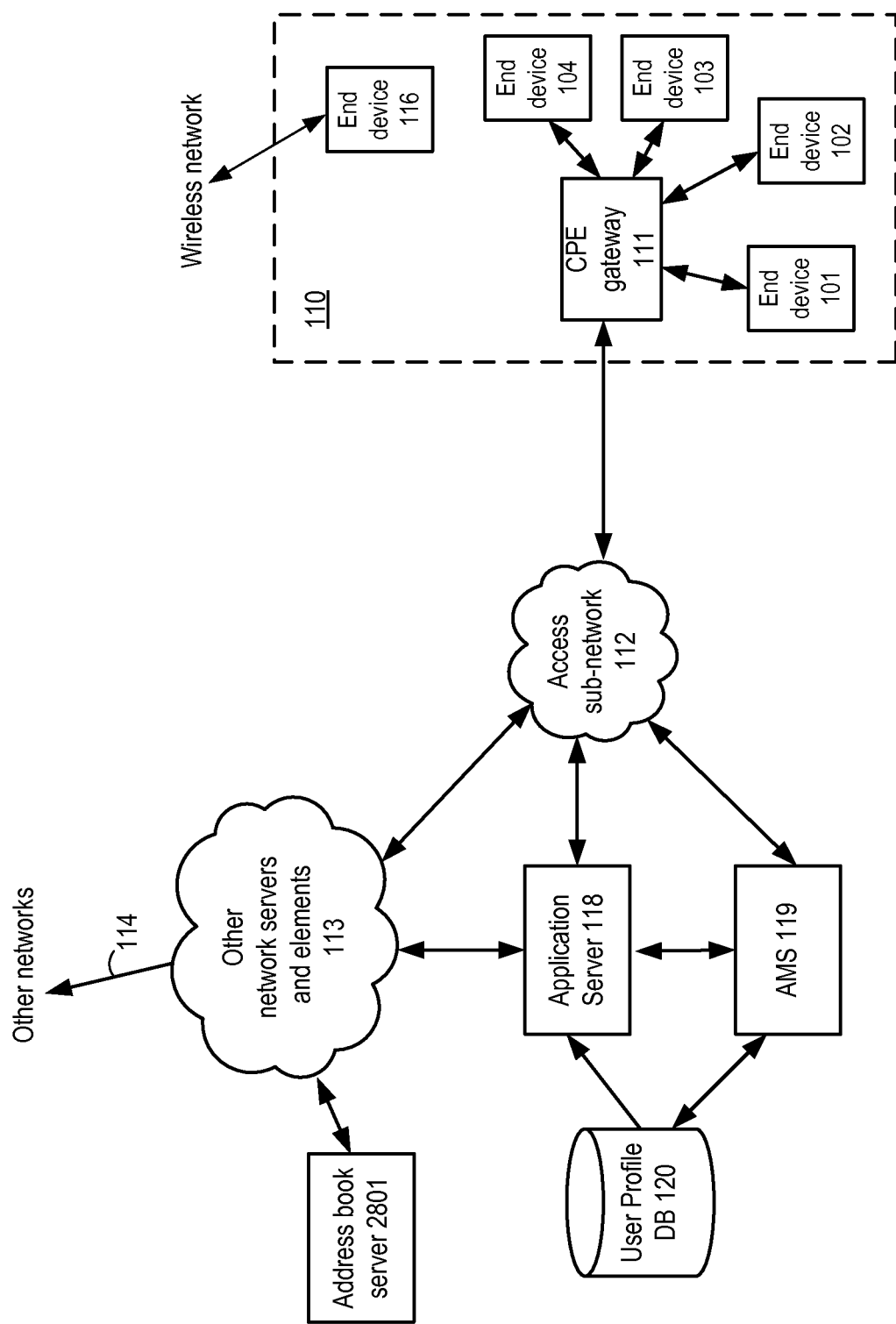
FIG. 28 shows a network with an address book server according to some embodiments.

In some embodiments, and as shown in FIG. 28, an address book server 2801 is included in network 100. Address book server 2801 includes hardware components such as are described in connection with FIG. 3. In addition to address book contact data, server 2801 stores instructions executable by one or more processors in server 2801 to carry out operations such as are described herein. Remaining elements of FIG. 28 are similar to those described in connection with FIG. 1. Different interfaces on various end devices are used to synchronize and retrieve contact data address book server 2801. Contact data in address book server 2801 can be maintained per user profiles and mapped to profiles of primary users. In some embodiments, data in address book server 2801 is accessed via application server 118.

Figure 29:
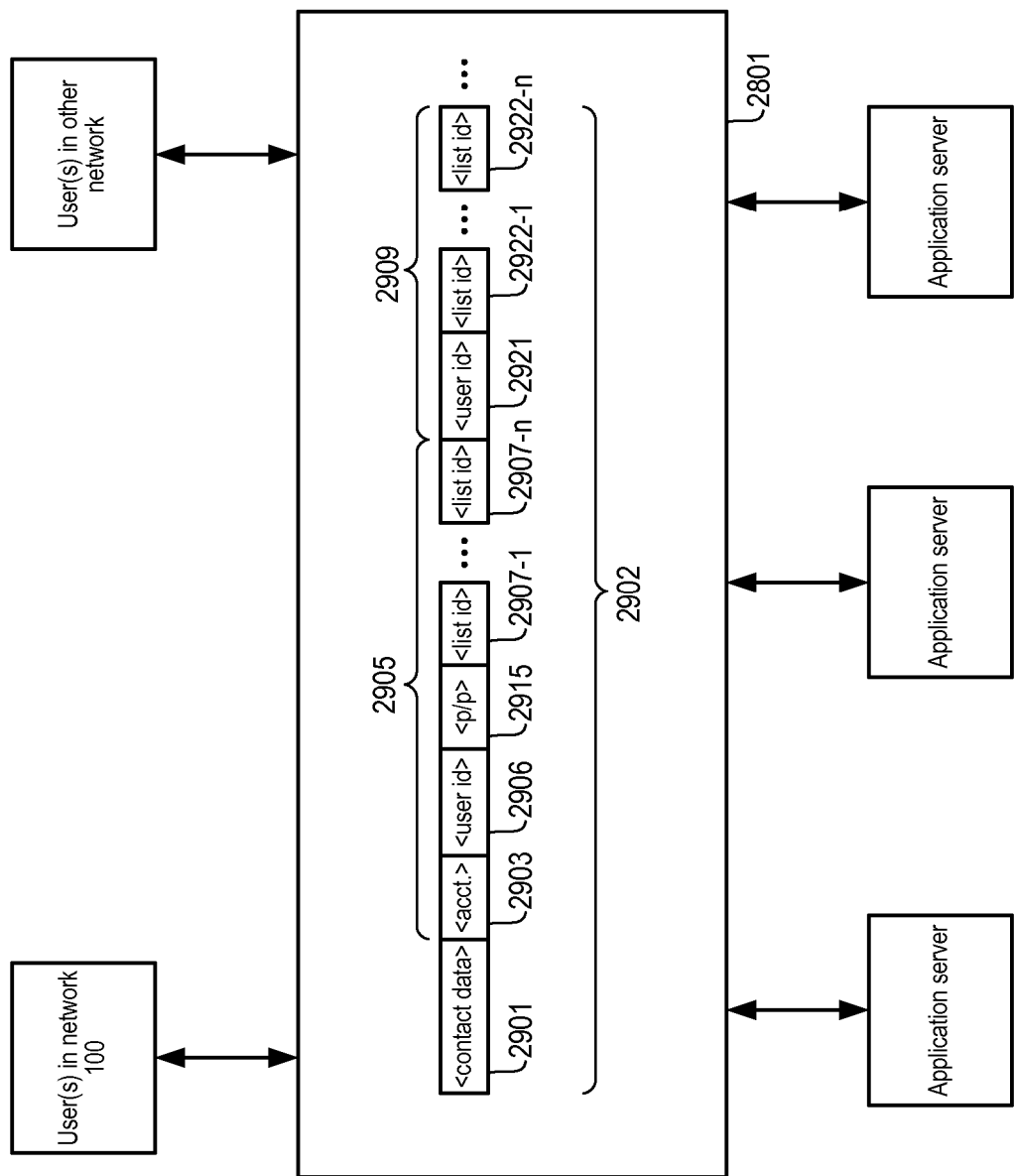
FIG. 29 shows one example of how contact data may be maintained in an address book server according to some embodiments.

FIG. 29 shows one example of how contact data may be maintained in address book server 2801 according to some embodiments. As used herein, a "contact" refers to a specific person, business or other entity with which a user in network 100 or some service in network 100 entity might wish to communicate. Contact data includes information identifying the contact such as a name (e.g., a person's or business's name), a street or other physical address, etc. Contact data also includes information needed to establish communication with the contact. Examples of this information include one or more TNs, an email address, an IM address, a gaming handle, etc. In at least some embodiments, a single instance of contact data is maintained in server 2801 for each contact. One example of such an instance is shown as contact record 2902. In addition to one or more fields 2901 used to hold the contact data, record 2902 includes a field 2903 used to hold an identifier of a subscriber account. Record 2902 further include a set of fields 2905 that include a field 2906 to hold an identifier of a user, associated with that account, that is the owner of record 2902. A field 2915 holds a flag indicating whether the user identified in field 2906 has classified the contact data as public or private, and one or more fields 2907-1 through 2907-n to hold pointers or other data indicating the contact data should be included in a particular "buddy list" or other sub-collection of contacts that might be established by the user identified in field 2906. In some embodiments, pointers in fields 2907-1 through 2907-n may refer to lists stored or referenced in the user's profile. Record 2902 may also include one or more additional sets of fields such as set 2909 that is similar to set 2905, but that contains data reflecting inclusion of the contact data in a different user's (identified in field 2921) contact lists (identified in one or more fields 2922-1 through 2922-n). For example, user A may establish an address book entry for a particular contact and make that contact a public contact (thus part of user A's public address book). User B might then wish to include that contact information into user B's own address book.

The record 2902 of FIG. 29 is merely one example of how contact data can be stored in accordance with some embodiments. The actual format of contact data and/or of the tables or other data structures used to organize and store that contact data will vary among different embodiments. In some embodiments, and as also shown in FIG. 29, data in address book server 2801 could also be accessible by other applications servers and/or users associated with other accounts (or even with other networks) over LDAP (light-weight directory access protocol) interfaces.

As can be appreciated from FIG. 29, an update to contact data by one user will thus update that contact data for other users. Should a particular user wish to protect a particular contact data entry from update by other users, an additional field could be added to record 2902 to mark the contact data as read-only. In some embodiments, only the owner of a record can mark a particular contact data instance as read-only. In some such embodiments, a non-owner wishing to protect a particular contact data instance from modification by other users could create a second record for the same contact data in address book server 2801 and mark that second record as private.

When a user accesses his or her contact data via an end device, the user may specify the set of contacts for which data are to be displayed. For example, user A may provide input to an end device indicating that user A wishes to see information for contacts in his or her public address book. In response, user A will be provided (e.g., on a display of the end device) with a scrollable list containing all of the contact data in server 2801 that is included in a record showing user A as the "owner" of the contact. If user A were to provide input indicating a desire to see information in user B's public address book, user A might first be provided with a GUI asking user A to select another user. Once user B is selected, user A is provided a scrollable list containing the contact data in server 2801 that are contained in records showing user B as the owner and having the public/private flag set to "public." If user A were to provide input indicating a desire to see information for contacts in a first sub-grouping of contacts, user A would provide input identifying that sub-grouping. In response, user A would be provided with a scrollable list containing each of the contacts for which server 2801 has a record showing user A in field 2906 or field 2921 and an entry (e.g., in one of fields 2907-1 through 2907-*n* or 2922-1 through 2922-*n*) showing the contact as in the requested sub-grouping.

In some embodiments, an end device may interface with server 2801, with application server 118 and/or with another application server so as to limit the type of contact data provided. For example, a user requesting contact data from an email application might only be provided with the name and email address for each contact.

Figure 30:
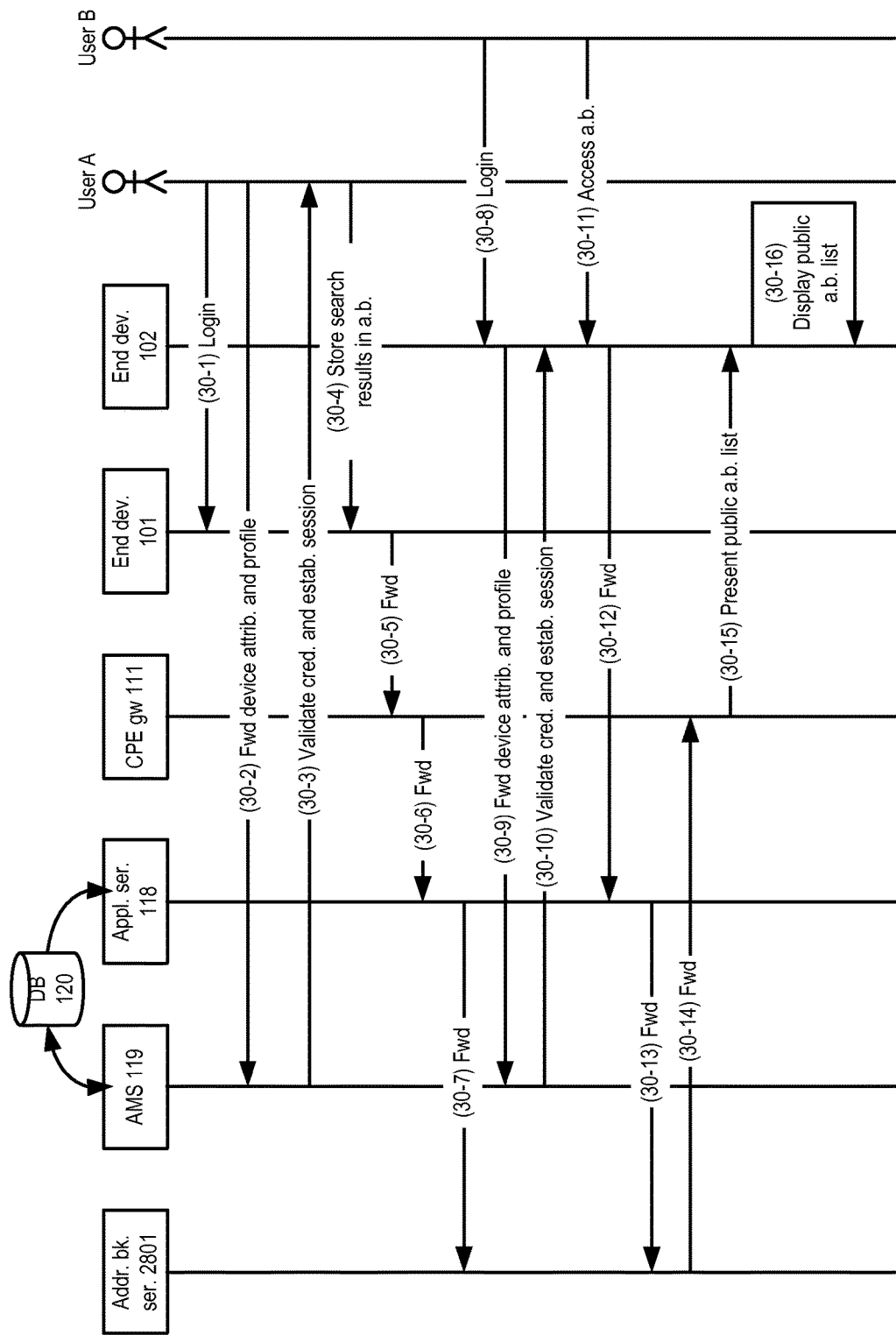
FIG. 30 is a communication diagram showing sharing of entries in a public address book according to some embodiments.

FIG. 30 is a communication diagram showing sharing of entries in a public address book. User A logs in using end device 101 at line 30-1. Device attributes and login data are forwarded to AMS 119 (line 30-2), which validates user A's credentials and establishes a session (line 30-3). Subsequently, user A provides input indicating a desire to store data for an additional contact in user A's public address book (line 30-4). This is forwarded to address book server 2801 (lines 30-5, 30-6 and 30-7), which stores the new contact. Subsequently, user B logs in using device 102 (line 30-8). After user B's credentials are forwarded (line 30-9) and validated, and a session established (line 30-10), user B provides input indicating a desire to view contacts in user A's public address book (line 30-11). This is forwarded to address book server 2801 (lines 30-12 and 30-13), which retrieves user A's public address book data and makes same available to user B (lines 30-14, 30-15 and 30-16).

Figure 31:
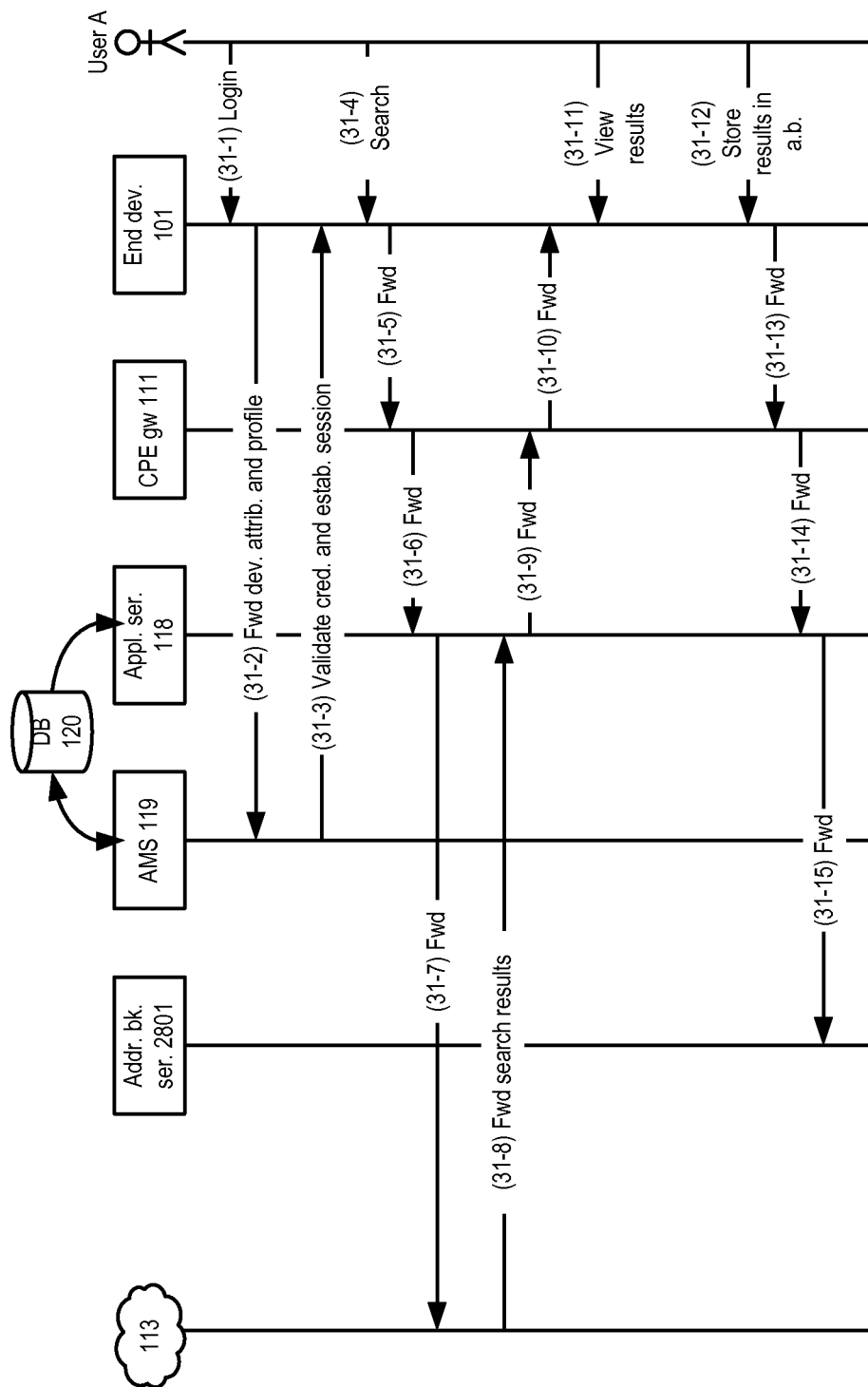
FIG. 31 is a communication diagram showing, according to some embodiments, adding contact data obtained from a search using another data service.

FIG. 31 is a communication diagram showing adding contact data obtained from a search using another data service (e.g., a yellow pages type service, a search of call logs from a voice telephony service). User A logs in using end device 101 at line 31-1. Device attributes and login data are forwarded to AMS 119 (line 31-2), which validates user A's credentials and establishes a session (line 31-3). Subsequently, user A provides input indicating a search request in the data service (line 31-4). The request is forwarded via CPE gateway 111 (line 31-5) and application server 118 (line 31-6) to an application server for the accessed data service located within network cloud 113 (line 31-7). A search result is then returned and displayed to user A (lines 31-8, 31-9, 31-10). User A views the results (line 31-11) and provides input to device 101 indicating a desire to store a contact from the search in user A's public address book (line 31-12). In response a signal is sent via CPE gateway 111 (line 31-13) and application server 118 (line 31-14) to address book server 2801 (line 31-15). The added contact can now be accessed by other users.

Figure 32:
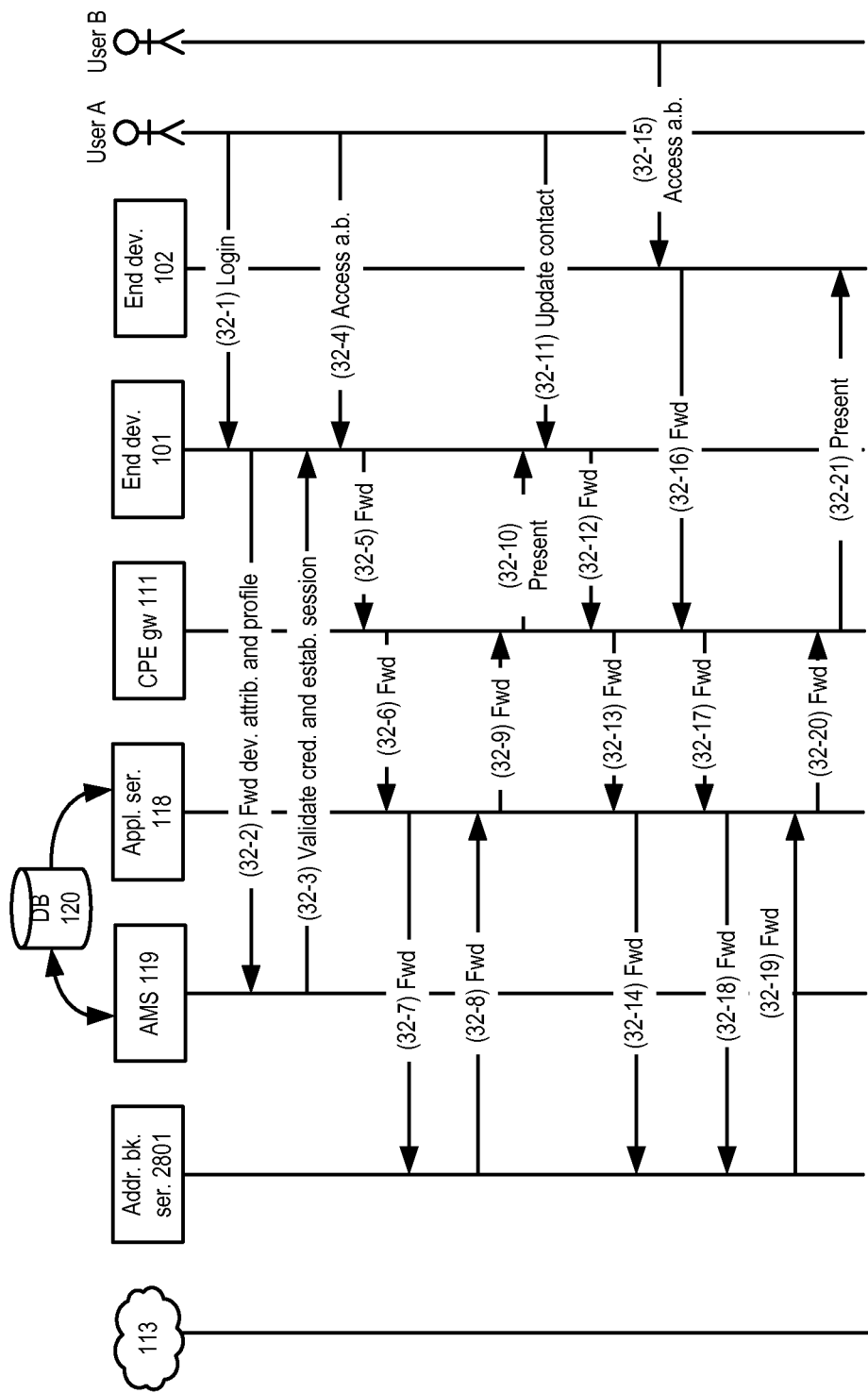
FIG. 32 is a communication diagram showing, according to some embodiments, updating of contact data in a public address book.

FIG. 32 is a communication diagram showing updating of contact data in a public address book. User A logs in using end device 101 at line 32-1. Device attributes and login data are forwarded to AMS 119 (line 32-2), which validates user A's credentials and establishes a session (line 32-3). Subsequently, user A provides input indicating a desire to access his or her address book (line 32-4). A request is then forwarded from device 101 via CPE gateway 111 (line 32-5) and application server 118 (line 32-6) to address server 2801 (line 32-7). In response, address book server 2801 forwards contact data from user A's public address book (line 32-8) via application server 118 (line 32-9) and CPE gateway 111 (line 32-10) to end device 101. User A then provides input to device 101 indicating a modification to data for one or more contacts (line 32-11). A signal representing this modification is forwarded via CPE gateway 111 (line 32-12) and application server 118 (line 32-13) to address book server 2801 (line 32-14), which updates the appropriate record(s) (not shown in FIG. 32). Subsequently, user B accesses user A's public address book from device 102 (line 32-15), which access request is forwarded from device 102 via CPE gateway 111 (line 32-16) and application server 118 (line 32-17) to address server 2801 (line 32-18). Server 2801 retrieves the requested contact data, which includes the modifications submitted by user A at line 32-11, and sends same (line 32-19) via application server 118 (line 32-20) and CPE gateway 111 (line 32-20) to device 102 (line 32-21).

Figure 33:
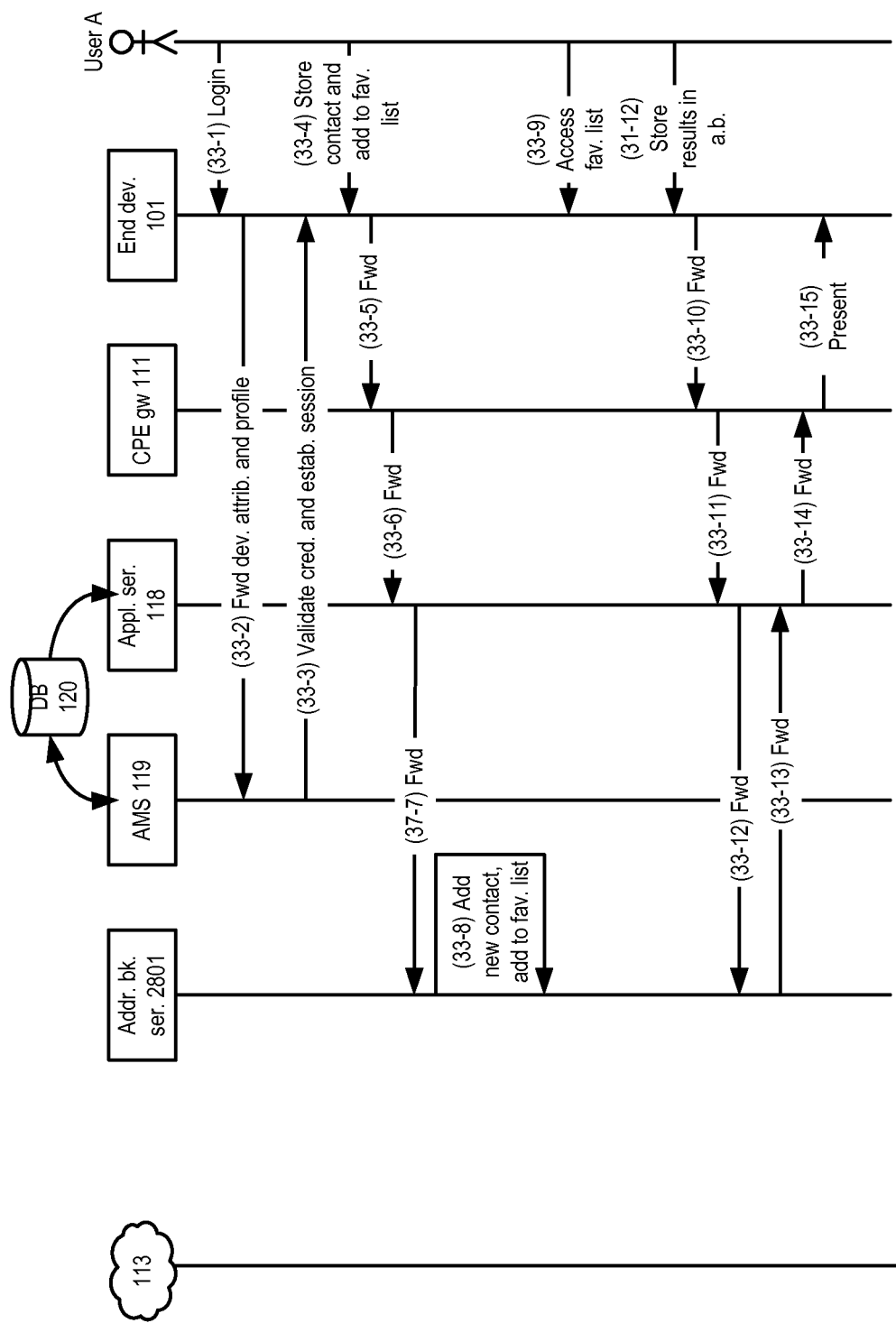
FIG. 33 is a communication diagram showing, according to some embodiments, addition of a new contact that is also added to a favorites list.

FIG. 33 is a communication diagram showing addition of a new contact that is also added to a favorites list. User A logs in using end device 101 at line 33-1. Device attributes and login data are forwarded to AMS 119 (line 33-2), which validates user A's credentials and establishes a session (line 33-3). Subsequently, user A provides input indicating a desire to add a new contact to the user A address book and to also include that new contact in a "favorites" list (line 33-4). A signal representing this input is forwarded via CPE gateway 111 (line 33-5) and application server 118 (line 33-6) to address book server 2801 (line 33-7). Address book server 2801 then creates a record having the contact data provided by user A, having a field indicating user A as the owner of the contact data and including an entry in an appropriate one of fields 2907-1 through 2907-*n* (FIG. 29) indicating that the new contact is also in user A's favorites list (line 34-8). User A subsequently accesses the favorites list (lines 33-9 through 33-12), causing address server 2801 to return the favorites list contacts (including the new contact submitted at line 33-4) (lines 33-13 through 33-15).

Embodiments of the invention include a machine readable storage medium (e.g., a CD-ROM, CD-RW, DVD, floppy disc, FLASH memory, RAM, ROM, magnetic platters of a hard drive, etc.) storing machine readable instructions that, when executed by one or more processors, cause a server, gateway, end device or other network device to carry out operations such as are described herein. As used herein (including the claims), a machine-readable storage medium is a physical structure that can be touched by a human. A modulated signal would not by itself constitute a machine-readable storage medium.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. Additional embodiments may not perform all operations, have all features, or possess all advantages described above. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatuses, modules, systems, and machine-readable storage media. Any and all permutations of features from above-described embodiments are the within the scope of the invention.

The invention claimed is:

1. A system comprising:
a plurality of user devices associated with one or more recipient users; and
a computing device comprising:
one or more processors; and
memory storing instructions that, when executed by the one or more processors, cause the computing device to:
receive an incoming message for the one or more recipient users;
determine, for the one or more recipient users, a preference for being notified of the incoming message;
cause the plurality of user devices to output an indicator associated with the incoming message;
receive, from at least one user device of the plurality of user devices, an indication that the indicator has been acknowledged; and
cause one or more other user devices, of the plurality of user devices, to clear the indicator.

2. The system of claim 1, wherein the indicator comprises one or more of the following:
an audio indicator;
a plurality of visual indicators in a user-specific summary;
a flashing of a light;
a ring tone;
pixels to be displayed at the plurality of user devices;
a pop-up message;
a user-personalized audio;
a hyperlink to a web page; or
text to be added to a region of screens of the plurality of user devices.

3. The system of claim 1, wherein the instructions, when executed by the one or more processors, cause the computing device to:
receive the incoming message by receiving, from a service, the incoming message; and
determine the preference by determining based on the service, the preference.

4. The system of claim 1, wherein the instructions, when executed by the one or more processors, cause the computing device to:
cause the plurality of user devices to output the indicator by causing addition of the indicator to one or more lists of indicators displayed by the plurality of user devices; and
cause the one or more other user devices to clear the indicator by causing removal of the indicator from the one or more lists of indicators.

5. The system of claim 1, wherein the computing device comprises a customer premises equipment gateway.

6. The system of claim 1, wherein the instructions, when executed by the one or more processors, cause the computing device to cause the one or more other user devices to clear the indicator by:
determining, for a first user device of the plurality of user devices, a second preference for clearing the indicator; and
causing, based on the second preference, clearing of the indicator on the first user device.

7. The system of claim 1, wherein the instructions, when executed by the one or more processors, further cause the computing device to:
determine, for a first user device of the plurality of user devices, a second preference for not clearing the indicator; and
determine, based on the second preference, not to cause the first user device to clear the indicator.

8. An apparatus comprising:
one or more processors; and
memory storing instructions that, when executed by the one or more processors, cause the apparatus to:
receive an incoming message for one or more recipient users;
determine, for the one or more recipient users, a preference for being notified of the incoming message;
cause a plurality of user devices, associated with the one or more recipient users, to output an indicator associated with the incoming message;
receive, from at least one user device of the plurality of user devices, an indication that the indicator has been acknowledged; and
cause one or more other user devices, of the plurality of user devices, to clear the indicator.

9. The apparatus of claim 8, wherein the indicator comprises one or more of the following:
an audio indicator;
a plurality of visual indicators in a user-specific summary;
a flashing of a light;
a ring tone;
pixels to be displayed at the plurality of user devices;
a pop-up message;
a user-personalized audio;
a hyperlink to a web page; or
text to be added to a region of screens of the plurality of user devices.

10. The apparatus of claim 8, wherein the instructions, when executed by the one or more processors, cause the apparatus to:
receive the incoming message by receiving, from a service, the incoming message; and
determine the preference by determining, based on the service, the preference.

11. The apparatus of claim 8, wherein the instructions, when executed by the one or more processors, cause the apparatus to:
cause the plurality of user devices to output the indicator by causing addition of the indicator to one or more lists of indicators displayed by the plurality of user devices; and
cause the one or more other user devices to clear the indicator by causing removal of the indicator from the one or more lists of indicators.

12. The apparatus of claim 8, wherein the apparatus comprises a customer premises equipment gateway.

13. The apparatus of claim 8, wherein the instructions, when executed by the one or more processors, cause the apparatus to cause the one or more other user devices to clear the indicator by:

determining, for a first user device of the plurality of user devices, a second preference for clearing the indicator; and causing, based on the second preference, clearing of the indicator on the first user device.

14. The apparatus of claim 8, wherein the instructions, when executed by the one or more processors, further cause the apparatus to:

determine, for a first user device of the plurality of user devices, a second preference for not clearing the indicator; and determine, based on the second preference, not to cause the first user device to clear the indicator.

15. One or more non-transitory computer-readable media storing instructions that, when executed, cause:

receiving an incoming message for one or more recipient users;

determining, for the one or more recipient users, a preference for being notified of the incoming message;

causing a plurality of user devices, associated with the one or more recipient users, to output an indicator associated with the incoming message;

receiving, from at least one user device of the plurality of user devices, an indication that the indicator has been acknowledged; and causing one or more other user devices, of the plurality of user devices, to clear the indicator.

16. The one or more non-transitory computer-readable media of claim 15, wherein the indicator comprises one or more of the following:

an audio indicator;
a plurality of visual indicators in a user-specific summary;
a flashing of a light;
a ring tone;
pixels to be displayed at the plurality of user devices;
a pop-up message;
a user-personalized audio;
a hyperlink to a web page; or
text to be added to a region of screens of the plurality of user devices.

17. The one or more non-transitory computer-readable media of claim 15, wherein the instructions, when executed, cause:

the receiving the incoming message by causing receiving, from a service, the incoming message; and the determining the preference by causing determining, based on the service, the preference.

18. The one or more non-transitory computer-readable media of claim 15, wherein the instructions, when executed, cause:

the causing the plurality of user devices to output the indicator by causing addition of the indicator to one or more lists of indicators displayed by the plurality of user devices; and the causing the one or more other user devices to clear the indicator by causing removal of the indicator from the one or more lists of indicators.

19. The one or more non-transitory computer-readable media of claim 15, wherein the instructions, when executed, cause the causing the one or more other user devices to clear the indicator by causing:

determining, for a first user device of the plurality of user devices, a second preference for clearing the indicator; and based on the second preference, clearing of the indicator on the first user device.

20. The one or more non-transitory computer-readable media of claim 15, wherein the instructions, when executed, further cause:

determining, for a first user device of the plurality of user devices, a second preference for not clearing the indicator; and determining, based on the second preference, not to cause the first user device to clear the indicator.

21. A system comprising:

a plurality of user devices; and
a computing device comprising:
one or more processors; and
memory storing instructions that, when executed by the one or more processors, cause the computing device to:
receive, from a service, an incoming message;
cause, via the plurality of user devices, output of an indicator associated with the incoming message;
receive, from at least one user device of the plurality of user devices, an indication that the indicator has been acknowledged; and
cause one or more other user devices, of the plurality of user devices, to clear the indicator.

22. The system of claim 21, wherein the instructions, when executed by the one or more processors, cause the computing device to cause output of the indicator by:

determining, for the plurality of user devices and based on the service, a preference for being notified of the incoming message; and determining, for the incoming message and based on the preference, the indicator.

23. The system of claim 21, wherein the instructions, when executed by the one or more processors, cause the computing device to:

cause output of the indicator by causing addition of the indicator to one or more lists of indicators displayed via the plurality of user devices; and cause the one or more other user devices to clear the indicator by causing removal of the indicator from the one or more lists of indicators.

24. The system of claim 21, wherein the indicator comprises one or more of the following:

an audio indicator;
a plurality of visual indicators in a user-specific summary;
a flashing of a light;
a ring tone;
pixels to be displayed at the plurality of user devices;
a pop-up message;
a user-personalized audio;
a hyperlink to a web page; or
text to be added to a region of screens of the plurality of user devices.

25. The system of claim 21, wherein the computing device comprises a customer premises equipment gateway.

26. The system of claim 21, wherein the instructions, when executed by the one or more processors, cause the computing device to cause the one or more other user devices to clear the indicator by:

determining, for a first user device of the plurality of user devices, a second preference for clearing the indicator; and causing, based on the second preference, clearing of the indicator by the first user device.

27. The system of claim 21, wherein the instructions, when executed by the one or more processors, further cause the computing device to:

determine, for a first user device of the plurality of user devices, a second preference for not clearing the indicator; and determine, based on the second preference, not to cause the first user device to clear the indicator.

28. An apparatus comprising:
one or more processors; and
memory storing instructions that, when executed by the one or more processors, cause the apparatus to:
receive, from a service, an incoming message;
cause, via a plurality of user devices, output of an indicator associated with the incoming message;
receive, from at least one user device of the plurality of user devices, an indication that the indicator has been acknowledged; and
cause one or more other user devices, of the plurality of user devices, to clear the indicator.

29. The apparatus of claim 28, wherein the instructions, when executed by the one or more processors, cause the apparatus to cause output of the indicator by:
determining, for the plurality of user devices and based on the service, a preference for being notified of the incoming message; and
determining, for the incoming message and based on the preference, the indicator.

30. The apparatus of claim 28, wherein the instructions, when executed by the one or more processors, cause the apparatus to:
cause output of the indicator by causing addition of the indicator to one or more lists of indicators displayed via the plurality of user devices; and
cause the one or more other user devices to clear the indicator by causing removal of the indicator from the one or more lists of indicators.

31. The apparatus of claim 28, wherein the indicator comprises one or more of the following:
an audio indicator;
a plurality of visual indicators in a user-specific summary;
a flashing of a light;
a ring tone;
pixels to be displayed at the plurality of user devices;
a pop-up message;
a user-personalized audio;
a hyperlink to a web page; or
text to be added to a region of screens of the plurality of user devices.

32. The apparatus of claim 28, wherein the apparatus is a customer premises equipment gateway.

33. The apparatus of claim 28, wherein the instructions, when executed by the one or more processors, cause the apparatus to cause the one or more other user devices to clear the indicator by:
determining, for a first user device of the plurality of user devices, a second preference for clearing the indicator; and
causing, based on the second preference, clearing of the indicator by the first user device.

34. The apparatus of claim 28, wherein the instructions, when executed by the one or more processors, further cause the apparatus to:
determine, for a first user device of the plurality of user devices, a second preference for not clearing the indicator; and
determine, based on the second preference, not to cause the first user device to clear the indicator.

35. One or more non-transitory computer-readable media storing instructions that, when executed, cause:

receiving, from a service, an incoming message;
causing, via a plurality of user devices, output of an indicator associated with the incoming message;
receiving, from at least one user device of the plurality of user devices, an indication that the indicator has been acknowledged; and
causing one or more other user devices, of the plurality of user devices, to clear the indicator.

36. The one or more non-transitory computer-readable media of claim 35, wherein the instructions, when executed, cause the causing output of the indicator by causing:
determining, for the plurality of user devices and based on the service, a preference for being notified of the incoming message; and
determining, for the incoming message and based on the preference, the indicator.

37. The one or more non-transitory computer-readable media of claim 35, wherein the instructions, when executed, cause:
the causing output of the indicator by causing addition of the indicator to one or more lists of indicators displayed via the plurality of user devices; and
the causing the one or more other user devices to clear the indicator by causing removal of the indicator from the one or more lists of indicators.

38. The one or more non-transitory computer-readable media of claim 35, wherein the indicator comprises one or more of the following:
an audio indicator;
a plurality of visual indicators in a user-specific summary;
a flashing of a light;
a ring tone;
pixels to be displayed at the plurality of user devices;
a pop-up message;
a user-personalized audio;
a hyperlink to a web page; or
text to be added to a region of screens of the plurality of user devices.

39. The one or more non-transitory computer-readable media of claim 35, wherein the instructions, when executed, cause the causing the one or more other user devices to clear the indicator by causing:
determining, for a first user device of the plurality of user devices, a second preference for clearing the indicator; and
based on the second preference, clearing of the indicator by the first user device.

40. The one or more non-transitory computer-readable media of claim 35, wherein the instructions, when executed, further cause:
determining, for a first user device of the plurality of user devices, a second preference for not clearing the indicator; and
determining, based on the second preference, not to cause the first user device to clear the indicator.

41. A system comprising:
a plurality of user devices associated with one or more recipient users; and
a computing device comprising:
one or more processors; and
memory storing instructions that, when executed by the one or more processors, cause the computing device to:
receive an incoming message;
cause addition of an indicator, associated with the incoming message, to one or more lists of indicators displayed by the plurality of user devices;

receive, from at least one of the plurality of user devices, an indication that the indicator has been acknowledged; and cause removal of the indicator by one or more other user devices of the plurality of user devices.

42. The system of claim 41, wherein the indicator comprises one or more of the following:

a plurality of visual indicators in a user-specific summary;
pixels to be displayed at the plurality of user devices;
a pop-up message; or
a hyperlink to a web page.

43. The system of claim 41, wherein the instructions, when executed by the one or more processors, cause the computing device to cause addition of the indicator to the one or more lists of indicators by:

determining, for the plurality of user devices, a preference for being notified of the incoming message; and
causing, based on the preference, addition of the indicator to the one or more lists of indicators.

44. The system of claim 41, wherein the instructions, when executed by the one or more processors, cause the computing device to:

receive the incoming message by receiving, from a service, the incoming message; and
cause addition of the indicator to the one or more lists of indicators by:
determining, based on the service and for the plurality of user devices, a preference for being notified of the incoming message; and
causing, based on the preference, addition of the indicator to the one or more lists of indicators.

45. The system of claim 41, wherein indicators in the one or more lists of indicators are sorted by one or more of the following:

priorities associated with the indicators;
priorities of services associated with the indicators; or
arrival times of the indicators.

46. The system of claim 41, wherein the instructions, when executed by the one or more processors, cause the computing device to cause removal of the indicator by the one or more other user devices by:

causing removal of the indicator from a list of indicators displayed by the at least one of the plurality of user devices; and
causing synchronization of other lists of indicators displayed by the plurality of user devices.

47. An apparatus comprising:

one or more processors; and
memory storing instructions that, when executed by the one or more processors, cause the apparatus to:
receive an incoming message;
cause addition of an indicator, associated with the incoming message, to one or more lists of indicators displayed by a plurality of user devices;
receive, from at least one of the plurality of user devices, an indication that the indicator has been acknowledged; and
cause removal of the indicator by one or more other user devices of the plurality of user devices.

48. The apparatus of claim 47, wherein the indicator comprises one or more of the following:

a plurality of visual indicators in a user-specific summary;
pixels to be displayed at the plurality of user devices;
a pop-up message; or
a hyperlink to a web page.

49. The apparatus of claim 47, wherein the instructions, when executed by the one or more processors, further cause the apparatus to cause addition of the indicator to the one or more lists of indicators by:

determining, for the plurality of user devices, a preference for being notified of the incoming message; and
causing, based on the preference, addition of the indicator to the one or more lists of indicators.

50. The apparatus of claim 47, wherein the instructions, when executed by the one or more processors, further cause the apparatus to:

receive the incoming message by receiving, from a service, the incoming message; and
cause addition of the indicator to the one or more lists of indicators by:
determining, based on the service and for the plurality of user devices, a preference for being notified of the incoming message; and
causing, based on the preference, addition of the indicator to the one or more lists of indicators.

51. The apparatus of claim 47, wherein indicators in the one or more lists of indicators are sorted by one or more of the following:

priorities associated with the indicators;
priorities of services associated with the indicators; or
arrival times of the indicators.

52. The apparatus of claim 47, wherein the instructions, when executed by the one or more processors, further cause the apparatus to cause removal of the indicator by:

causing removal of the indicator from a list of indicators displayed by the at least one of the plurality of user devices; and
causing synchronization of other lists of indicators displayed by the plurality of user devices.

53. One or more non-transitory computer-readable media storing instructions that, when executed, cause:

receiving an incoming message;
causing addition of an indicator, associated with the incoming message, to one or more lists of indicators displayed by a plurality of user devices;
receiving, from at least one of the plurality of user devices, an indication that the indicator has been acknowledged; and
causing removal of the indicator by one or more other user devices of the plurality of user devices.

54. The one or more non-transitory computer-readable media of claim 53, wherein the indicator comprises one or more of the following:

a plurality of visual indicators in a user-specific summary;
pixels to be displayed at the plurality of user devices;
a pop-up message; or
a hyperlink to a web page.

55. The one or more non-transitory computer-readable media of claim 53, wherein the instructions, when executed, cause the causing addition of the indicator to the one or more lists of indicators by causing:

determining, for the plurality of user devices, a preference for being notified of the incoming message; and
based on the preference, addition of the indicator to the one or more lists of indicators.

56. The one or more non-transitory computer-readable media of claim 53, wherein the instructions, when executed, cause:

the receiving the incoming message by causing receiving, from a service, the incoming message; and
the causing addition of the indicator to the one or more lists of indicators by causing:

determining, based on the service and for the plurality of user devices, a preference for being notified of the incoming message; and based on the preference, addition of the indicator to the one or more lists of indicators.

57. The one or more non-transitory computer-readable media of claim 53, wherein indicators in the one or more lists of indicators are sorted by one or more of the following:
priorities associated with the indicators;
priorities of services associated with the indicators; or
arrival times of the indicators.

58. The one or more non-transitory computer-readable media of claim 53, wherein the instructions, when executed, cause the causing removal of the indicator by the one or more other user devices by causing:
removal of the indicator from a list of indicators displayed by the at least one of the plurality of user devices; and
synchronization of other lists of indicators displayed by the plurality of user devices.

* * * * *

UNITED STATES PATENT AND TRADEMARK OFFICE
CERTIFICATE OF CORRECTION

| | | |
|---|---|---|
| PATENT NO. | : 11,431,811 B2 | Page 1 of 1 |
| APPLICATION NO. | : 17/184114 | |
| DATED | : August 30, 2022 | |
| INVENTOR(S) | : Connelly et al. | |

It is certified that error appears in the above-identified patent and that said Letters Patent is hereby corrected as shown below:

In the Specification

Column 18, Detailed Description, Line 29:
After "summary", insert --.-- therefor Column 21, Detailed Description, Line 9:
After "summary", insert --.-- therefor Column 24, Detailed Description, Line 53:
Delete "111" and insert --118-- therefor Column 28, Detailed Description, Line 13:
After "channel", insert --.-- therefor In the Claims Column 33, Claim 3, Line 50:
After "determining", insert --.-- therefor Signed and Sealed this
Twenty-fourth Day of October, 2023

Katherine Kelly Vidal
*Director of the United States Patent and Trademark Office*